United States Patent [19]

Shimomura

[11] 4,253,335

[45] Mar. 3, 1981

[54] BAROMETRIC ALTIMETER

[76] Inventor: Naonobu Shimomura, 13-8, Sakuragaoka-cho, Shibuya-ku, Tokyo, Japan

[21] Appl. No.: 40,409

[22] Filed: May 18, 1979

[30] Foreign Application Priority Data

Dec. 28, 1978 [JP] Japan ................................ 53/164985

[51] Int. Cl.³ .............................................. G01L 7/00
[52] U.S. Cl. ........................................ 73/384; 73/386
[58] Field of Search .......................... 73/384, 386, 387

[56] References Cited

U.S. PATENT DOCUMENTS

| | | | |
|---|---|---|---|
| 3,693,405 | 9/1972 | Shimomura | 73/384 |
| 3,726,138 | 4/1973 | Kosakowski et al. | 73/384 |
| 3,729,999 | 5/1973 | Shimomura | 73/384 |
| 3,958,108 | 5/1976 | Shimomura | 73/384 |
| 3,958,459 | 5/1976 | Shimomura | 73/384 |

*Primary Examiner*—Donald O. Woodiel
*Attorney, Agent, or Firm*—Staas & Halsey

[57] ABSTRACT

The altitude of an aircraft is determined by measuring the output of a pressure transducer on the aircraft because the altitude is defined by the atmospheric pressure at that point. In this altitude measurement, the relationship between the altitude and the atmospheric pressure is nonlinear, and most pressure transducers exhibit some nonlinearity. High accuracy altitude measurement, correcting those nonlinearities, have been disclosed in the prior art utilizing a quasi-exponential function generator (QEFG). A quasi-exponential function is an exponential function with a time constant which varies with time. However, the characteristics of the pressure transducer and QEFG are affected by temperature, and there have been no appropriate means other than the use of a thermostat to maintain the accuracy of measurement when the temperature varies. This invention compensates for the temperature variant characteristics of the pressure transducer and the QEFG by changing the constants of the circuit elements of the QEFG and of the output stage coupled to the pressure transducer according to the output of a temperature sensor incorporated in the altimeter. Even the change of nonlinearity, or the change of curvature of the characteristic curve of the pressure transducer is compensated for almost perfectly by this invention.

26 Claims, 54 Drawing Figures

FIG. 14

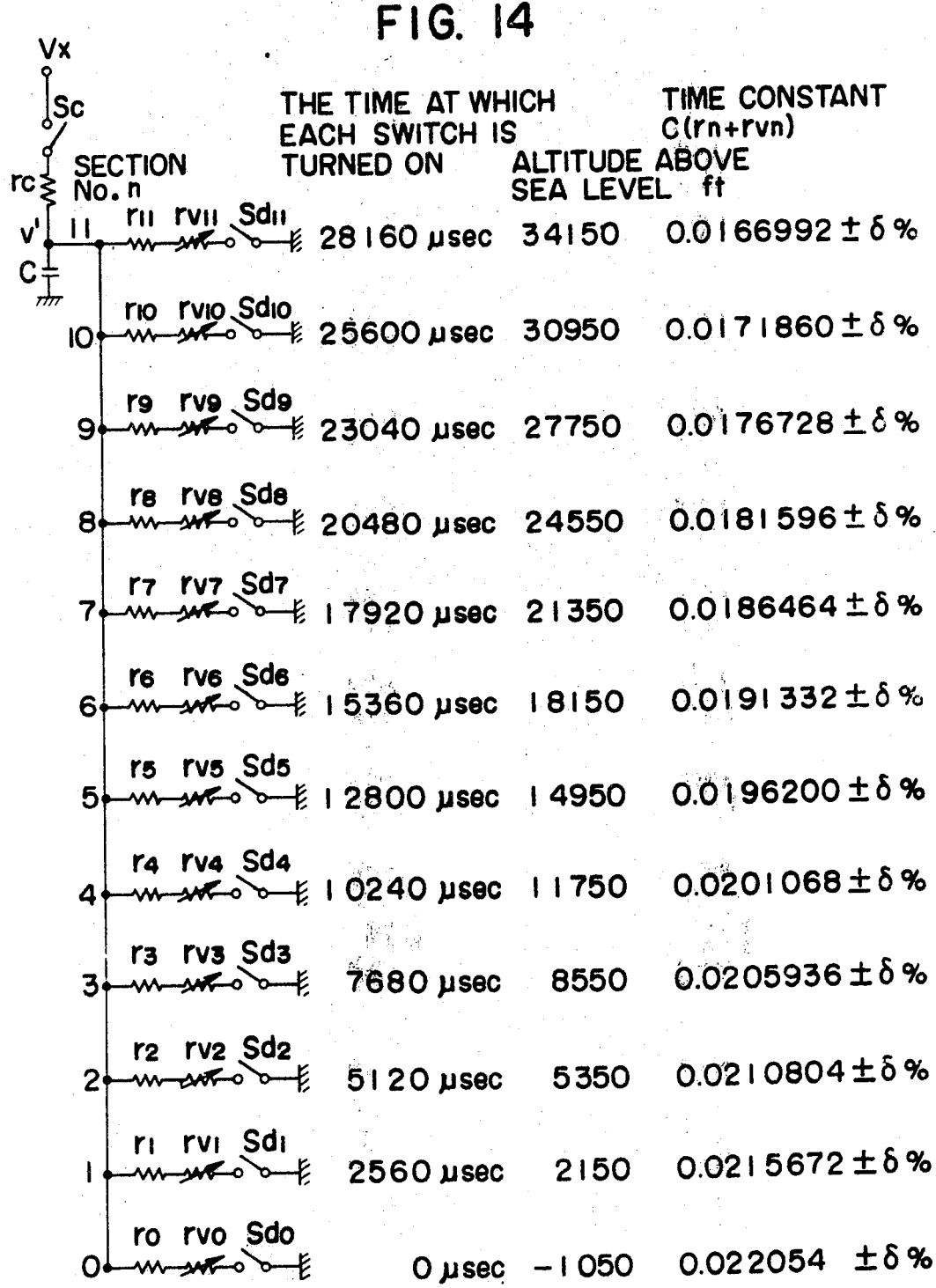

| SECTION No. n | THE TIME AT WHICH EACH SWITCH IS TURNED ON | ALTITUDE ABOVE SEA LEVEL  ft | TIME CONSTANT $C(r_n+r_{vn})$ |
|---|---|---|---|
| 11 $r_{11}$ $r_{v11}$ $Sd_{11}$ | 28160 μsec | 34150 | 0.0166992 ± δ % |
| 10 $r_{10}$ $r_{v10}$ $Sd_{10}$ | 25600 μsec | 30950 | 0.0171860 ± δ % |
| 9 $r_9$ $r_{v9}$ $Sd_9$ | 23040 μsec | 27750 | 0.0176728 ± δ % |
| 8 $r_8$ $r_{v8}$ $Sd_8$ | 20480 μsec | 24550 | 0.0181596 ± δ % |
| 7 $r_7$ $r_{v7}$ $Sd_7$ | 17920 μsec | 21350 | 0.0186464 ± δ % |
| 6 $r_6$ $r_{v6}$ $Sd_6$ | 15360 μsec | 18150 | 0.0191332 ± δ % |
| 5 $r_5$ $r_{v5}$ $Sd_5$ | 12800 μsec | 14950 | 0.0196200 ± δ % |
| 4 $r_4$ $r_{v4}$ $Sd_4$ | 10240 μsec | 11750 | 0.0201068 ± δ % |
| 3 $r_3$ $r_{v3}$ $Sd_3$ | 7680 μsec | 8550 | 0.0205936 ± δ % |
| 2 $r_2$ $r_{v2}$ $Sd_2$ | 5120 μsec | 5350 | 0.0210804 ± δ % |
| 1 $r_1$ $r_{v1}$ $Sd_1$ | 2560 μsec | 2150 | 0.0215672 ± δ % |
| 0 $r_0$ $r_{v0}$ $Sd_0$ | 0 μsec | −1050 | 0.022054 ± δ % |

FIG. 23A    FIG. 23B    FIG. 24
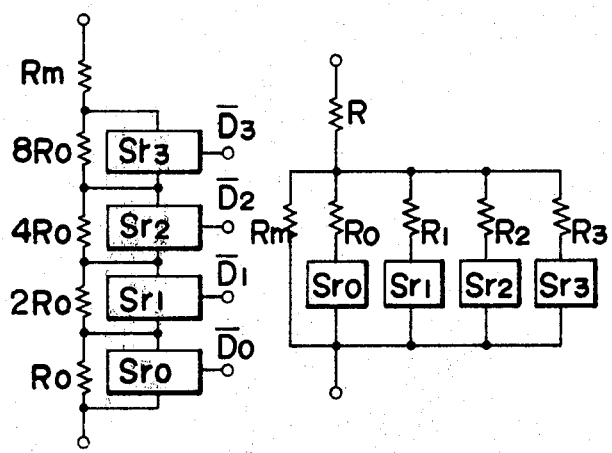
FIG. 25
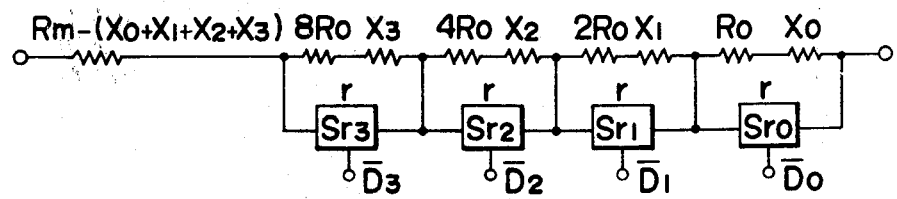
FIG. 26A    FIG. 26B
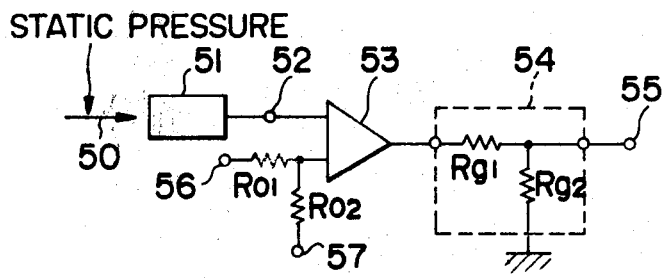
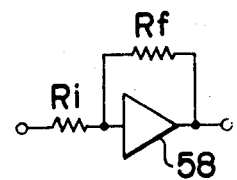

NORMAL DESIGN TEMPERATURE
TEMPERATURE SENSOR OUTPUT ($d_3 d_2 d_1 d_0$)

TEMPERATURE SENSOR OUTPUT ($d_3 d_2 d_1 d_0$)

$R_1$: 1 KΩ
$R_2$: 2 KΩ
$R_3$: 1.6 KΩ
$r$: 2.861 KΩ

TEMPERATURE

BAROMETRIC ALTIMETER

BACKGROUND OF THE INVENTION

This invention relates to the barometric altimeter which measures accurate pressure altitude according to the standard atmosphere by electronic means. A basic version of my measurement technique is disclosed in my first invention: Japanese Pat. No. 785,728 "Barometric Altimeter" and U.S. Pat. No. 3,693,405 "Barometric Altimeter", in which the measured altitude is represented by the time interval of two events at which an exponentially changing electrical signal becomes equal to two output signals from a pressure sensor, one signal produced at the reference altitude and the other signal produced at a point at which the altitude is to be measured. In this measurement, a correction must be made on the measured value according to the average temperature of the atmosphere between the reference altitude and the point of measurement.

My second invention: U.S. Pat. No. 3,958,459 "Barometric Altimeter" discloses an improved method of altitude measurement, in which the correction for the average temperature is not needed, based on the standard atmosphere.

In the present invention, a pressure transducer which has a linear or non-linear characteristics expressed by:

$$S = kP^a + b \tag{1}$$

where
S: output of the pressure transducer
P: pressure,
a, b, k: constants
is incorporated in a pressure sensor which also contains a output stage by which the offset b of equation (1) is compensated for to produce an output signal:

$$V_s = kP^a \tag{2}$$

where $V_s$: output of pressure sensor, offset compensated.

This is the same as the pressure sensor used in my second earlier invention. The second invention uses a quasi-exponential function signal, generated by a quasi-exponential function generator (acronymed as QEFG hereafter) in place of the exponentially changing signal of my first earlier invention and utilizes a pressure sensor having a characteristics expressed by equation (2). The exponentially changing signal of my first earlier invention has a time constant of a fixed value, whereas the quasi-exponential function signal of my second earlier invention has a time constant which changes with time.

FIG. 1 shows the principle of altitude measurement of my second invention, in which the horizontal axis shows the time t, the vertical axis represents voltage, and v is the output of the QEFG, $V_{s0}$, $V_{s1}$ are respectively the outputs of the pressure sensor at the reference altitude and at the altitude to be measured. Times $t_0$ and $t_1$ show respectively the times at which v becomes equal to $V_{s0}$ and $V_{s1}$. Then the time interval $t_1-t_o$ represents the measured altitude.

FIG. 2A shows the basic measuring circuit of my second invention. In FIG. 2A, QEFG generates the quasi-exponential function signal v, $V_{s0}$ is the signal which would be produced by the pressure sensor at the reference atitude, S is the pressure sensor and produces signal $V_{s1}$ at the altitude of measurement. The first comparator Comp. 0 generates a first coincidence signal at the time $t_0$ when v becomes equal with $V_{s0}$ and controls the counter Count. to start counting and the second comparator Comp. 1 generates a second coincidence signal at the time $t_1$ when v becomes equal with $V_{s1}$ and controls the counter to stop counting. During the time interval between $t_0$ and $t_1$, the counter Count. counts the pulses generated by the oscillator Osc. By properly selecting the frequency of the pulses generated by the oscillator Osc., the number counted by the counter Count. corresponds to the measured altitude.

FIG. 3 shows the principle of QEFG. In FIG. 3 the charging switch $S_c$ is turned on and discharging switch $S_d$ is turned off before discharge begins (that is the time $t < 0$ in FIG. 1), and the capacitor C is charged by the voltage V. At the time $t=0$, the switch $S_c$ is turned off and the switch $S_d$ is turned on and the electric charge in the capacitor C begins to discharge through the discharge resistor circuit R. By controlling the discharge resistor to decrease its resistance R linearly with time until the time which corresponds to the altitude of 11,000 m and thereafter to keep the resistance of the discharge resistor R constant up to the time which corresponds to the altitude 20,000 m, an altitude measurement up to 20,000 m is made by the QEFG of FIG. 3.

FIG. 4 shows one example of a QEFG, the principle of which is shown by FIG. 3. The variable resistance R of the discharge resistor in FIG. 3 is replaced by a circuit containing resistors $r_0$, $r_1$, $r_2$, $r_3$, ... $r_{n-1}$ of same resistance, and a resistor r, and switches $S_{d0}$, $S_{d1}$, $S_{d2}$, ..., $S_{dn}$. By means of turning on the switches $S_{d0}$, $S_{d1}$, $S_{d2}$, ..., $S_{dn}$ in sequence with a equal time interval, a voltage v' which is close to the quasi-exponential function voltage v is generated at the terminals of the capacitor C.

FIG. 5 shows the relationship between of v and v'. As shown in FIG. 5, by setting the initial value V' of the approximate quasi-exponential voltage v' a little larger than the initial value V of quasi-exponential voltage v, the overall approximation is improved. The error due to the use of approximate quasi-exponential voltage v' instead of v depends on the number of sections n into which the resistor R of FIG. 3 is divided as shown by $r_0$, $r_1$, $r_2$, $r_3$, ..., $r_{n-1}$ of FIG. 4. When the number of sections n is selected to be 12, for measurements of up to 36,000 ft, the largest calculated error of the system is 6 ft at lower altitudes and 8 ft at higher altitudes.

FIG. 6 shows another example of a QEFG, the principle of which is also shown by FIG. 3. The QEFG of FIG. 6 is a hybrid system using analog and digital technology. In FIG. 6, the capacitor C which has been charged with voltage V begins to discharge at the time $t=0$ through a discharge resistor circuit composed of a resistor R" and a switch $S_w$, where the switch $S_w$ is controlled on and off repeatedly by control signals from a controller Cont. so that the effective resistance of the discharge resistor circuit decreases linearly with time, and a voltage v very close to the ideal quasi-exponential voltage is generated at the terminals of the capacitor C.

FIG. 7 shows one example of the controller Cont. of FIG. 6. In FIG. 7, $R_0$, $R_1$, $R_2$, $R_3$ are registers and D is a detector circuit which detects the change of the content of the register $R_0$ at each cycle of operation of the controller. Predetermined initial values are stored in the registers $R_0$, $R_1$, $R_2$ and $R_3$, and one cycle of the operation of the controller is performed by adding the content of register $R_3$ to $R_0$, adding the content of $R_2$ to $R_1$ and by adding the content of register $R_1$ to $R_0$ a number of times according to the value detected by the detector circuit D. To implement this controller, it is possible to design so that the change of the content of the register $R_0$ at one cycle always remains below 1. Under such design, it is sufficient for the operation that the detector circuit D detects only the change of the content of the order of $2^0$ of the register $R_0$, and when such a change is detected, the detector circuit D controls the addition of the content of the register $R_1$ to the register $R_0$. By controlling the switch $S_w$ of FIG. 6 to turn on only when the above-noted change is detected by the detector circuit D, the effective resistance of the discharge resistor circuit, composed of registor $R''$ and switch $S_w$, decreases linearly with time, and the quasi-exponential function voltage v is generated at the terminals of the capacitor C.

Although most of the pressure transducers proposed for altimetry show nearly linear characteristics, they are found to have some degree of non-linearity when examined in detail. Such curvature of the characteristic curve cannot be ignored for a altitude measurement of high accuracy. The characteristic equation (1) or (2) is especially suitable to represent such slightly curved characteristics with high accuracy. As shown by FIG. 8(A), when the characteristics of pressure P VS sensor output S is strictly linear, it is represented by $a=1$ in the equation (2), when the characteristics is curved upward, it is represented by $a>1$, and when curved downward, it is represented by $a<1$ in the equation (2).

Referring to FIG. 3, in the time region of $t>0$, the resistance of the discharge resistor circuit R is changing. Let's denote by R the instantaneous value of the changing resistance, then the instantaneous value of the time constant of the discharging circuit of FIG. 3 is CR. If this QEFG has been designed for use with a perfectly linear pressure sensor, where $a=1$, then the altitude measurement with a nonlinear pressure sensor, where $a\neq 1$, is made with a correct theoretical accuracy by means of changing the instantaneous time constant to CR/a. This is disclosed in my second invention. Changing the instantaneous time constant is done either by changing the capacity C to C/a, or by changing instantaneous resistance R to R/a, or by changing the combined value CR to CR/a. In the foremost case, the QEFG will be as shown by FIG. 9, which shows that, if the value of "a" of equation (2) changes, the capacity of QEFG would change so as to be inversely proportional to a.

The characteristics of the pressure transducer changes with temperature variations. For example, suppose a characteristic curve of a pressure transducer at a temperature is represented by the solid line curve of FIG. 8B, then, that characteristic curve at a different temperature will be as shown by the dotted line curve. It has been extremely difficult to measure altitude with high accuracy by those pressure transducers on an aircraft where the temperature changes adversely, without using a thermostat. To cope with this difficulty, there have been pressure transducers with thermostats. But they have disadvantages of using additional power for heating, and additional time for heat up. In addition to the pressure transducer, the elements of the QEFG also change with temperature variations. A temperature stabilized QEFG needs special components and results in a high cost. A thermostat equipped QEFG uses additional power and has an inherent time lag. Improvements to cope with these problems have been awaited.

SUMMARY OF THE INVENTION

This invention makes it possible to measure the pressure altitude with high accuracy over a wide range of operating temperatures, without using a thermostat, by means of electronically compensating for the change of the characteristics of the pressure transducer and the QEFG.

In this invention, a pressure transducer which has the characteristics represented by equation (1) is used. The pressure sensor contains the pressure transducer and its output stage which contains a resistor circuit by which the offset b is compensated for, and another resistor circuit by which the gain is controlled to produce the constant output $V_s$ of equation (2) at a specified pressure P, irrespective of the temperature. The characteristics of the pressure transducer is represented by equation (1) even when the temperature changes by means of changing the values a, b and k according to the temperature. This means that the values of a, b, and k are the functions of temperature, so that, if a temperature sensing device is incorporated with the altimeter, the values of a, b and the offset compensated output of the pressure transducer at a specified pressure can be plotted against the digitized outputs of the temperature sensing device. Once these are plotted, the temperature compensated altitude measurement is effected by changing the resistance of the potentiometer in the output stage of the pressure sensor to compensate for the offset b at each output of the temperature sensing device, by changing the resistance of the gain control circuit in the output stage of the pressure sensor at each output of the temperature sensing device to produce a constant value of offset compensated output signal at a specified pressure, and by changing the instantaneous time constant CR of the QEFG so as to be inversely proportional to the value of "a" at each output of the temperature sensing device. The temperature compensation for the QEFG is made simultaneously with the compensation for a.

Since a digital value of altitude is obtained in the altimeter of this invention, it may be electronically converted from the measured altitude to the code specified for altitude reporting in the air traffic control system. This invention also provides means to indicate the measured altitude by a conventional rotating pointer and rotating drum display, which are still preferred by most of the pilots because of the actual feeling impressed by such moving displays for altitude change. This invention has made the field calibration of a blind encoder possible. The blind encoder is one version of the altimeter specifically designed for altitude reporting, and specified correspondence with the pilot altimeter is requested. Since the pilot altimeter shows some error, the blind encoder should be adjusted in the field to match with the indication of each pilot altimeter. A type of QEFG which is suitable for field calibration is disclosed.

An economical and reliable circuit for barometric setting is disclosed in this invention which not only does not need any special or high precision components, but also provides the added benefit of maintaining the barometric set value even in the case of a power failure. The barometric setting and its indication are made mechanically without using any critical mechanism such as a non-linear linkage.

When this invention is adopted for a pilot altimeter, the digital value of measured altitude of this invention is suitable to be processed by a low end 4 bit microcomputer to produce altitude alert signals or control signals for use by an auto-pilot.

BRIEF DESCRIPTION OF THE DRAWINGS

FIG. 12, FIG. 13, FIG. 14: Embodiments of a kind of QEFG used in this invention.

FIGS. 23A and 23B: Embodiments of the resistor circuit used for the temperature compensation in the QEFG and in the output stage of the pressure sensor for offset compensation and for gain control.

FIG. 24: Illustration of the principle used to eliminate the error caused by the residual resistance of a switch in the resistor circuit used for the temperature compensation.

FIG. 25: An embodiment of the resistor circuit used for the temperature compensation in which the error caused by the residual resistance of the switches are eliminated.

FIGS. 26A and 26B: Examples of the output stage circuit in a pressure sensor by which the offset compensation and the gain control is made for the temperature compensation.

DETAILED DESCRIPTION OF THE INVENTION

Figure 8A:
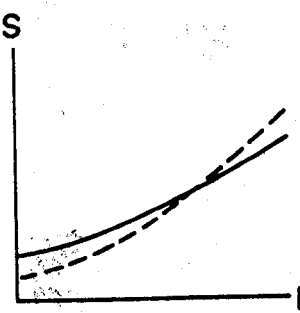
FIGS. 8A, 8B, and 8C: Characteristic curves of the pressure transducer and the pressure sensor used in this invention.
Figures 8B, 8C:
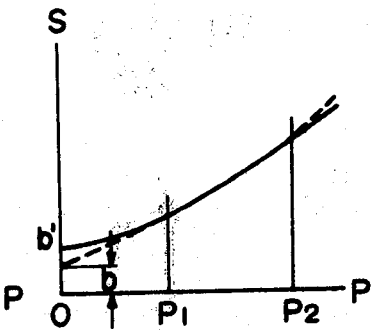

In this invention, a pressure transducer which has a characteristics expressed by equation (1) is used. Three constants a, b and k are determined so that equation (1) best represents the transducer characteristics for a pressure range in which the transducer actually operates. In FIG. 8C, the horizontal axis shows pressure and the solid line curve shows the output of the transducer. Suppose the transducer actually operates between the pressures $P_1$ and $P_2$. Then, in the range of $P_1$, $P_2$, the output of the transducer and the value S of equation (1) coincide. However, outside of the range $P_1$, $P_2$, the value S of equation (1) may divert from the solid line curve as shown by the dotted line curve. In such a case, the offset b in this invention is the value of S at P=0 of equation (1), and may be different from the value b' in FIG. 8C which is the output of the transducer when it is placed in an absolute vacuum. In case the pressure at the reference altitude is larger than $P_2$, the pressure sensor output at the reference altitude in this invention means the value of $V_s$ of equation (2) when P is the pressure of the standard atmosphere at the reference altitude and may be somewhat different from the output of the pressure sensor when it is placed in the pressure of the standard atmosphere of reference altitude. Thus, the output of the pressure sensor at the reference altitude in this invention is a value approximately equal to the output that would be produced by the pressure sensor when it is actually placed at the pressure of the reference altitude.

Since the altitude measurement of this invention is based on the same principle as my aforementioned second invention, a knowledge of the prior art is needed to understand the temperature compensation technique of this invention. Therefore, an explanation is given hereafter of the appropriate portion of my second invention. As for the unit of altitude used, the (ft) is adopted as recognized internationally.

The relationship of the pressure and the altitude of the Standard Atmosphere, JIS (Japanese Industrial Standard) W 0201, which is the same as that of the Manual of the ICAO (International Civil Aviation Organization) Standard Atmosphere Doc. 7488/2, 1964, is represented by the following equation up to 36089 ft (11000 m) above sea level:

$$P = P_0 e^{5.2561 \, ln(1 - 0.00000687531242 \, F)} \qquad (3)$$

where
F: altitude in geopotential measure in ft with sea level as the altitude measuring reference altitude,
$P_0$: atmospheric pressure at sea level
P: atmospheric pressure at the altitude F

| in mb units | $P_O$ = 1,013.25 mb |
| in in. Hg units | $P_O$ = 29.9213 in. Hg |

The above equation (3) presents a very high accuracy, its altitude error at F=36,000 ft is only 2 inches.

For the altitude reporting in the air traffic control system, the specified lowest altitude is 1,000 ft below sea level, and a special code for reporting is specified. For the purpose of code conversion in this invention, it is convenient to select the altitude measuring reference altitude to be $-1,050$ ft (1,050 ft below sea level), as shown later. By changing the reference altitude to $-1,050$ ft in equation (3), we have:

$$P = P_x e^{5.2561 \, ln(1 - 0.00000682603 \, Fx)} \qquad (4)$$

where
$F_x$: altitude in geopotential measure in ft with the altitude measuring reference altitude $-1,050$ ft,
$P_x$: atmospheric pressure at the altitude $-1,050$ ft = 1,052.292 mb or 31.074 in. Hg Since 1.25 ft is adopted as the unit of measuring altitude in the embodiments described later, substitute $F_x$ by:

$$F_x = 1.25 \, Q \qquad (5)$$

Then, equation (4) is written as:

$$P = P_x e^{5.2561 \, ln(1 - 0.000008532538 \, Q)} \qquad (6)$$

where
Q: numerical value of altitude expressed with 1.25 ft unit

Figure 2A:
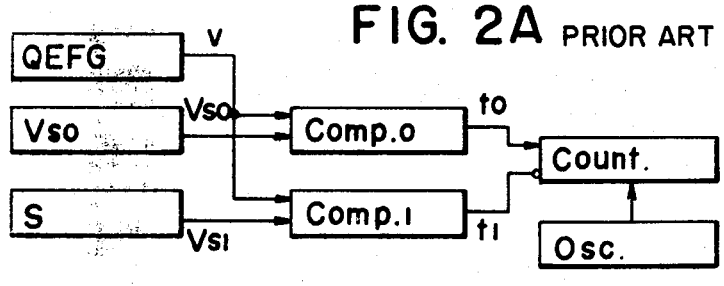

In case other than the altitude reporting, the altitude measuring reference altitude is an altitude determined by the barometric setting. Further in the embodiments, as the frequency of the oscillator Osc. of FIG. 2A is selected to be 1 MHz, in order to obtain the measured altitude Q directly in the counter Count., there must be the following relationship:

$$P/P_x = e^{5.2561 \, ln(1 - 8.532538 \, t)} \qquad (7)$$

where
t: time in sec.

Denoting by $V_{sx}$ the output of the pressure sensor of equation (2) at the altitude measuring reference altitude of $-1,050$ ft, then:

$$V_{sx} = k \, P_x^a \qquad (8)$$

From equations (2) and (8), we have:

$$V_s/V_{sx} = (P/P_x)^a \qquad (9)$$

Substituting equation (9) in equation (7), we get:

$$V_s = V_{sx} e^{5.2561 \, a \, ln(1 - 8.532538 \, t)} \qquad (10)$$

Figure 1:
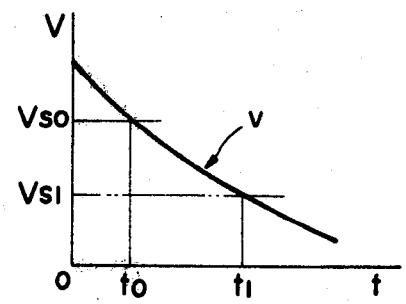
FIG. 1, FIGS. 2A and 2B: Illustrations of the altitude measurement in the prior art.
Figure 2B:
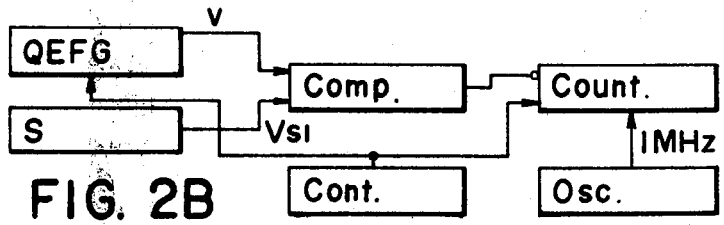
Figure 10:
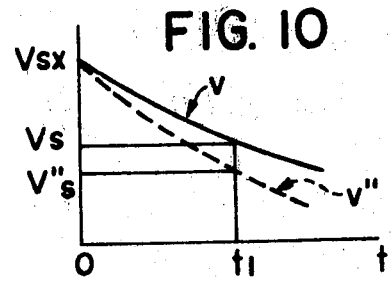
FIG. 10: Illustration of altitude measurement of this invention by the QEFG.

Hence, by means of constructing the QEFG to generate a voltage:

$$v = V_{sx} e^{5.2561 \, a \, ln(1 - 8.532538 \, t)} \qquad (11)$$

the voltage v starts from its initial value of $V_{sx}$ at t=0 and decreases with time, as shown by the solid line curve in FIG. 10, and becomes equal to $V_s$ at the time $t_1$, then the counter content at the time $t_1$ represents the measured altitude Q. In this case, the initial value $V_{sx}$ is a value approximately equal to the output of the pressure sensor when a pressure at the altitude measuring reference altitude is applied. This corresponds to FIG. 1 where both V and $V_{sO}$ are set equal to $V_{sx}$, and since $t_0$ becomes 0, in FIG. 2A, the signal $V_{s0}$ and the first comparator Comp. 0 are eliminated and the counter Count. is controlled to start counting at the instant of the start of the QEFG and to stop counting by the output of the second comparator Comp. 1. FIG. 2B shows the above simplified measurement system in which the controller Cont. starts the QEFG and the counter Count. to count the 1 MHz pulses from the oscillator Osc. at time t=0, and when the QEFG output voltage v becomes equal to the output $V_{s1}$ of the pressure sensor S, the counter is controlled to stop counting by the signal generated by the comparator Comp. The number counted by the counter represents the altitude Q in 1.25 ft unit.

In the embodiments described later, the initial value of v is generally set to $V_{sx}$ as shown in FIG. 10, but its initial value V may also be set to a value higher than the value of $V_{so}$ of FIG. 1 (this corresponds to $V_{sx}$ in FIG. 10) which is the output of the pressure sensor at the altitude measuring reference altitude.

However, in case of a blind encoder, V may be set to a value a little smaller than $V_{so}$ as described later in the method for field calibration. For simplicity, substituting in equation (11):

$$5.2561 = m, \; 8.532538 = c \qquad (12)$$

Then, equation (11) reduces to:

$$v = V_{sx} e^{ma \, ln(1 - ct)} \qquad (13)$$

Figure 11A:
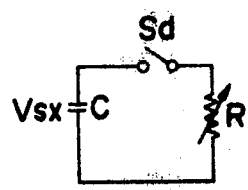
FIGS. 11A and 11B: Illustration of the principle of the QEFG used in this invention.

The voltage v of equation (13) is generated by the GEFG represented by FIG. 11A. In FIG. 11A, the capacitor C which has been charged with the initial voltage $V_{sx}$, is discharged after time t=0 by closing the switch $S_d$ through the varying resistor R, the resistance of which is expressed by:

$$R = R_0(1 - ct) \qquad (14)$$

where $R_0$ is the initial value of resistance at t=0.

It may be proved theoretically that if the capacity C and resistance $R_0$ are set to satisfy a equation:

$$macCR_0 = 1 \quad (15)$$

or, by substituting numerical values of equation (12):

$$aCR_0 = 0.0222976 \quad (16)$$

then the voltage v of equation (13) is generated at the terminals of capacitor C of FIG. 11(A).

Figure 4:
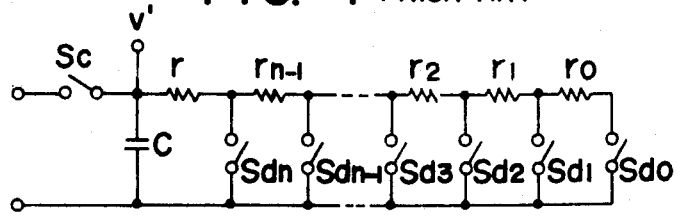
Figure 12:
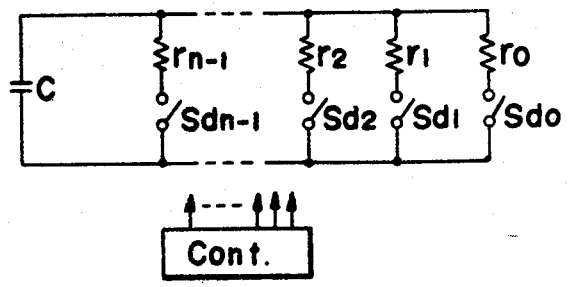
Figure 13:
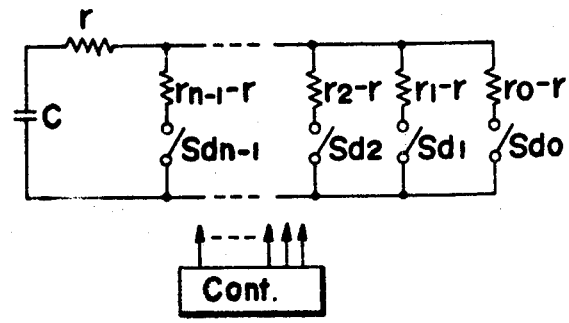

The circuit shown by FIG. 11(A) is an ideal one. For practical purposes, the discharge resistor circuit R may be a circuit constructed with a resistor or resistors whose effective resistance decreases approximately linearly with time. Such an approximate circuit may be realized by the circuits shown by FIG. 4 and FIG. 6 of the prior art, but it is also realized by the circuit shown by FIG. 12. In FIG. 12, the discharge resistor circuit is constructed with n resistors $r_0, r_1, r_2, \ldots, r_{n-1}$, with resistances $r_0 > r_1 > r_2 \ldots > r_{n-1}$, and n switches $S_{d0}$, $S_{d1}, S_{d2}, \ldots, S_{dn-1}$, and the controller Cont. controls the switch $S_{d0}$ to close only for the first time interval of discharge period, and the switch $S_{d1}$ to close only for the second time interval and so on. The time intervals of closure of the switches $S_{d0}, S_{d1}, \ldots$ are determined by the differences of resistances $r_0 - r_1, r_1 - r_2, \ldots$, so that the effective resistance of the discharge resistor circuit decreases linearly, in average, with time. However, if the above differences are all same, the interval of closure of each switch may be same. For measurements of up to 36,000 ft, the difference of resistances of $r_0$ and $r_{n-1}$ is small compared with the resistance of each resistor, so that, the QEFG of FIG. 12 may be modified as shown by FIG. 13. In FIG. 13, a common discharge resistor r is inserted in series in the discharge resistor circuit, and the resistance of each resistor is reduced by r. In this arrangement, the maximum value of resistance allowable for r is limited by $r_{n-1}$ so that $r_{n-1} - r$ remains positive or zero. The QEFG of FIG. 12 or FIG. 13 is suitable for use in a blind encoder as explained later, and the QEFG of FIG. 13 is especially convenient for the simplicity of temperature compensation, because the major factor of the temperature characteristics of QEFG is determined only by the capacity C and the resistor r, when the latter is designed to be the dominating element in the discharge resistor circuit. When the QEFG of FIG. 12 and FIG. 13, the same quasi-exponential function as that generated by the QEFG of FIG. 4 is generated.

Since the values of c and m of equation (15) are constants given by the equation (12), under the design condition described before, even when the characteristics of the pressure sensor is changed and the value of a in equation (2) is changed accordingly, the same altitude measurements are made by changing the value of $CR_0$ to satisfy equation (15) for the varied value of "a". As shown later, the characteristics of the pressure sensor changes with temperature which affects the value of "a" in equation (2), so that, the temperature compensation of the electronic means, without using a thermostat, is accomplished by changing the value of $CR_0$ inversely proportional to the value of "a" at various temperatures. This method of temperature compensation is effective not only for the change of the value of "a" due to the temperature change of the pressure sensor, but also to compensate for the changes in values of the capacitors and resistors of the QEFG due to the temperature variation. That is, since c and m are constants in equation (15), a temperature invariant altitude measurement is accomplished by maintaining the value of $CR_0$ to satisfy equation (15) for the change of any one of "a" C and $R_0$. This is done by adjusting only C, or by adjusting only $R_0$, or by adjusting the combined value of $CR_0$ to satisfy equation (15) when the temperature changes.

The compensation for the offset b, which changes with temperature, is performed by changing the resistance of the resistor circuit to compensate for the offset value contained in the output stage in the pressure sensor, and the compensation for the change of the magnitude of the output of the pressure sensor due to the temperature variation is accomplished by changing the resistance of the resistor circuit in the output stage to control the gain of the pressure sensor.

In the embodiments of this invention, the above temperature compensations are made in response to the output of a temperature sensor placed at the same temperature as the pressure sensor and the QEFG. The characteristics of the temperature sensor may not be linear. According to this invention, as the temperature compensation is made not only for the pressure sensor but also for the QEFG inclusive, a high accuracy altitude measurement is possible without the use of special high cost components or processes.

When the circuit of FIG. 11A is discharging, the time constant of the circuit is CR, if R is constant. If the resistance R varies with time, the instantaneous time constant is CR where R is the instantaneous value of resistance. Hereafter this value CR is called merely the time constant of QEFG.

The instantaneous time constant of the wave form of the quasi-exponential function represented by equation (11) is the reciprocal of the differential coefficient with respect to the time t of the reverse signed exponent of e of the right hand side of the equation and is expressed by:

$$T = (1/a)(1 - 8.532538 \, t/44.847837) \quad (17)$$

This means that, if the constant "a" of the pressure sensor is large, the time constant of the QEFG must be inversely proportionally small.

FIG. 10 shows the physical meaning of the above relationship of "a" and the time constant of the QEFG. Suppose a quasi-exponential function voltage v for a specific value of "a" is represented by the solid line curve in FIG. 10, then a quasi-exponential function voltage "v" for a larger value of "a" is represented by the dotted line which decays faster because of its smaller time constant. On the other hand, referring again to FIG. 8(A) in which it is assumed that the curves represent the pressure VS pressure sensor output which have the same maximum outputs $V_{sx}$ (this value is the same as $V_{sx}$ of FIG. 10), it is recognized that the output at the operating pressure range of a pressure sensor which has a larger value of "a" is smaller than that of a pressure sensor with a smaller value of "a". In FIG. 10, $V_s$ represents the output of "a" pressure sensor with smaller value of a, and $V_s''$ represents the output of a pressure sensor with larger value of "a", and the time $t_1$ represents the measured altitude with a pressure sensor of smaller value of "a" (output $V_s$) and a quasi-exponential function voltage v (with larger time constant), then it is understood that, in order to obtain the same altitude ($t_1$) with a pressure sensor which has a larger value of "a" the time constant of the QEFG must be smaller as shown by the dotted line curve v".

FIG. 14 shows an embodiment of a QEFG designed under the theory described above. Although FIG. 14 is drawn according a type shown by FIG. 12, it may be modified to a type shown by FIG. 13 by inserting a common discharge resistor r. The resistor $r_c$ in the figure is a current limiting resistor for the charging current of the capacitor C. In this circuit, the capacitor C is charged to its initial voltage $V_x$ (this corresponds to $V_{sx}$ of FIG. 10) by the time t=0, and, during the time interval of 0 through 2560 microseconds, the section number thereof is n=0, only the switch $S_{d0}$ is turned on and the electric charge in the capacitor C discharges through resistor $r_0$ and variable resistor $r_{v0}$. During the next time interval of 2560 through 5120 microseconds, where the section number n=1, only the switch $S_{d1}$ is turned on, and the discharge is made through resistors $r_1$ and $r_{v1}$, and so on. Illustrated on the right side of FIG. 14 is a tabulation of the time at which each of the switches is turned on, the altitude referred with sea level at that instant, and the time constant of the QEFG for a=1 at the section. This QEFG may be used basically for altitude measurements of up to 72178 ft (20000 m) by maintaining the value of discharging resistance constant at the instant of time equal to 29711 microseconds which corresponds to an altitude of 36089 ft (11000 m). However, the circuit of this QEFG is designed to be practically suitable for measurements of up to 36000 ft, and the time constants tabulated are slightly different from those calculated by equation (17). The variable resistors $r_{v0}$, $r_{v1}$, ... may be used to set the correct time constants at their corresponding sections when the system is used as an altimeter, but those are used for the purpose of the field calibration when the system is used as a blind encoder as shown later. For the purpose of field calibration, not all of the variable resistors $r_{v0}$, $r_{v1}$, ..., $r_{v11}$ are necessary. When the circuit of FIG. 14 is used as the QEFG of FIG. 2B, the content of the counter Count. of FIG. 2B shows the altitude Q(in 1.25 ft unit) referenced −1050 ft which is the altitude measuring reference altitude used in this invention for altitude reporting.

Although the QEFG's shown by FIG. 3, FIG. 4, FIG. 6, FIG. 9, FIG. 11A, FIG. 12, FIG. 13, FIG. 14 use a single capacitor C, the capacitor may be composed of plurality number of capacitors connected in parallel. The discharge resistor circuit of any one of the above QEFG's are two terminal circuits, irrespective of how complex it may be internally, and each of the two terminals of the discharge resistor circuit is connected to the corresponding terminal of the capacitor.

Figure 11B:
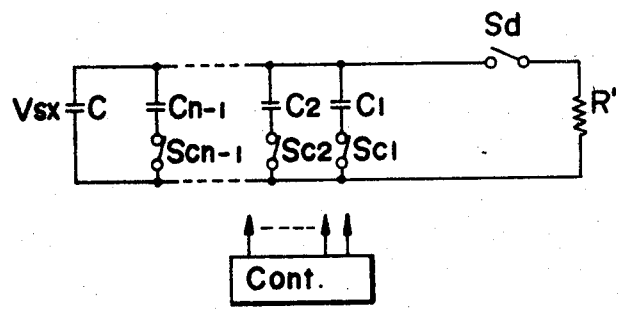

The approximate quasi-exponential function described above may be also generated by a circuit shown by FIG. 11B, in which the time constant of a QEFG is changed by means of changing the capacity, or more exactly, by disconnecting capacitors which are initially connected in parallel in a sequence of time.

In FIG. 11B, the capacitor circuit of QEFG is composed of parallel connected capacitors of C, $c_1$, $c_2$, ..., $c_{n-1}$ which are charged with initial voltage $V_{sx}$ by the time t=0. At the time t=0, the switch $S_d$ is turned on and the capacitors are discharged through the resistor R'. After the first section of time (n=0) has elapsed, the switch $S_{c1}$ is turned off and the capacitor $c_1$ is disconnected from the capacitor circuit, and after the second section of time (n=1) has elapsed, the switch $S_{c2}$ is turned off and the capacitor $c_2$ is disconnected, and so on.

For the measurements of up to 36000 ft, the capacity of the capacitor C is predominating in the capacitor circuit, so that it constitutes the main capacitor of the capacitor circuit and the capacitors $c_1$, $c_2$, ... $c_{n-1}$ are the sectional capacitors which contribute to change the time constants of the QEFG at the sections n=1, 2, ... shown in FIG. 14.

This type of QEFG may be used for the purpose of altitude measurement of this invention, except for use as a blind encoder where field calibration is necessary, and has the feature that temperature compensation can be made only by changing the resistor R'. An approximate temperature compensation may also be made by only changing the capacity of the predominating capacitor C. (Blind Encoder)

Figure 15:
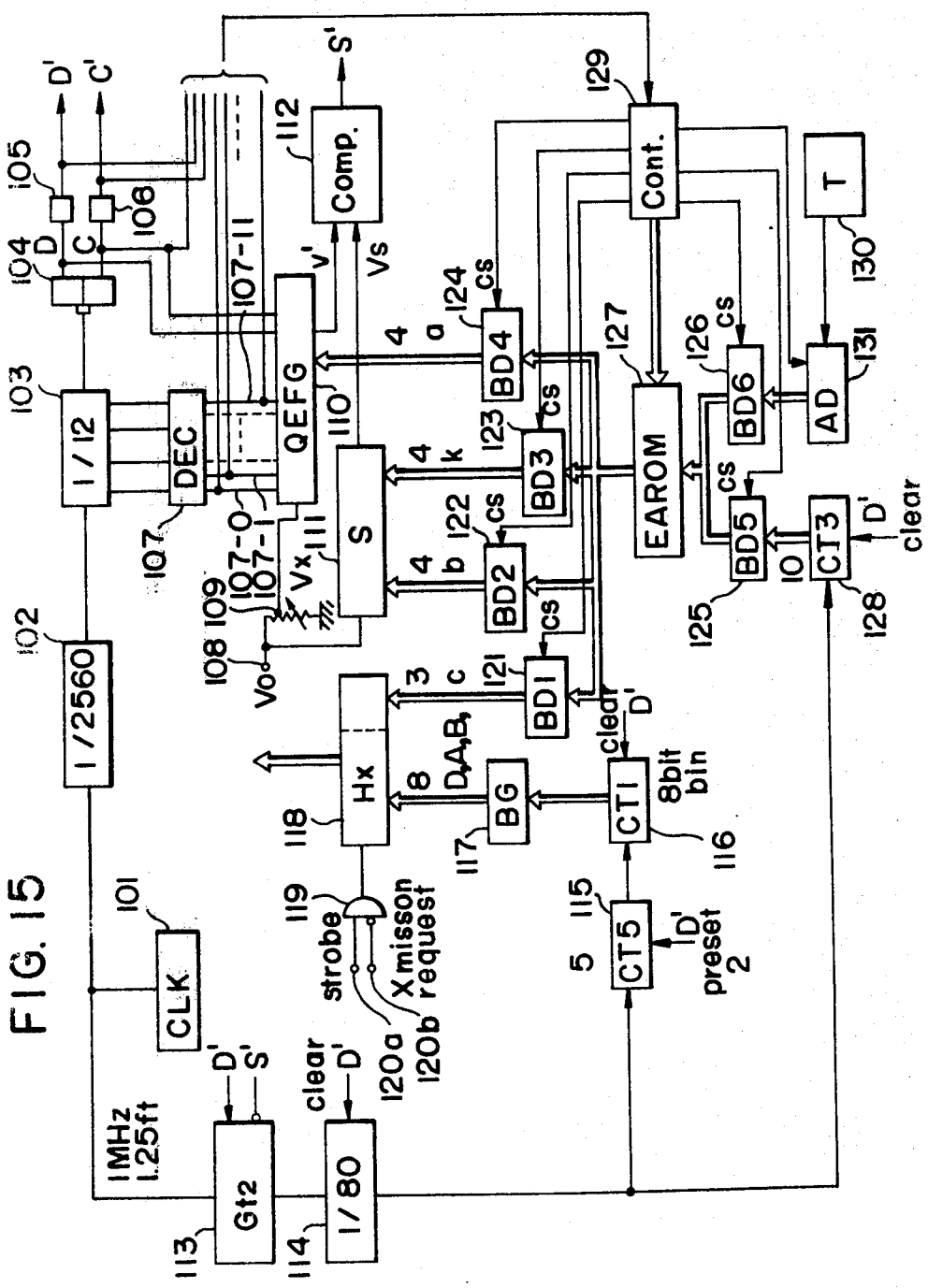
FIG. 15: Circuit of an embodiment of an altimeter for the altitude reporting (blind encoder) of this invention.
Figure 16:
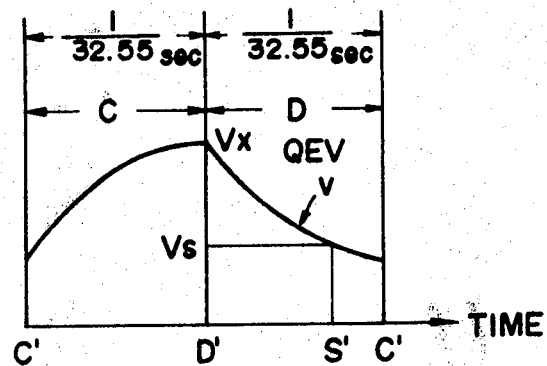
FIG. 16: Illustration for explaining the operation of the blind encoder of FIG. 15.
Figure 17:
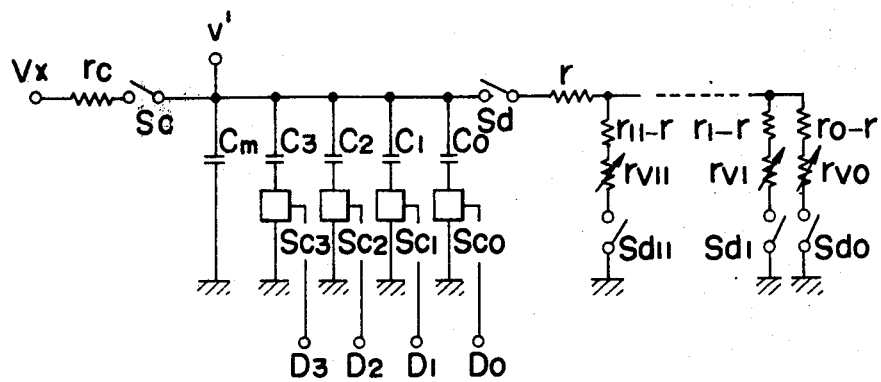
FIG. 17: Circuit diagram of an embodiment of the QEFG with temperature compensation used in this invention.

FIG. 15 shows the block diagram of an embodiment of the blind encoder according to this invention, FIG. 16 illustrates the operation of the blind encoder, and FIG. 17 shows the circuit of QEFG to be used in the blind encoder when temperature compensation is effected by changing the capacity of the capacitor in the QEFG. A blind encoder is a kind of altimeter. However, it does not indicate the measured altitude, but produces, specified altitude reporting code for each 100 ft increment of the altitude above −1000 ft, for the purpose of air traffic control. It is specified that the altitude reported by the blind encoder should be within a deviation of ±125 ft from the indicated altitude of a pilot altimeter installed in the same aircraft. Since there are some errors allowed for by a pilot altimeter, it is necessary to field calibrate a blind encoder to align the altitude to be reported within the specified deviation from the indication of the pilot altimeter. It has been impossible to satisfy the above requirement with the QEFG of the prior art typically shown by FIG. 4 or FIG. 6, and it is now made possible by the use of the type of QEFG's shown by FIG. 12, FIG. 13, FIG. 14 and FIG. 17.

In FIG. 15, label 101 is a clock generator which generates pulses of 1 MHz. One of these pulses corresponds 1.25 ft of altitude. Label 102 is a frequency divider of 1/2560, so that it produces pulses of a 2560 microsecond periods each representing an altitude increment of 3200 ft. Label 103 is a counter of modulus 12 and the overflow pulses therefrom are led to a flip-flop 104 which produces signals C and D alternatively as shown in FIG. 16 with the time intervals of 1/32.55 sec. During the time interval C, the switch $S_c$ of the QEFG shown by FIG. 17 is turned on, the switch $S_d$ is turned off, and the capacitors of the QEFG are charged to the initial voltage $V_x$, and during the time interval of D, the switch $S_c$ is turned off and the switch $S_d$ is turned on and one of the switches $S_{d0}$, $S_{d1}$, ... is turned on in a sequence of time as explained with FIG. 14, and the quasi-exponential function v is generated as shown in FIG. 16. The outputs of the flip-flop 104 are applied to pulse formers 106 and 105 and pulses C' and D' are generated at the instants shown by FIG. 16, in which C' is the charging pulse and D' is the discharging pulse. The counter 103 has 4 bit parallel outputs which are led to a decoder 107 which in turn produces signals to its output lines 107-0 through 107-11. These outputs are fed to the QEFG 110, the detail of which is shown by FIG. 17, and the output at the line 107-0 turns the switch $S_{d0}$ on, output at the line 107-1 turns the switch $S_{d1}$ on and so on. It is clear that by the above operation, an approximate quasi-exponential function voltage v' is generated by the QEFG 110 as explained with respect to FIG. 14.

The charging voltage $V_x$, which corresponds to the initial voltage $V_{sx}$ of FIG. 10, of the QEFG 110 is supplied by a stabilized voltage $V_0$ through a voltage devider 109. The voltage $V_0$ is also used as the source voltage for the pressure sensor 111, so that the effects of small variations of $V_0$ on the QEFG and on the pressure sensor cancel each other. The output voltage v' from the QEFG 110 is led to one of the inputs of the comparator 112, and the output voltage $V_s$ from the pressure sensor 111 is led to the other input of the comparator 112, and when v' becomes equal to $V_s$, a coincidence pulse S' is generated by the comparator 112 as shown by FIG. 16. Label 113 is a gate which is opened by the discharging pulse D' and is closed by the coincidence pulse S', so that the number of 1 MHz pulses which have passed through the gate 113 show the measured altitude Q in 1.25 ft unit with the altitude measuring reference altitude −1050 ft for altitude reporting. Label 114 is a frequency divider of 1/80 and is cleared by the pulse D', so that each of the output pulses from the frequency divider 114 shows an altitude increment of 100 ft above the reference altitude of −1050 ft. Label 115 is a counter of modulus 5 and is preset with 2 by the pulse D' and counts the output pulses from the divider 114, and the over-flow pulses from the counter 115 is counted by a 8 bit binary counter 116 which is cleared by the pulse D'. Label 128 is a decimal counter of modulus 10 and is cleared by the pulse D' and counts the output pulses from the divider 114. As a result, the relation of the contents of counters 115, 116 and 128 and the altitudes of 100 ft step above −1050 ft will be as shown by the four left side columns of Table 1, in which altitude at the extreme left column shows the altitude starting from −1050 ft, CT5, CT1, CT3 show the contents of counters 115, 116, 128 respectively, where, although the counter 116 is a binary counter, its content is expressed by decimal numbers.

TABLE 1

| Altitude | CT5 (Counter 115) | CT1 (Counter 116) | CT3 (Counter 128) | Altitude | $D_4$ | $A_1$ | $A_2$ | $A_4$ | $B_1$ | $B_2$ | $B_4$ | $C_1$ | $C_2$ | $C_4$ |
|---|---|---|---|---|---|---|---|---|---|---|---|---|---|---|
| −1050 to −950 | 2 | 0 | 0 | −1000 to −950 | 0 | 0 | 0 | 0 | 0 | 0 | 0 | 0 | 1 | 0 |
| −950 to −850 | 3 | 0 | 1 | −950 to −850 | 0 | 0 | 0 | 0 | 0 | 0 | 0 | 1 | 1 | 0 |
| −850 to −750 | 4 | 0 | 2 | −850 to −750 | 0 | 0 | 0 | 0 | 0 | 0 | 0 | 1 | 0 | 0 |
| −750 to −650 | 0 | 0 | 3 | −750 to −650 | 0 | 0 | 0 | 0 | 0 | 0 | 1 | 1 | 0 | 0 |
| −650 to −550 | 1 | 0 | 4 | −650 to −550 | 0 | 0 | 0 | 0 | 0 | 0 | 1 | 1 | 1 | 0 |
| −550 to −450 | 2 | 1 | 5 | −550 to −450 | 0 | 0 | 0 | 0 | 0 | 0 | 1 | 0 | 1 | 0 |
| −450 to −350 | 3 | 1 | 6 | −450 to −350 | 0 | 0 | 0 | 0 | 0 | 0 | 1 | 0 | 1 | 1 |
| −350 to −250 | 4 | 1 | 7 | −350 to −250 | 0 | 0 | 0 | 0 | 0 | 0 | 1 | 0 | 0 | 1 |
| −250 to −150 | 0 | 1 | 8 | −250 to −150 | 0 | 0 | 0 | 0 | 0 | 1 | 1 | 0 | 0 | 1 |
| −150 to −50 | 1 | 1 | 9 | −150 to −50 | 0 | 0 | 0 | 0 | 0 | 1 | 1 | 0 | 1 | 1 |
| −50 to +50 | 2 | 2 | 0 | −50 to +50 | 0 | 0 | 0 | 0 | 0 | 1 | 1 | 0 | 1 | 0 |
| +50 to +150 | 3 | 2 | 1 | +50 to +150 | 0 | 0 | 0 | 0 | 0 | 1 | 1 | 1 | 1 | 0 |
| +150 to +250 | 4 | 2 | 2 | +150 to +250 | 0 | 0 | 0 | 0 | 0 | 1 | 1 | 1 | 0 | 0 |
| +250 to +350 | 0 | 2 | 3 | +250 to +350 | 0 | 0 | 0 | 0 | 1 | 0 | 1 | 0 | 0 | 0 |
| +350 to +450 | 1 | 3 | 4 | +350 to +450 | 0 | 0 | 0 | 0 | 1 | 0 | 1 | 0 | 1 | 0 |

Figure 18:
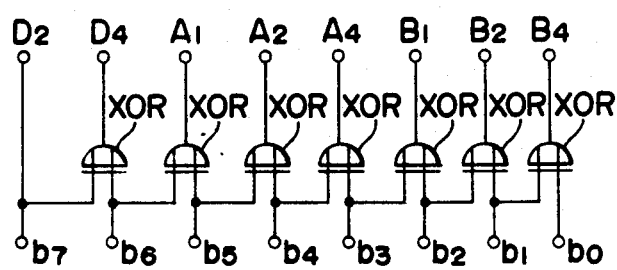
FIG. 18, FIG. 19: Examples of code convertor for altitude reporting.

On the other hand, the code of the altitude reporting for the air traffic control system is shown at the right half portion of the same table. This is specified in the International (ICAO) Standard Code for S.S.R. Pressure Altitude Transmission, and is the same as what is specified by the U.S. National Standard for Common System Component Characteristics for IFF Mark X (SIF)/Air Traffic Control Radar Beacon System SIF-/ATCRBS. The code specified above is composed of eleven bits: $D_2D_4A_1A_2A_4B_1B_2B_4C_1C_2C_4$, but up to the altitude of 36000 ft $D_2$ is 0. The 8 bits $D_2D_4A_1A_2A_4B_1B_2B_4$ are all zero's for the altitudes belows −750 ft, and for the altitudes above −750 ft, the 8 bits are the gray code of the altitude measured with 500 ft steps starting from 1 for the first 500 ft step of −750 through −250 ft. Hence, the above 8 bits are obtained by converting the content of the counter 116 to gray code. This binary to gray code conversion is performed by the well-known circuit of FIG. 18, in which the seven XOR's are exclusive OR circuits, $b_7$ through $b_0$ comprises the information read out from the counter 116, and $D_2D_4A_1A_2A_4B_1B_2B_4$ are the above 8 bits of the reporting code. In FIG. 15, the label 117 is a binary to gray code converter as shown by FIG. 18 by which the content of the counter 116 is converted to gray code and stored in the upper 8 bits positions of the transmission register 118.

The lower three bits $C_1C_2C_4$ of the altitude reporting code is a special code, but it has a definite relationship with the content of the counter 128 as shown by Table 1. So that, the conversion of the content of the counter 128 to the code $C_1C_2C_4$ can be made by means of a conversion table. In the embodiment of FIG. 15, this conversion table is stored in a electrically alterable read only memory (EAROM) 127. The conversion is done by reading out the content of the counter 128 through a bus driver 125 and apply it to the EAROM 127 as a relative address, and the addressed information in the 127 is read out and written in the lower three bit positions of the transmission register 118 through the bus driver 121. This is described more in detail with respect to FIG. 31. However this invention is not limited to the above table look up type code conversion.

Figure 19:
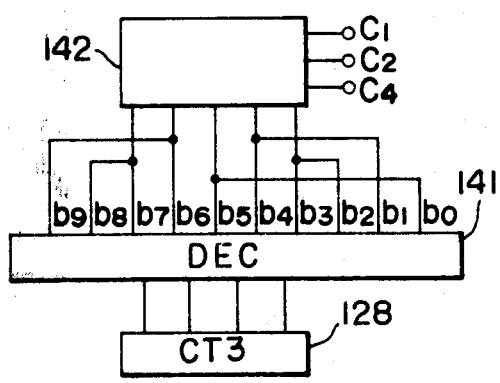

FIG. 19 shows another type of code conversion for $C_1C_2C_4$, utilizing the diode matrix type converter. In the figure, label 128 is the counter 128 of FIG. 15, 141 is a decoder and 142 is a diode matrix. The content of the counter 128 is read out and applied to the input of the decoder 141, which produces a signal to one of its output lines $b_0$ through $b_9$. Since, as shown in the Table 1, the contents 0 and 5, 1 and 4, 2 and 3, 6 and 9, 7 and 8 of the counter 128 are converted respectively to identical codes of $C_1C_2C_4$, the output lines $b_0$ and $b_5$, $b_1$ and $b_4$, $b_2$ and $b_3$, $b_6$ and $b_9$, $b_7$ and $b_8$ are connected and only five input lines are enough for the diode matrix 142. In correspondence to each of the input lines, the diode matrix produces a code $C_1C_2C_4$ by the conventional technique.

Another method of converting the content of the counter 128 to the code $C_1C_2C_4$ by a circuit using gates is known and may be used for this invention.

The label 119 of FIG. 15 is a gate to strobe the transmission register 118. This strobe may be done either by pulse C' or D' applied to the terminal 120a, however this strobe is inhibited by a signal applied to the terminal 120b while transmission is being requested from the ground station. (Principle of Temperature Compensation)

Next, the principle of temperature compensation of this invention is explained.

TABLE 2

| P PRES- SURE bar | TEMPERATURE | | | | | |
|---|---|---|---|---|---|---|
| | −30° C. | | +25° C. | | +70° C. | |
| | V | S | V | S | V | S |
| 0.240 | 2.692 | 2.691 | 2.700 | 2.699 | 2.695 | 2.694 |
| 0.375 | 3.083 | 3.083 | 3.093 | 3.094 | 3.088 | 3.089 |
| 0.510 | 3.475 | 3.475 | 3.486 | 3.487 | 3.481 | 3.482 |
| 0.645 | 3.867 | 3.867 | 3.880 | 3.880 | 3.874 | 3.874 |
| 0.780 | 4.258 | 4.258 | 4.273 | 4.272 | 4.266 | 4.265 |
| 0.915 | 4.650 | 4.649 | 4.665 | 4.664 | 4.657 | 4.656 |
| 0.1050 | 5.040 | 5.040 | 5.054 | 5.055 | 5.046 | 5.046 |
| a | 0.9981 | | 0.9923 | | 0.9908 | |
| b | 1.9928 | | 1.9995 | | 1.9848 | |
| k | 2.9026 | | 2.9196 | | 2.9170 | |

$S = kP^a + b$

Table 2 shows, as an example, the characteristics of the pressure transducer of Type aP3005 made by Cognition Inc. The table shows the output voltage V(volt) of the pressure transducer at the pressure P(bar) measured at three temperatures −30°, +25°, +70° C., and the value S calculated by the approximate equation (1). The values of three constants a, b, k of the equation (1) for the above three temperatures are shown at the the lower section of the table. These values are determined by the art of mathematics once the outputs of the pressure transducer are measured at several sampling points of pressure under the temperature of interest. The table proves that the equation (1) represents the characteristics of the pressure transducer with high accuracy even the temperature changes by means of changing the values of constants a, b, k according to the temperature. This also enables to obtain the offset compensated value of the output of the pressure transducer ($kP^a$ of equation (1)) at any pressure and temperature precisely, such offset needed in the process of temperature compensation as described later. This is true not only for the above mentioned specific type of pressure transducer.

The temperature change of −30° C. to 25° C. of this transducer would result in a measured altitude error of about 224 ft at the altitude of 35000 ft if temperature compensation is not made, so that it is desirable to reduce the error one order of magnitude by adopting the method of temperature compensation. The temperature compensation of this invention is made by:

(1) compensation of the offset b, in the output stage of the pressure sensor, at various temperatures so that the pressure sensor produces the output $V_s$ expressed by equation (2), (2) control of the gain of the output stage of the pressure sensor, so that the output $V_s$ of equation (2) of the pressure sensor at the pressure of the altitude measuring reference altitude, which corresponds to $V_{sx}$ of FIG. 10, being kept constant at various temperatures, (3) changing the time constant $CR_0$ of the QEFG to satisfy equation (15) at various temperatures even when the value of "a" varies with temperature. This is made by changing the value of capacity or resistance of the QEFG. This technique is common with that for the compensation of temperature variation of the capacity or resistance of QEFG itself. So that, the compensation for the temperature variation of "a" and for the temperature variation of capcity and resistance of QEFG are made in the same way simultaneously.

Above three methods show the principle of the temperature compensation of this invention. However, depending on the temperature characteristics of the components used, all of the three method may not be necessary to be adopted. The details of above method (3) is explained below first. When the altitude measuring reference altitude is −1050 ft, the temperature compensation for a and QEFG is done according to equation (16).

Suppose the value of "a" at an operating temperature is 1% smaller than the value at the normal temperature of design, then, to satisfy equation (16), the value of $CR_0$ should be increased by 1% at the operating temperature than at the normal temperature. This is attained either by keeping $R_0$ constant and increasing C by 1%, or by keeping C constant and increasing $R_0$ by 1%, or by increasing combined value $CR_0$ by 1%.

In a practical case, since the capacitors and resistors of QEFG are also affected by temperature, compensation for the temperature variations of capacitors and resistors of QEFG may be made at the same time. For example, suppose the capacity C increases 0.2%, resistance $R_0$ increases 0.3%, then $CR_0$ should be increased by 0.5% at the operating temperature to compensate for the 1% decrease of the value of "a". If C increases 0.5% and $R_0$ increases 0.8% at the operating temperature, $CR_0$ should be decreased by 0.3% for the overall compensation. General principles for such compensation is described later with FIG. 20 and FIG. 22. When the QEFG used is a type shown by FIG. 4, it is better to change the capacity C rather than to change the many resistances $r_0$, $r_1$, . . . , $r_{n-1}$ for the temperature compensation, but, since the resistances $r_0$, $r_1$, . . . , $r_{n-1}$ can be made much smaller than r, an approximate temperature compensation may be done by changing the resistance r only. Similarly the temperature compensation with the QEFG of FIG. 13 is approximately done by changing the resistance r, if it is designed to be the dominating factor of the discharge resistor circuit. When the QEFG is a type shown by FIG. 6 or FIG. 37 which is explained later, it is enough to change the resistance R"(label 156) for the purpose of temperature compensation.

FIG. 17 shows a temperature compensation scheme for a QEFG effected by changing the capacity C of FIG. 13. In FIG. 17, $C_m$ is the major capacitor of the QEFG and $C_3$, $C_2$, $C_1$, $C_0$ are the minor capacitors to change the combined capacity for the temperature compensation. The capacitors $C_3$, $C_2$, $C_1$, $C_0$ are connected in parallel to the major capacitor $C_m$ when the switches $S_{c3}$, $S_{c2}$, $S_{c1}$, $S_{c0}$ are turned on respectively, and when connected, the combined capacity performs the roll of C of FIG. 13. It is noted that in FIG. 17, the arrangement of the major capacitor $C_m$ and the minor capacitors $C_0$, $C_1$, $C_2$, $C_3$ and the switches $S_{c0}$, $S_{c1}$, $S_{c2}$, $S_{c3}$ looks apparently similar to the main capacitor C and the sectional capacitors $c_1$, $c_2$, ..., $c_{n-1}$ and the switches $S_{c1}$, $S_{c2}$, ..., $S_{cn-1}$ of FIG. 11B, their functions are entirely different. That is, in FIG. 17 they are configured for temperature compensation, whereas they are used for function generation in FIG. 11 B. The capacities of the minor capacitors are selected to be $C_3 = 2C_2 = 4C_1 = 8C_0$. The switches $S_{c3}$, $S_{c2}$, $S_{c1}$, $S_{c0}$ are turned on when and only when any of the corresponding binary bits $D_3$, $D_2$, $D_1$, $D_0$ is logical "1". The binary information $D_3D_2D_1D_0$ is derived by converting the 4 bit digitalized output $d_3d_2d_1d_0$ of a temperature sensor as shown later. The values of the capacities of $C_m$, $C_0$ and the binary information $D_3D_2D_1D_0$ are determined, as is explained by FIG. 20, to satisfy best the following equation in the operating range of temperature:

$$C = C_m + C_3D_3 + C_2D_2 + C_1D_1 + C_0D_0 \qquad (18)$$
$$= C_m + (8D_3 + 4D_2 + 2D_1 + D_0)C_0$$

Figure 20:
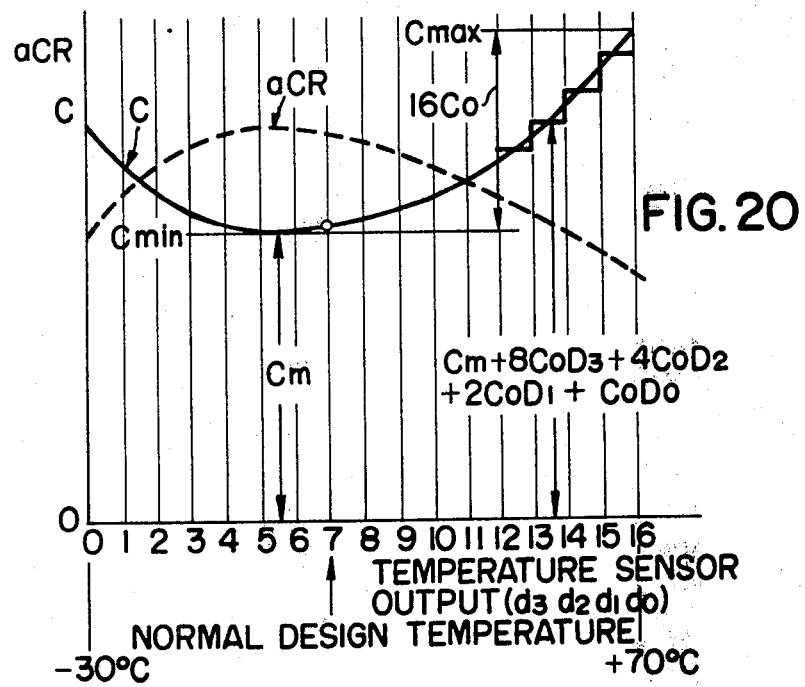
FIG. 20: Illustration of the temperature compensation when it is made by the capacitor of the QEFG.

FIG. 20 illustrates how to determine C, $C_m$, $C_0$ and $D_3D_2D_1D_0$ in equation (18) according to the temperature characteristics of the pressure sensor and the QEFG. The horizontal axis of FIG. 20 is divided into sixteen divisions to cover the operating temperature range of $-30°$ C. through $+70°$ C. with a 4 bit binary number $d_3d_2d_1d_0$ which is obtained by digitizing the output of a temperature sensor placed at the same temperature as the pressure sensor and the QEFG. The digital output $d_3d_2d_1d_0$ of the temperature sensing device represents the temperature of the pressure sensor and the QEFG, but it is not needed to be in a linear relationship with the temperature. The temperature compensation of the aforementioned method (3) is made as follows. At the properly selected test temperatures in the operating temperature range, measure the characteristics of the pressure sensor and determine the values of "a" at the above test temperatures, and also measure the values of CR(or $CR_0$ of equation (16)) at the test temperatures. Using these values, the values of aCR can be plotted against the digital outputs $d_3d_2d_1d_0$ of the temperature sensing device, as shown by the dashed line curve. Next, draw a curve, shown by the solid line, which passes through a point representing the value of the capacity C at the normal temperature of design, which is marked with a small circle, and inversely proportional to the dashed line curve at each division of the horizontal axis. Find out the minimum value $C_{min}$ and the maximum value $C_{max}$ of the solid line curve, then $C_m$ and $C_0$ of equation (18) are determined by:

$$C_m = C_{min} \qquad (19)$$
$$16C_0 = C_{max} - C_{min}$$

Next, prepare a table to convert $d_3d_2d_1d_0$ to $D_3D_2D_1D_0$ so that at each division of the horizontal axis, the value of C expressed by equation (18) represents best the solid line curve. In FIG. 20 an example of conversion is shown at the division where $d_3d_2d_1d_0$ is 13 in decimal numbers. By converting the digital output $d_3d_2d_1d_0$ of the temperature sensing device to $D_3D_2D_1D_0$ according to the above conversion table, and applying digital information $D_3D_2D_1D_0$ to the switches $S_{c3}$, $S_{c2}$, $S_{c1}$, $S_{c0}$ of FIG. 17, the temperature compensation for the variation of "a" of the pressure sensor and the QEFG is accomplished.

The method of temperature compensation described above uses binary signal $D_3D_2D_1D_0$ to control the switches $S_{c3}$, $S_{c2}$, $S_{c1}$, $S_{c0}$ of FIG. 17. This method is effective to make fine temperature compensation with a small number of minor capacitors $C_3$, $C_2$, $C_1$, $C_0$ of FIG. 17. However, this invention is not limited by the above method. The other method uses a temperature sensing device shown by FIG. 21, in which T is a temperature sensor and LD is a level detector. It operates in such a manner that at the lowest devision of temperature a signal appears at the terminal $D_0$, at the next higher division of temperature a signal appears at the terminal $D_1$, and so on. By applying the signals at the terminals $D_0$, $D_1$, $D_2$, $D_3$ of FIG. 21 to the inputs $D_0$, $D_1$, $D_2$, $D_3$, of FIG. 17, and by dividing the horizontal axis of FIG. 20 into four divisions corresponding to $D_0$, $D_1$, $D_2$, $D_3$, and by assigning the capacity $C_0$, $C_1$, $C_2$, $C_3$ of FIG. 17 with the difference of $C - C_{min}$ at each division of FIG. 20, compensation for the temperature variation of the QEFG and for the temperature variation of "a" of the pressure sensor is possible.

Figure 22:
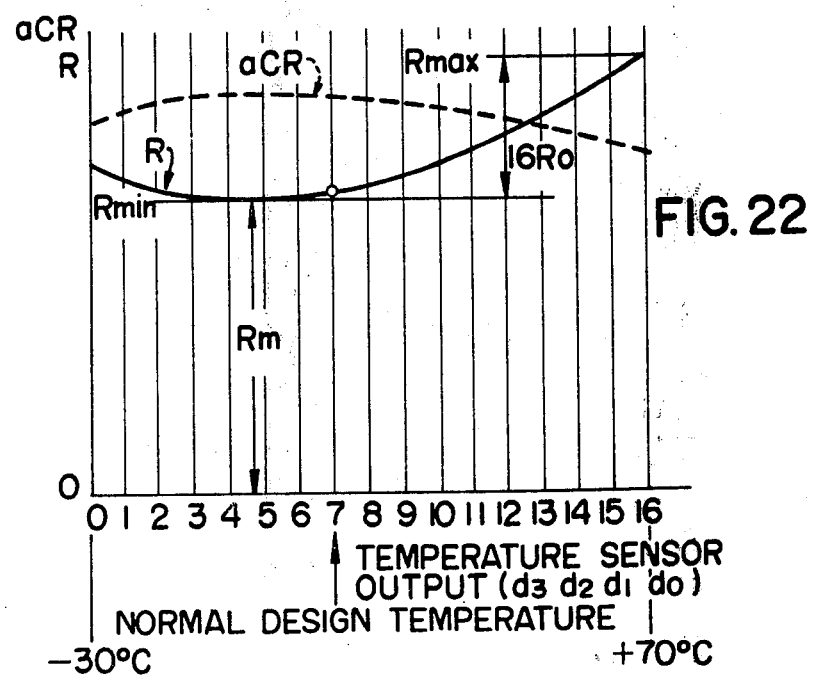
FIG. 22: Illustration of the temperature compensation when it is made by the discharge resistor circuit of the QEFG.

The temperature compensation described above changes the capacity of the QEFG. The same objective can be attained by changing the discharge resistance of the QEFG. This is explained with FIG. 22. The horizontal axis and the dashed line curve of the figure are same as those of FIG. 20. The solid line curve of FIG. 22 is a curve which passes through a point representing the value of the discharge resistance of the QEFG at the normal temperature of design, which is marked with a small circle, and proportional to 1/aCR. Let's denote by $R_{max}$ and $R_{min}$ the maximum value and the minimum value of the solid line curve, and determine the value $R_0$ by $$16R_0 = R_{max} - R_{min} \qquad (20)$$

Figure 7:
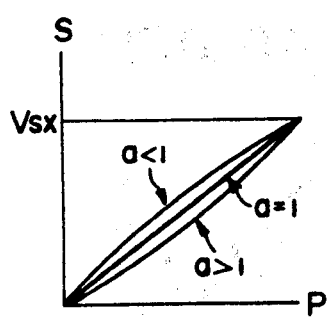

(This $R_0$ is different from $R_0$ of equation (14) or $R_0$ of FIG. 7.)

Figure 6:
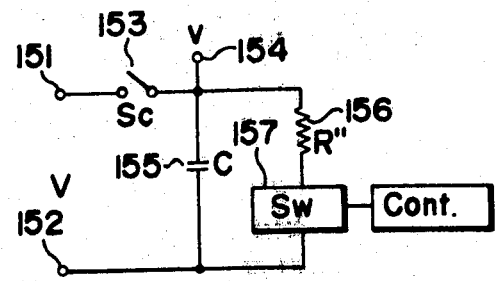

Substitute the resistor R" of the QEFG of FIG. 6 with the resistor circuit for temperature compensation shown by FIG. 23A. Then, the temperature compensation is done, in a similar way as has been explained with FIG. 20, by controlling the switches $S_{r3}$, $S_{r2}$, $S_{r1}$, $S_{r0}$ to be turned on only when the corresponding digital signals $\overline{D_3}$, $\overline{D_2}$, $\overline{D_1}$, $\overline{D_0}$, which are the complements of $D_3$, $D_2$, $D_1$, $D_0$ respectively, are a logical "1". The digital information signal values $D_3D_2D_1D_0$ are determined so that the solid line curve of FIG. 22 is best represented by the following equation:

$$R = R_m + 8R_0D_3 + 4R_0D_2 + 2R_0D_1 + R_0D_0 \quad (21)$$

where $R_m = R_{min}$

Figure 21:
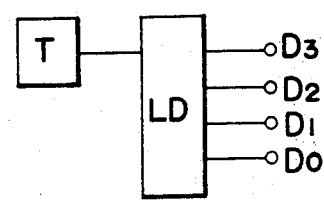
FIG. 21: A level detector to be used for the control of the temperature compensation.

It will be clear that another method of temperature compensation comprises changing the discharge resistance of the QEFG by substituting the discharge resistor circuit of FIG. 23A with the circuit of FIG. 23B and controlling the switches $S_{r0}$, $S_{r1}$, $S_{r2}$, $S_{r3}$ respectively by the output signals $D_0$, $D_1$, $D_2$, $D_3$ of the level detector of FIG. 21.

The method of temperature compensation described above for the pressure sensor characteristics and for the QEFG has been used on the type of the QEFG shown by FIG. 11A, and it can be used similarly on the type of QEFG shown by FIG. 11B. In the QEFG of FIG. 11B, the temperature compensation can be effected by substituting the resistor R' with the circuit of FIG. 23A or B. It can also be approximated by substituting the main capacity C of FIG. 11B with the capacitors $C_m$, $C_3$, $C_2$, $C_1$, $C_0$ of FIG. 17.

The temperature compensation by the resistors and switches as shown by FIG. 23A, may cause some error when the amount to be compensated is small and the resistance $R_0$ (of equation (20)) is low, due to the residual resistances (on resistances) of the switches. FIG. 24 explains the principle of eliminating such error. In FIG. 24, a resistance $x_0$ is connected in series with the resistance $R_0$, and this serial circuit is shunted by a switch $S_r$, and this resultant circuit is further connected in series with a negative resistance $-x_0$. (In this FIG. 24, which illustrate the principle, $-x_0$ is a negative value. However in the practical case, the negative resistance is connected to another resistance to result in a positive value as shown later.) When the switch $S_r$ is turned off, since its off resistance is very much higher compared with the low resistance $R_0$, the total resistance of the circuit of FIG. 24 is $R_0$. When the switch $S_r$ is turned on, the total resistance of the circuit is expressed by:

$$-x_0 + \frac{1}{\frac{1}{r} + \frac{1}{R_0 + x_0}} \quad (22)$$

where r: residual resistance of the switch $S_r$. This value becomes 0(zero) when:

$$x_0 = \tfrac{1}{2}(\sqrt{R_0^2 + 4rR_0} - R_0) \quad (23)$$

This proves that, with the above value of $x_0$, the total resistance of the circuit of FIG. 24 is 0 when the switch $S_r$ is turned on and is $R_0$ when the switch $S_r$ is turned off, namely, the circuit performs as if the switch is an ideal one.

Therefore, the inaccuracies caused by the residual resistances r's of the switches $S_{r0}$, $S_{r1}$, $S_{r2}$, $S_{r3}$ of FIG. 23A can be eliminated by the use of the circuit shown by FIG. 25. The values of resistances $x_0$, $x_1$, $x_2$, $x_3$ are given by:

$$x_0 = \tfrac{1}{2}(\sqrt{R_0^2 + 4rR_0} - R_0) \quad (24)$$
$$x_1 = \tfrac{1}{2}(\sqrt{4R_0^2 + 8rR_0} - 2R_0)$$
$$x_2 = \tfrac{1}{2}(\sqrt{16R_0^2 + 16rR_0} - 4R_0)$$
$$x_3 = \tfrac{1}{2}(\sqrt{64R_0^2 + 32rR_0} - 8R_0)$$

The resistor circuits configured as FIG. 23 or FIG. 25 can be used wherever it is needed to change a resistance of a circuit in accordance with the output of the temperature sensor for the purpose of temperature compensation of this invention.

The above description is made in which the temperature compensation is done by changing the resistor R'' of FIG. 6. The same method can be applied to change the resistor R' of FIG. 11B for temperature compensation or to change the common resistor r of the discharge resistor circuit of FIG. 4 or FIG. 13 for approximate temperature compensation.

FIG. 26A shows a circuit involved in the pressure sensor to compensate for the offset b of the pressure transducer (b of equation (1)), and to compensate for the variation of the magnitude of the output signal of the pressure sensor due to temperature changes at the pressure of the altitude measuring reference altitude. In FIG. 26A, label 51 is the pressure transducer to which the static pressure 50 is applied and its output signal of equation (1) is generated at the terminal 52. The circuit between terminals 52 and 55 is the output stage of the pressure sensor, and the voltage divider composed of resistor circuits $R_{01}$ and $R_{02}$ generates offset compensation voltage, and the voltage divider composed of resistor circuits $R_{g1}$ and $R_{g2}$ and enclosed by dashed line 54 serves to regulate the output signal and provides a gain to produce an output signal in proportion to:

$$R_{g2}/(R_{g1} + R_{g2}) \quad (25)$$

The circuit 54 may be substituted by a feed back amplifier shown by FIG. 26B which is composed of an amplifier 58 with an input resistor circuit $R_i$ and a feedback resistor circuit $R_f$ and provides a gain which is proportional to:

$$R_f/R_i = R_{g2}/(R_{g1} + R_{g2}) \quad (26)$$

Figure 27:
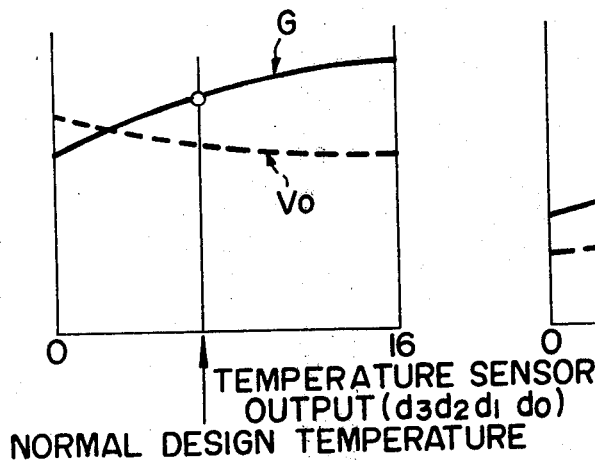
FIG. 27: Illustration of the control of the gain of the pressure sensor for the temperature compensation.
Figure 28:
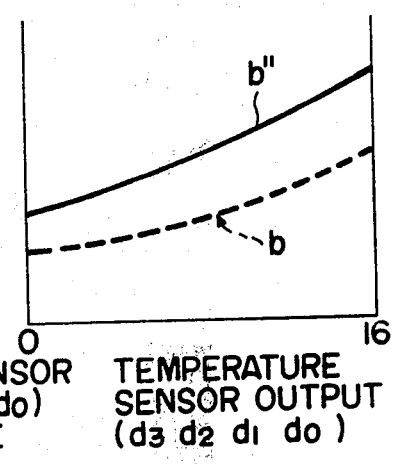
FIG. 28: Illustration of the offset and drift compensation of the pressure transducer for the temperature compensation.

The horizontal axes of FIG. 27 and FIG. 28 are the outputs of the temperature sensing device same as those of FIG. 20 and FIG. 22. The characteristics of the pressure transducer is measured at various temperatures and the offset b's at those temperatures are determined by equation (1). These offset b's are plotted against the outputs of the temperature sensing device as shown by the curve b of FIG. 28. In the output stage of FIG. 26A, there are involved components such as amplifiers 53 and 58 which have drifts varying with temperature. By adding the amount of drifts transfered to the input of the amplifier 53 to the offset b, we have the curve b''. This total value (b'') of offset plus drift can be eliminated by means of applying suitable voltages to the terminals 56 and 57 and using one of the resistor circuits of FIG. 23 and FIG. 25 in place of one of the resistor circuits $R_{01}$ and $R_{02}$ and by controlling it in similar way as have been explained with FIG. 22 and FIG. 23 or FIG. 25. However, the method of offset and drift compensation of this invention is not limited to the circuit explained above. It is clear that the compensation can be made with the summing amplifier instead of the differential amplifier 53 of FIG. 26A. Further, in the above description the offset and the drifts are compensated for by a same technique, however for the purpose of the drift compensation, the well-known technique of auto-zeroing is available in the output stage of the pressure sensor while it is idle during the charging period (period C of FIG. 16) of QEFG. When this technique is adopted, the resistor circuits of $R_{01}$ and $R_{02}$ are used only for the purpose of compensating for the offset b.

Next, let's denote by $V_0$ the offset compensated output of the pressure transducer at the pressure of the altitude measuring reference altitude. The values of $V_0$ at various temperatures are determined by measuring the characteristics of the pressure transducer at those temperatures and by representing them by equation (1), and can be plotted against the digital outputs of the temperature sensing device as shown by the dashed line curve $V_0$ of FIG. 27. Then, draw a curve as shown by the solid line curve G of FIG. 27 which passes through the point representing the gain of the output stage of the pressure sensor at the normal temperature of design, marked with a small circle in FIG. 27, and inversely proportional to the curve $V_0$ at every division of the horizontal axis. By setting the gain of the output stage of the pressure sensor at various temperatures equal to the value represented by the curve G thus drawn, we have the same output voltage of the pressure sensor at the pressure of the altitude measuring reference altitude irrespective of temperature, as shown by FIG. 8A. The setting of the gain is attained by means of using one of the resistor circuit of FIG. 23 and FIG. 25 in place of one of the resistor circuits $R_{g1}$ and $R_{g2}$ of FIG. 26A, or in place of one of the resistor circuits $R_i$ and $R_f$ of FIG. 26B, and by controlling them in similar way as has been explained with FIG. 22 and FIG. 23 or FIG. 25. It is noted that, in this invention, the switches $S_{d0}$, $S_{d1}$,—of FIG. 4, FIG. 12, FIG. 13, FIG. 14, FIG. 17 and the switches $S_w$ of FIG. 6, FIG. 37 (label 157) are those used for quasi-exponential function generation, whereas the switches $S_{r0}$, $S_{r1}$, $S_{r2}$, $S_{r3}$ of FIG. 23, FIG. 25 are those for the temperature compensation even when the resistors circuits of FIG. 23 or FIG. 25 are used in the discharge resistor circuit of the QEFG.

With the methods described above, a high precision altitude measurement is possible even when the characteristics of the pressure transducer, the output stage of the pressure sensor or the QEFG are affected by temperature. (Embodiment of Temperature Compensation, FIG. 15)

An explanation of an embodiment for the temperature compensation of a blind encoder is given below with respect to FIG. 15.

The label 130 of FIG. 15 denotes a temperature sensor. This may be a linear sensor such as Type AD590 of Analog Devices, but high linearity is not needed. Even a thermistor, which exhibits a remarkable nonlinearity, may be used when linearized to some degree in combination with a resistance network.

Figure 29:
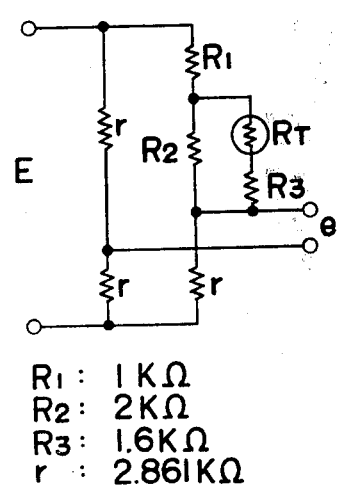
FIG. 29: An example of a circuit of the temperature sensor in which a thermistor is used as a sensing element.
Figure 30:
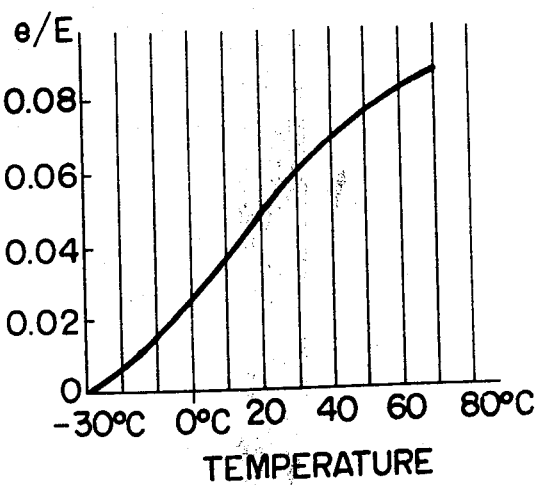
FIG. 30: The characteristics of the temperature sensor of FIG. 29.

FIG. 29 shows an example, in which a bridge having three arms with resistances r's and one arm with resistances $R_1$, $R_2$, $R_3$ and a thermistor $R_T$. The values of resistances are as shown in the figure. As for the thermistor, one specified by the Table 5 of JIS (Japanese Industrial Standard) C1611 and of nominal resistance 6K OHM is used. Then, the output of the bridge is as shown by FIG. 30 in which the horizontal axis denotes the temperature and the vertical axis represents the ratio of the output voltage e to the source voltage E of the bridge. A non-linearity as shown by FIG. 30 is tolerable for use as a temperature sensor of FIG. 15.

The output of the temperature sensor 130 is converted to a 4 bit binary digital value by an analog to digital converter 131, which together with the temperature sensor forms the temperature sensing device. This 4 bit digital value is the $d_3d_2d_1d_0$ of FIG. 20, FIG. 22, FIG. 27 and FIG. 28. The output $d_3d_2d_1d_0$ from the analog to digital converter 131 is applied as the lower four bits of an 8 bit address to the electrically alterable read only memory (hereafter acronymed as EAROM) 127 through a driver 126 which is activated by a command from the controller 129. The EAROM 127 is of 256 words 4 bits and outputs a 4 bit information addressed by an 8 bit address. The informations stored in the EAROM are:

(1) address 1000 $d_3d_2d_1d_0$ (10000000 through 10001111) information $D_3D_2D_1D_0$ to control the time constant of the QEFG, (2) address 0100 $d_3d_2d_1d_0$ (01000000 through 01001111) information $D_3D_2D_1D_0$ to control the gain of the output stage of the pressure sensor, (3) address 0010 $d_3d_2d_1d_0$ (00100000 through 00101111) information $D_3D_2D_1D_0$ to control the offset or offset and drift compensation voltage in the output stage of the pressure sensor, (4) addresses 00010000 through 00011001 information $C_1C_2C_4$ of Table 1 with the content of the counter 128 as the lower four bits of an address The stored informations of (1), (2) and (3) above are for the temperature compensation, and those of (4) are for the code conversion for the lower three bits of the altitude reporting code.

To read out the above information (1), the controller selects the drivers 126 and 124 and sends out a upper four bits of the address 1000 to the EAROM which in combination with the lower four bits of the address $d_3d_2d_1d_0$ through the driver 126 reads the appropriate temperature compensation signal $D_3D_2D_1D_0$, which is supplied through the driver 124 to the switches $S_{c3}$, $S_{c2}$, $S_{c1}$, $S_{c0}$ of FIG. 17 or $S_{r3}$, $S_{r2}$, $S_{r1}$, $S_{r0}$ of FIG. 23A or FIG. 25 involved in the QEFC to change the time constant of the QEFG.

To read out the above information (2), the controller selects the drivers 126 and 123 and sends out an upper four bits of the address 0100 to the EAROM which in combination with the lower four bits of the address $d_3d_2d_1d_0$ through the driver 126 reads the appropriate temperature compensation signal $D_3D_2D_1D_0$, which is supplied through the driver 123 to the switches $S_{r3}$, $S_{r2}$, $S_{r1}$, $S_{r0}$ of FIG. 23A or FIG. 25 involved in the output stage of the pressure sensor in place of one of the resistor circuits $R_{g1}$, $R_{g2}$ of FIG. 26A or $R_i$, $R_f$ of FIG. 26 B to control the gain of the pressure sensor.

To read out the above information (3), the controller selects the drivers 126 and 122 and sends out an upper four bits of the address 0010 to the EAROM which in combination with the lower four bits of the address $d_3d_2d_1d_0$ through the driver 126 reads the appropriate temperature compensation signal $D_3D_2D_1D_0$, which is supplied through the driver 122 to the switches $S_{r3}$, $S_{r2}$, $S_{r1}$, $S_{r0}$ of FIG. 23A or FIG. 25 involved in the output stage of the pressure sensor in place of one of the resistor circuits $R_{01}$ or $R_{02}$ of FIG. 26A to control the offset or offset and drift compensation voltage in the pressure sensor.

To read out the above information (4), the controller selects the drivers 125 and 121 and sends out an upper four bits of the address 0001 to the EAROM which in combination with the lower four bits of the address, which are the contents of the counter 128 read through the driver 125, reads the converted code $C_1C_2C_4$, which is supplied through the driver 121 to the lower three bits positions of the transmission register 118.

Figure 31:
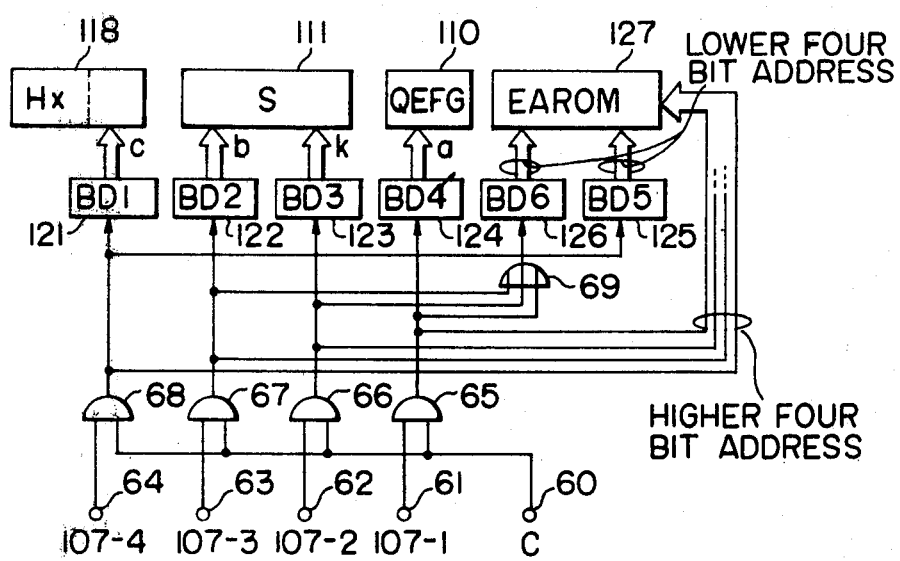
FIG. 31: An embodiment of a circuit of this invention for the code conversion to be used for the temperature compensation and the altitude reporting.

The selection of the drivers and the generation of higher four bits of the addresses by the controller 129 are done using the outputs of the decoder 107 and the flip-flop 104. FIG. 31 shows the control lines therefor but does not show the signal lines such as those from the analog to digital converter 131 to the driver 126, from the counter 128 to the driver 125 and from the EAROM 127 to the drivers 124, 123, 122, 121 of FIG. 15. In FIG. 31, the output signal C of the flip-flop 104 of FIG. 15 is applied to the terminal 60 and the gates 65, 66, 67, 68 are opened only for the charging period of the QEFG. To the terminals 61, 62, 63, 64, the output lines 107-1, 107-2, 107-3, 107-4 of the decoder 107 of FIG. 15 are connected respectively. The signals on these lines exist in a sequence of 2560 microsecond periods as have been explained with FIG. 14 and FIG. 15. When a signal appears at the terminal 61 the output of the gate 65 is "1" and the outputs of the gates 66, 67, 68 are all "0", so that a signal 1000 is applied to the EAROM 127 as the higher four bits of the address. At the same time, the signal through the gate 65 and 69 selects the driver 126 which passes the output $d_3d_2d_1d_0$ of the analog digital converter 131 to the EAROM 127 as the lower four bits of the address. The read out information $D_3D_2D_1D_0$ from the EAROM 127 is supplied to the QEFG 110 to control the time constant thereof for the temperature compensation through the driver 124 selected by the signal through the gate 65. When a signal appears at the terminal 62, a signal 0100 is applied to the EAROM 127 as the higher four bits of the address and $d_3d_2d_1d_0$ is applied as the lower four bits of the address, and read out information $D_3D_2D_1D_0$ is supplied to the output stage of the pressure sensor to control the gain thereof for the temperature compensation through the driver 123 selected by the signal through the gate 66. Similarly when a signal appears at the terminal 63, information to compensate for the offset or both the offset and the drifts are supplied to the output stage of the pressure sensor. Finally, when a signal appears at the terminal 64, a signal 0001 is applied to the EAROM 127 as the higher four bits of the address and the content of the counter 128 is applied as the lower four bits of the address through the driver 125 which is selected by the signal through the gate 68. The read out information $C_1C_2C_4$ from the EAROM 127 is written into the lower three bits positions of the register 118 through the driver 121 selected by the output signal of the gate 68. The order of the above operations may be interchanged.

In the embodiment explained above, an EAROM having an 8 bit address is used. This type of EAROM is available on the market and is simple to generate the higher four bits of the address, but it has a capacity more than necessary. A ROM of 64 words 4 bits is sufficient to be used for the purpose. When a 64 word ROM is used, higher two bit address 11, 10, 01, 00 are used in place of four bit higher addresses 1000, 0100, 0010, 0000, and those two bit higher addresses can be generated by a conventional technique. It will be also understood that the number of divisions of the horizontal axis of FIG. 20, FIG. 22. FIG. 27 and FIG. 28 are not limited to 16 as explained above. The number of divisions to be adopted depends on the temperature characteristics of the components used, and on the requirement how fine the temperature compensation should be made. The number of bits of the analog to digital converter 131 and memory capacity of the EAROM 127 are determined according to the number of divisions. Further in the above description, although the explanations are given in case the temperature compensations for all of the parameters are made, that is for "a", b of the pressure transducer and the output of the pressure transducer at the reference altitude, C, R of the QEFG and the drifts in the output stage of the pressure sensor, this does not limit this invention. Depending on the temperature characteristics of the components used, some of them are small and may be ignored, and some of them may cancel each other. In such case the temperature compensations are made only for those parameters which really need the temperature compensation.

Also, in the above description, although an electronic temperature sensor is used, this invention is not limited to the use of such a temperature sensor. For example a bi-metal switch may be used as a temperature sensor. A bi-metal switch opens or closes an electrical contact, in other words it changes the resistance between two terminals, in response to the temperature change. It is understood that a temperature sensor in this invention changes its electrical state in response to the temperature change, and the "electrical state" means not only the value of the output voltage or current but also means the magnitude of impedance or the open, close condition of a circuit.

Figure 32:
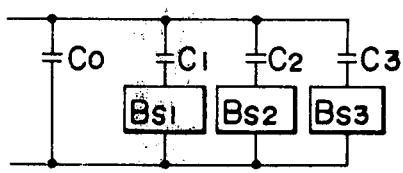
FIG. 32: An embodiment of the capacitor circuit of the QEFG which is controlled by the use of bi-metal switches for the temperature compensation.

FIG. 32 shows an example in which bi-metal switches are used as a temperature sensor as well as for switches for temperature compensation and change the capacity of the QEFG in response to the temperature. In FIG. 32, $C_0$ is the major capacitor of the QEFG, $B_{s1}$, $B_{s2}$, $B_{s3}$ are bi-metal switches which are turned on or off in the order in which temperature rises, and connect or disconnect minor capacitors $C_1$, $C_2$, $C_3$ to or from the capacitor $C_0$, to change the time constant of the QEFG for temperature compensation. It is desirable that the bi-metal switches open or close at their predetermined temperatures with small hysteresis.

Figure 33A:
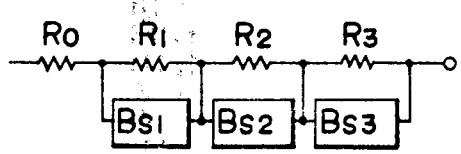
FIGS. 33A and 33B: Embodiments of the resistor circuit controlled by the bi-metal switches used for the temperature compensation in the QEFG and in the output stage of the pressure sensor for the purpose of the offset and drift compensation and the gain control.
Figure 33B:
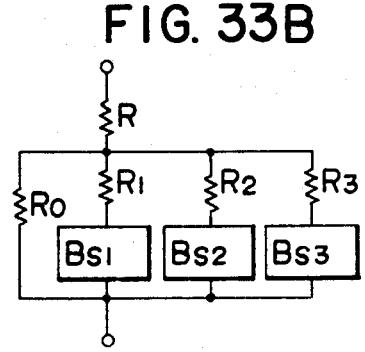

FIG. 33 shows examples of the circuits used to change the discharge resistor circuit of the QEFG, the resistor circuit for the gain control or the resistor circuit for the compensation of the offset or both the offset and drift in the output stage of the pressure sensor by means of bi-metal switches as a temperature sensor as well as for the switches for the temperature compensation. In FIG. 33A, when the bi-metal switches $B_{s1}$, $B_{s2}$, $B_{s3}$ are closed by the temperature change, the resistors $R_1$, $R_2$, $R_3$ are short circuited and the total resistance decreases. In FIG. 33B, when the bi-metal switches $B_{s1}$, $B_{s2}$, $B_{s3}$ are closed by the temperature change, the resistors $R_1$, $R_2$, $R_3$ are connected in parallel to the resistor $R_0$ and the total resistance decreases.

Figure 34:
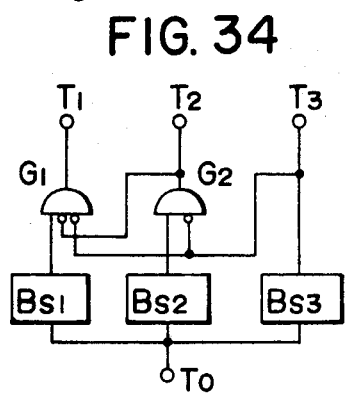
FIG. 34: An example of the control signal circuit when the bi-metal switches are used as the temperature sensor.

FIG. 34 shows a circuit which has a similar function as the level detector of FIG. 21 with bi-metal switches $B_{s1}$, $B_{s2}$, $B_{s3}$. A signal source is applied at the terminal $T_0$, and suppose the bi-metal switches $B_{s1}$, $B_{s2}$, $B_{s3}$ turn on in the order in which temperature rises. When none of the bi-metal switches are closed no signal appear at the terminals $T_1$, $T_2$, $T_3$. At the first temperature range, the bi-metal switch $B_{s1}$ turns on, then a signal appears at the terminal $T_1$ through the gate $G_1$. When the temperature goes up to the second temperature range in which bi-metal switches $B_{s1}$, $B_{s2}$ close, an output signal appears only at the terminal $T_2$. When the temperature goes up further to the third temperature range and all of the bi-metal switches $B_{s1}$, $B_{s2}$, $B_{s3}$ close, the signal appears only at the output terminal T₃. This circuit may be used for the same purpose as the level detector described earlier. (Field Calibration)

Next, a method of field calibration of a blind encoder of this invention is described. The QEFG's of FIG. 12, FIG. 13, FIG. 14, FIG. 17 are suitable to be used for the purpose of field calibration, because the measured altitude at sections n, n+1, n+2, . . . (see FIG. 14) can be altered by means of varying the variable resistor $r_{vn}$ to get correspondence with the indication of the pilot altimeter.

Figure 35A:
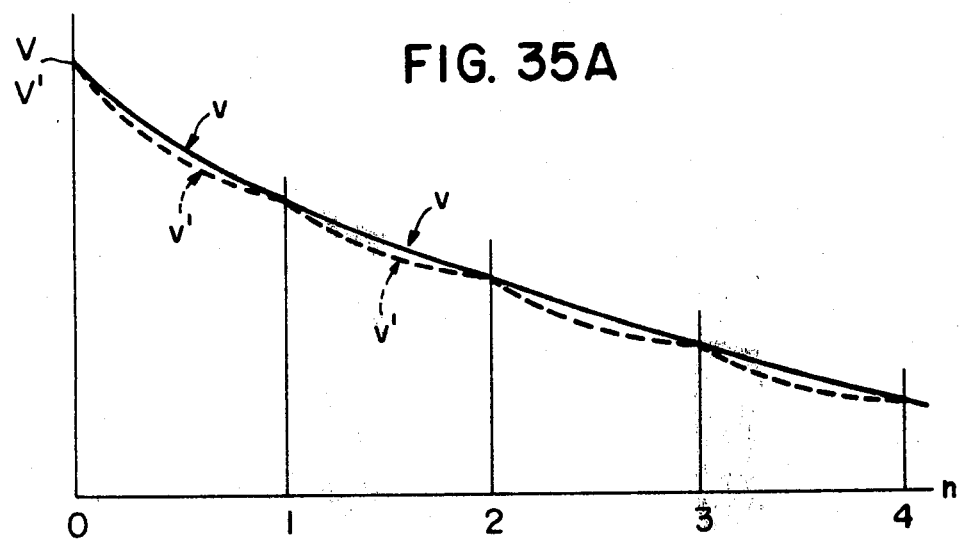
FIGS. 35A and 35B: Illustrations of the characteristics of the QEFG and the principle of the field calibration of the blind encoder of this invention.

In FIG. 35A, the horizontal axis represents the number of section n of the altitude shown by FIG. 14, v is a quasi-exponential function, v' is the approximate quasi-exponential function which is generated by any one of the QEFG's of FIG. 12, FIG. 13, FIG. 14, FIG. 17. V is the initial value of v and it may be slightly different from V' which is the initial value of v' as described before, however, in this figure they are depicted as same values for the convenience of illustration. With these same initial values of v and v', if the values of the capacitor C and the discharge resistors $(r_n + r_{vn})$ of FIG. 14 are determined to give the standard values of time constants, which are the values for $\delta = 0$, then, the values of v' coincide with those of v at the points n=1, 2, 3, . . . In other word, the values of v and v' are same at both ends of any one of the section.

Figure 35B:
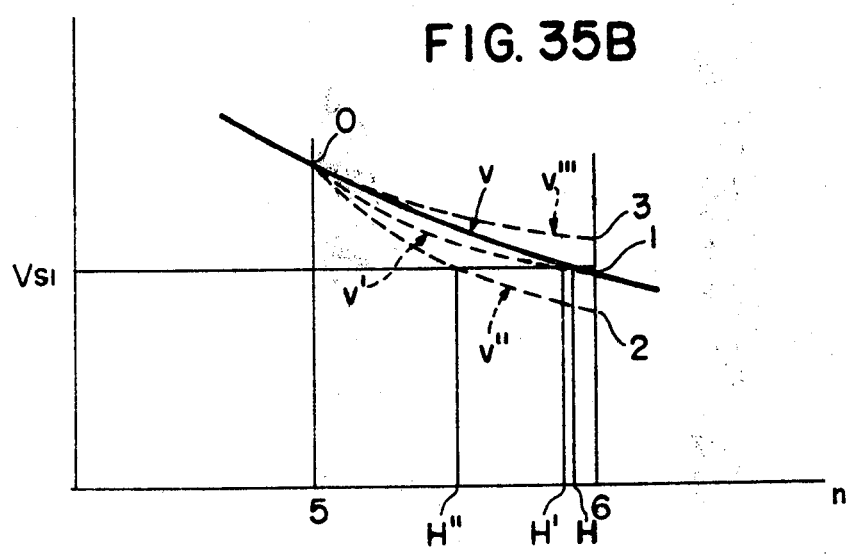

FIG. 35B shows a detail of one of the sections, where n=5 as an example, of FIG. 35A. As shown in the figure, the curves v and v' start from a common point 0 at the beginning of section 5, and they come to a common point 1 at the end of the section, if the time constants are set to the standard values in FIG. 14. Suppose the variable part $r_{v5}$ of the discharge resistor circuit of section 5 is decreased, in other words the value of $\delta$ of the time constant table of FIG. 14 is set to be negative at section 5, then the approximate quasi-exponential function generated will be as shown by v" which comes to a lower point 2 at the end of section 5. If the $\delta$ is set to be positive, the generated approximate quasi-exponential function will be as shown by v''' and comes to a point 3 higher than point 1 at the end of the section 5. At the next section where n=6, the approximate quasi-exponential function will be generated with the starting point one of 1, 2 or 3 according the selected value of $\delta$ at the section 5.

Suppose the pressure sensor output at an altitude H to be measured is $V_{s1}$, then the exact altitude H is determined by the cross point of $V_{s1}$ and the quasi-exponential function v as shown in FIG. 35B. By the use of the approximate quasi-exponential function v' in place of ideal quasi-exponential function v, the measured altitude will be as shown by H' which is slightly lower than H. If the value of $\delta$ at this section is set to be negative, the measured altitude H" is lower than H' as determined by the cross point of $V_{s1}$ and v". Although not shown in the figure, if $\delta$ is set to be positive, an altitude higher than H" will be measured. The value of H"−H' is small at the neighborhood of the starting point of the section, and becomes larger as the altitude approaches to that at the end of the section. The values of H"−H' near of the end of the section are shown in Table 3 plotted against the value of $\delta$ of the table of time constants of FIG. 14.

TABLE 3

| δ (%) | H" − H' ft |
|---|---|
| −2 | −58 |

TABLE 3-continued

| δ (%) | H" − H' ft |
|---|---|
| −1 | −25 |
| 0 | 0 |
| 1 | 38 |
| 2 | 69 |

It shows that near end of a section, the measured altitude will be 58 ft lower than the normal value if the time constant of the section is set 2% smaller than the normal value, and 69 ft higher if the time constant is set 2% larger. These values, that is the values of H"−H' against a given values of $\delta$, do not depend much on the number of sections. By the use of the above principle, it is possible to match the blind encoder with a pilot altimeter within the specified correspondence by means of adjusting the discharge resistors of the QEFG of the blind encoder. The procedure is as follows:

Set the initial voltage V' of the QEFG so that the blind encoder corresponds to the pilot altimeter at the first half of the section 0, adjust the variable resister $r_{v0}$ (see FIG. 14) so that the blind encoder corresponds to the pilot altimeter at the second half of the section 0 and at the first half of the section 1, adjust the variable register $r_{v1}$ so that the blind enconder corresponds to the pilot altimeter at the second half of the section 1 and at the first half of the section 2, and so on.

It is noted that, depending on the error of the pilot altimeter and on the number of sections of the QEFG used, it may not be necessary to adjust all of the discharge resistors of the QEFC. It is a feature of this invention that the field calibration of a blind encoder is made straight forward by the use of parallel discharge resistor type QEFG as shown by FIG. 12, FIG. 13, FIG. 14, FIG. 17. Such field calibration is impossible with the serial discharge resistor type QEFG of FIG. 4. For example, with a QEFG of FIG. 4, it is possible to get the correspondence at the second half of the section 0 and at the first half of the section 1 by adjusting the resistor $r_0$. However, in the next step if the resistor $r_1$ is adjusted to get the correspondence at the second half of the section 1 and at the first half of the section 2, it affects the measurements at all of the sections including the section 0, and very complicated back and forth adjustments are needed for the field calibration.

(Altimeter)

Next, a detailed description on the embodiment of the altimeter of this invention is given below. The basic function of an altimeter is to indicate the altitude. However, some types of altimeters, such as servoed altimeters, exhibit following functions with or without combined with additional instruments.

To indicate the altitude based on the given barometric setting.

To set the altitude select.

To sound alerts at the altitudes 1000 ft and 300 ft to or from the selected altitude, and to light a lamp when the altitude is between 1000 ft and 300 ft to or from the selected altitude.

To send out signals for the auto-pilot to maintain the selected altitude.

To measure the altitude referred with −1000 ft, and send it to the transponder for air traffic control after converting to the specified code.

Figure 3:
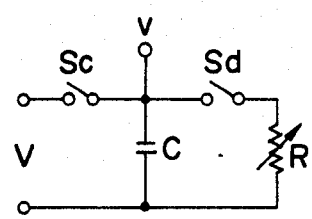
FIG. 3, FIG. 4, FIG. 5, FIG. 6, FIG. 7: Illustrations of the quasi-exponential function generator (QEFG) used in the prior art.
Figure 9:
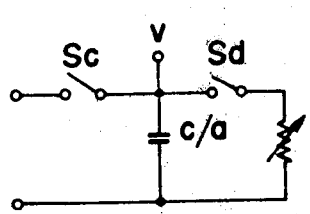
FIG. 9: Illustration of temperature compensation by the QEFG.

The last one of the above functions is same as that of the blind encoder, but the field calibration is not needed in this case, because the same measured altitude is used for indication and for coding for altitude report. Hence, as the QEFG for the pilot altimeter of this invention, anyone of the QEFG's, the principle thereof are illustrated by FIG. 3, FIG. 9, FIG. 11 and embodiments thereof are shown by FIG. 4, FIG. 6, FIG. 12, FIG. 13, FIG. 14, FIG. 17 can be used.

(QEFG of FIG. 37)

Figure 5:
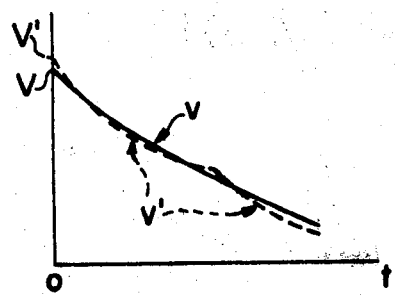

Among the above QEFG's that of FIG. 6 has special features. One of the features is that, in the QEFG of FIG. 6, since the number of temperature sensitive components is less than the other types of QEFG, it is suitable for the precise temperature compensation. The other of the features is that it generates a quasi-exponential function closer to the ideal one than the other types, and does not show an error caused by the approximate quasi-exponential function $v'$ of FIG. 5 or FIG. 35. So, a detailed description is given below on the embodiment of the QEFG of FIG. 6.

FIG. 7 shows the block diagram of the logarithmic function generator used in the prior art to control the QEFG of FIG. 6. In FIG. 7 the register $R_3$ stores a constant b (this is different from the offset b of equation (1)), and the register $R_2$ stores a constant:

$$c' = c \times 10^{-6} \tag{27}$$

where c is given by equation (12) and registers $R_0$, $R_1$ both store 0 as their initial values. When the variable x changes to $x+1$, the logarithmic function generator of FIG. 7 performs the following one cycle of operation: the content of the register $R_3$ is added to the register $R_0$; the content of the register $R_2$ is added to the register $R_1$; the and the content of the register $R_1$ is added to the register $R_0$ the number of times corresponding to the increment of the content of the register $R_0$. But, as explained later with the embodiment, the values of b and $c'$ are determined so that the increment of the content of the register $R_0$ is limited to 0 or 1 for one cycle of operation in the operating range. Hence, for one cycle of operation, the content of the register $R_1$ may be added to the register $R_0$ either once or not added at all. Under such an arrangement, the content of register $R_1$ is $c'x$ when the value of the variable becomes x starting from 0. Suppose the content of the register $R_0$ is w when the variable is x, then if the variable x is increased by $\Delta x$, the increment of w will be:

$$\Delta w = b\Delta x + c'x\Delta w \tag{28}$$

By integrating, under the initial conditions of $x=0$, $w=0$, we get:

$$w = -(b/c')l_n(1-c'x) \tag{29}$$

That is, a logarithmic function of x is generated in the register $R_0$. The increment of w for the increment $\Delta x$ of the variable is given by:

$$\Delta w = (b/1-c'x)\Delta x \tag{30}$$

Since x is the number of cycles of operation of the logarithmic function generator of FIG. 7, x must be an integer, so that for $\Delta x = 1$, the increment of w is:

$$b/(1-c'x) \tag{31}$$

Suppose the above mentioned one cycle of operation is performed in one microsecond and starts the operation at the time $t=0$, then the increment of w in one microsecond at time t is expressed by:

$$b/(1-c'\times 10^6 t) = b/(1-ct) \tag{32}$$

where t is the time in seconds.

On the other hand, the ideal quasi-exponential function is generated by the circuit of FIG. 3 or FIG. 11 by means of changing the resistance R according to equation (14). The value of c of equation (14) is identical with that of equation (32). Suppose the value of the resistance of the resistor $R''$ of FIG. 6 is set to be $bR_0$, and the switch $S_w$ is repeatedly turned on for the time interval:

$$b/(1-ct)\Delta t \tag{33}$$

which is proportional to equation (32), during the short time interval $\Delta t$, then, since the resistor $R''$, the resistance thereof $bR_0$, is made conductive by the switch $S_w$ for the fractional time interval shown by the above formula (33) within the time interval $\Delta t$, the equivalent average conductance of the discharge circuit of FIG. 6, composed of the resistor $R''$ and the switch $S_w$, is expressed by:

$$\frac{1}{bR_0} \cdot \frac{b}{1-ct} = \frac{1}{R_0} \frac{1}{1-ct} \tag{34}$$

This is equivalent to the resistance:

$$R_0(1-ct) \tag{35}$$

Figure 36:
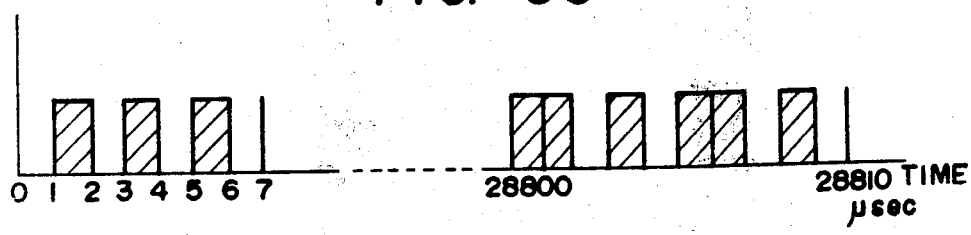
FIG. 36: Illustration of the operation of the QEFG of FIGS. 37A and 37B.

Thus, a resistance which decreases linearly with time as expressed by equation (14) can be realized by turning on the switch $S_w$ repeatedly for a time interval in proportion to the increment of the function w (equation (32)) generated by the logarithmic function generator of FIG. 7. By assigning the value of b with 0.5, the value of formula (32) is 0.5 at $t=0$, and 0.663 at $t=0.0288$ seconds which corresponds to the altitude 36000 ft above the reference altitude $-1000$ ft (one microsecond is equivalent to 1.25 ft). In the practical design, the circuit of FIG. 7 has a period of one microsecond, and in one period one cycle of operation is performed and, for the detection of the increment, the change of the content of the order of $2°$ of the register $R_0$ is detected, and only when the change is detected, the switch $S_w$ of FIG. 6 is turned on for the next period. With this design, during 100 periods, the switch is turned on for 50 periods in average at the lower altitude close to $-1000$ ft, and for 66.3 periods in average at the higher altitude close to 35000 ft. FIG. 36 is an exemplary illustration of the above operation of the switch, in which the horizontal axis represents the time in microseconds, and the crosshatched portions show the period when the switch is turned on.

Figure 37A:
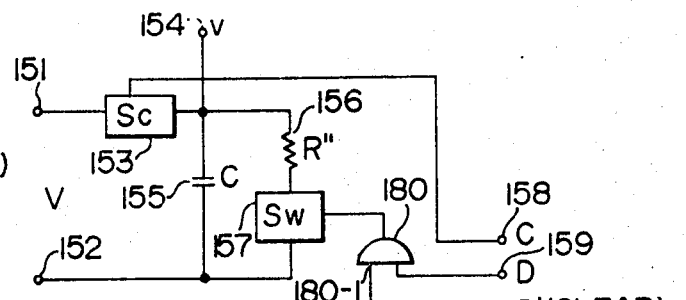
FIGS. 37A and 37B: An embodiment of a hybrid type QEFG used in the altimeter of this invention.
Figure 37B:
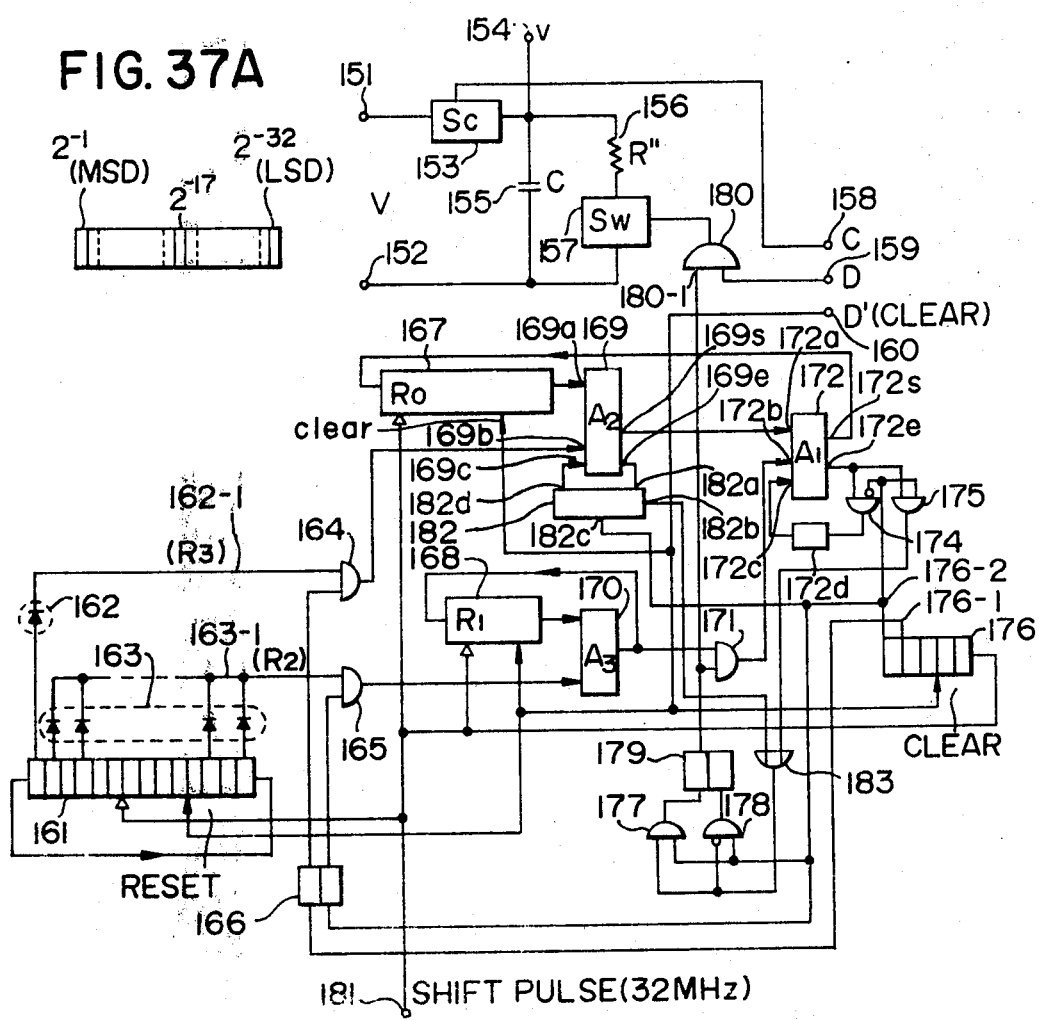

FIG. 37B shows a circuit of the QEFG of a hybrid system using both analog and digital techniques and based on the principle described above. In the figure, those elements labeled 151 through 157 are same as those of FIG. 6, and the other portion is equivalent to the controller Cont. of FIG. 6 which realizes the operation of FIG. 7 by using a serial circuit. At the terminal 158, the signal C, which is generated during the charging period C as shown by FIG. 39, is applied. This signal C turns the switch 153 on and enables the charging of the capacitor 155 with the voltage V applied at the terminals 151 and 152. This voltage V corresponds to the voltage V of FIG. 1, the voltage $V_{sx}$ of FIG. 10 and the voltage $V_x$ of FIG. 38. At the terminal 159 the signal D, which is generated during the discharging period D of FIG. 39, is applied. This signal D opens the gate 180 and enables the signals applied at the input terminal 180-1 of the gate 180 to control the switch 157 to turn on and off as explained with FIG. 36 to generate the quasi-exponential function voltage v at the terminal 154 during the period D of FIG. 39. The registers 167 and 168 are equivalent to the registers $R_0$ and $R_1$ of FIG. 7 respectively, and the diode memories 162 and 163 enclosed by dashed lines are equivalent to the registers $R_3$ and $R_2$ of FIG. 7 respectively. The number of bits of registers and memories of this circuit is basically 32, as is shown by FIG. 37A, in which the most significant bit is assigned for $2^{-1}$ and the least significant bit for $2^{-32}$. Since the value of c' of equation (27) is $0.55919 \times 2^{-16}$, it is stored at the places $2^{-17}$ through $2^{-32}$, and since, for the measurement up to 36000 ft, the maximum value of the content of the register $R_1$ of FIG. 7 is 0.245737, a 32 bit register shown by FIG. 37A may be used for the register 168. Since the value of b is set to 0.5, the maximum value of the change of the content of the register $R_0$ of FIG. 7 for one cycle of operation is 0.745737, so that, for the purpose to detecting the increment of the content of the register 167 at each cycle of operation, it is adequate to detect the change of the content of the order of $2°$ of the register 167. This is done by detecting the carry which might be generated from the order of $2^{-1}$ at each cycle of operation. This means that no longer part is needed for the register 167, and a 32 bit register of FIG. 37A can also be used for the register 167. Label 161 is a shift register of 16 bits and is used to read the memories 162 and 163. At the terminal 181, shift pulses of 32 MHz are applied, and in one microsecond the registers 167 and 168 are shifted one cycle and led to the upper input terminals of the adders 169 and 170 respectively, where the upper input terminal of the adder 169 is labeled with 169a, and the registers 167 and 168 are written by the outputs of the adders 172 and 170 respectively. Since the shift pulses are applied to the shift register 161 and the serial output of the 16 bit register 161 is connected back to the serial input thereof, the content of the register 161 circulates two times in one microsecond. The shift pulses are counted by a 5 bit binary counter 176, which generates a carry pulse at the terminal 176-1 when 16 pulses are counted and a overflow pulse at the terminal 176-2 when 32 pulses are counted. When a discharging pulse D' of the QEFG (shown by FIG. 39) is applied at the terminal 160, it clears the registers 167, 168 and the counter 176, and resets the register 161 and the flip-flops 166, 179 (in the figure the reset lines for flip-flops 166, 179 are not shown). The pulse generated at the terminal 176-1 of the counter 176 sets the flip-flop 166 which opens the gate 164 and closes the gate 165. And the pulse at the terminal 176-2 is applied to the gates 177 and 178 which, controlled by the pulse from the gate 183, sets or resets the flip-flop 179. It is also applied to the gates 174 and 175 to steer the carry generated at the terminal 172e of the adder 172 to the carry input terminal 172c thereof through the delay 172d or to the gate 183, and is also applied to the terminal 182c of the control circuit 182 which is described later, and is also applied to reset the flip-flop 166 by which gate 165 is opened and the gate 164 is closed. When the register 161 is reset by the discharging pulse D' applied at the terminal 160 it resets the most significant bit with "1" and all the other bits with "0", so that when 32 shift pulses are applied, a logical "1" is shifted through a field of "0"s two times from LSG to MSD in the shift register 161. The register 161 has parallel outputs each of which is connected to the memories 162 and 163 which store b=0.5 and c' of equation (27) respectively and formed by a diode connection. Thus, while the first 16 shifts, when the gate 165 is opened, the information c' is led to the lower input terminal of the adder 170 and accumulated in the register 168, and while the second 16 shifts, when the gate 164 is opened, the information is led to the lower input terminal 169b of the adder 169 and added with the information read out from the register 167 by the adder 169. As a result, after x microseconds of operations, the content of the register 168 becomes c'x, and b is added to the content of the register 167 x times through adders 169 and 172. Labels 169 and 172 show adders and the labels with suffixes a, b, s, e, c show repsectively the first and second input terminals for the augend and addend, the sum output terminal, the carry ouput terminal and the carry input terminal. (The carry circuit of the adder 170 is not drawn.) The carry which might be generated from the order of $2^{-1}$ at any cycle of operations would appear either at the carry output terminal 172e of the adder 172 or at the carry output terminal 169e of the adder 169 when the thirty second shift of the register 167 is done. Suppose this carry has appeared at the terminal 172e, since the gate 174 is closed and the gate 175 is opened at the instant, it passes through the gates 175, 183 and 177 and set the flip-flop 170 which controls to open the gate 171 through which the output from the adder 170 is added to the output of the adder 169 by the adder 172 for the next complete one cycle of operation. At the same time the flip-flop 179 controls to turn the switch 157 on through the gate 180 for the next one cycle. During the first through thirty first shift of the register 167, the gate 175 is closed and the gate 174 is opened, so that the adder 172 performs as a ordinary full adder with the carry being led to the carry input terminal 172c through the gate 174 and the one bit delay 172d. The block labeled with 182 is a circuit for the adder 169 same with that composed of the gates 174, 175 and the one bit delay 172d for the adder 172. It is controlled by the pulse appeared at the terminal 176-2 and applied at the terminal 182c of the block 182, and when the carry from the $2^{-1}$ order is generated at the terminal 169e, the output pulse appeared at the terminal 182b performs the same function as that appeared at the output of the gate 175 when the carry at the thirty second shift is generated at the adder 169. If carry is generated neither at the adder 169 nor at the adder 172 at the thirty second shift of the register 167, it shows that the content of the register $R_0$ of FIG. 7 was not incremented at that cycle, and the gate 171 is closed and the switch 157 is turned off during the next cycle. Thus it is understood that by the circuit of FIG. 37 the switch 157 is controlled as shown by FIG. 36 during the discharging period D, and a quasi-exponential function v which is very close to the ideal one is generated at the terminal 154. The 32 MHz shift pulses applied at the terminal 181 may be divided to obtain the 1 MHz basic time signal and the 500 KHz clock of the microcomputer used in the altimeter described later. In the design described above, the switch 157 is turned on and off every microsecond which corresponds to $\Delta x=1$ and 1.25 ft of altitude. In case where such fine control of the switch is not required, and for an example, if the control is required for each 5 ft of the altitude, then the shift frequency is reduced to 8 MHz and the range of the variable x will be 0 through 7200.

The QEFG of hybrid system is not limited to the embodiment described above. For the purpose of this invention, the following approximate method is also available.

The value of w of equation (29) is approximately expressed by a third degree polynomial:

$$y = A_0 + A_1 x + A_2 x^2 + A_3 x^3 \quad (36)$$

where $A_0 = 0.136 \quad A_1 = 0.4997$ $A_2 = -2.0764 \times 10^{-6} \quad A_3 = 8.6504 \times 10^{-12}$

TABLE 4

| x | w | y |
|---|---|---|
| 0 | 0.0 | 0.1 |
| 4000 | 1966.6 | 1966.3 |
| 8000 | 3869.4 | 3869.3 |
| 12000 | 5712.3 | 5712.5 |
| 16000 | 7499.0 | 7499.2 |
| 20000 | 9232.9 | 9232.8 |
| 24000 | 10916.9 | 10916.5 |
| 28000 | 12553.9 | 12553.7 |

Table 4 shows the accuracy of the above approximation, in which x is that of equations (29) and (36), w is the value of equation (29) and y is the approximate value calculated by equation (36). An efficient method to generate the value of a polynomial like equation (36) is shown by FIGS. 3, 5, 7, 8 of my U.S. Pat. No. 3,967,100 "Digital Function Generator Utilizing Cascade Accumulation". By means of using such a digital polynomial function generator in place of the function generator of FIG. 37B which generates the function (29), and by detecting the increment of y thus generated, and by turning on the switch 157 of FIG. 37B only when the increment of y is detected, a quasi-exponential function to be used for this invention is generated.

Figure 38:
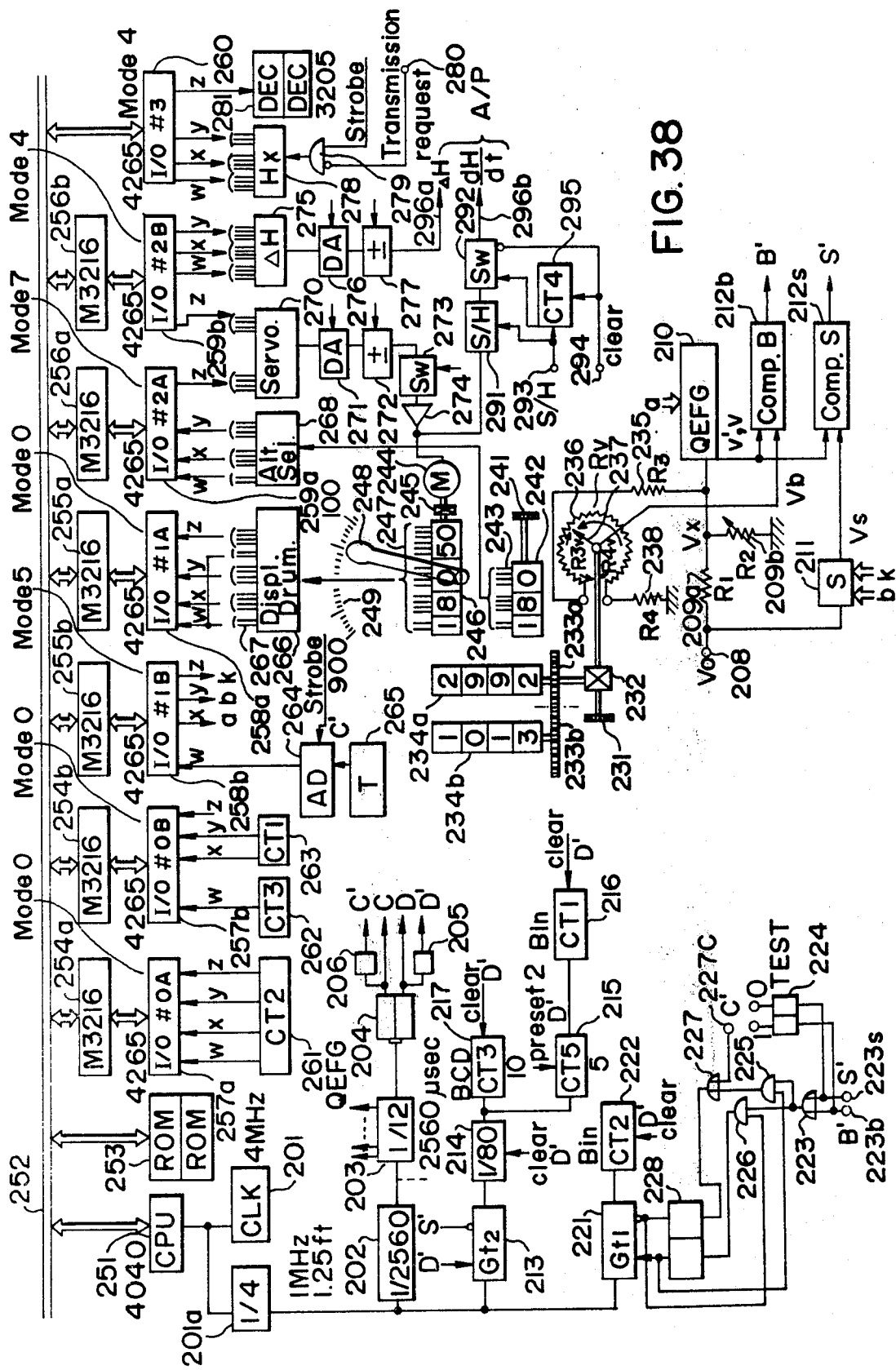
FIG. 38: The block diagram of an embodiment of the altimeter of this invention.

(Altimeter of FIG. 38)

Figure 39A:
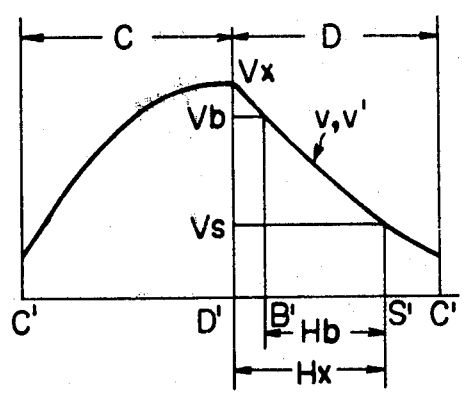
FIGS. 39A and 39B: Illustrations of the altitude measurement of the altimeter of FIG. 38.
Figure 39B:
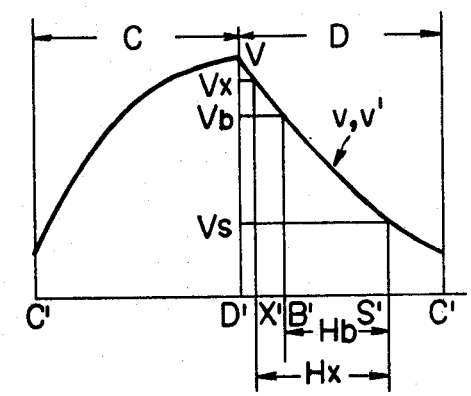

FIG. 38 shows the block diagram of an altimeter for use up to the altitude of 36000 ft according to this invention, and FIGS. 39A and 39B illustrate its operation. In FIGS. 39A and 39B the horizontal axis represents time, and during the time interval C the QEFG is charged, and during the time interval D the QEFG is discharged and the quasi-exponential function v or the approximate quasi-exponential function v' is generated depending on the type of QEFG used. Where it is not necessary to discriminate between v and v' in this embodiment, they are both represented by a quasi-exponential voltage v hereafter. The initial value of v is set to the output $V_x$ of the pressure sensor ($V_s$ of equation (2)) at the pressure of the standard atmosphere at an altitude of $-1050$ ft, which is selected as the altitude measuring reference altitude for the altitude reporting system in which the lowest altitude is $-1000$ ft, in FIG. 39A, and in FIG. 39B v is set to V which is a little higher than $V_x$. $V_b$ is the output of the pressure sensor at the pressure of the barometric setting which is the reference for the altitude to be indicated, and $V_s$ is the output of the pressure sensor at the altitude to be measured. As described before, in the case of FIG. 39A, the time interval between D' and the time when v becomes equal to $V_s$ shows the reporting altitude $H_x$, and the time interval in which v exists between $V_b$ and $V_s$ shows the altitude $H_b$ to be indicated. In the case of FIG. 39B the time interval in which v exists between $V_x$ and $V_s$ represents the reporting altitude $H_x$, and the time interval in which v exists between $V_b$ and $V_s$ represents the altitude $H_b$ to be indicated. As described above there are two altitude measuring reference altitudes in this embodiment, one related to $V_x$ and and the other to $V_b$. Although descriptions are made hereafter for the case shown by FIG. 39A, it is not to be construed as a limitation of this invention. In this embodiment, both of the periods C and D are selected to be 1/32.55 seconds. The altitude measurements are made during the period D and the values representing the altitude $H_x$ and $H_b$ are obtained in respective counters. A provision to determine the sign of $H_b$ is incorporated because it may be a nagative value under some circumstances. After the altitudes have been measured in the period D, the measured data is processed by a microcomputer in the succeeding period C, and the code conversion for the altitude reporting, indication of the altitude, the altitude alerts, and output of control signals for the auto-pilot are made.

To perform the above functions, it is necessary to input the data of the barometric setting and the altitude selection. It is usual for a digital electronic system to indicate those input data and the measured altitude by means of an electronic display. However, in this embodiment, mechanical indicators are adopted because they provide better visibility under the wide range of illumination in the cockpit, and the rotating pointer type indicator and the rotating drum type display used in the conventional altimeters are preferred by the pilots. The input data for the barometric setting and the altitude selection are stored by mechanical means to avoid the loss of such information when the power is interrupted. In FIG. 38, label 201 is an oscillator of 4 MHz output frequency which may be derived from the shift pulses when the QEFG is that of FIG. 37. The 4 MHz pulses are frequency divided by a divider of labeled 201a to produce 1 MHz pulses which serve as the basic timing signal for the altitude measurement. Although not drawn in the figure, a frequency divider is used to produce a 500 KHz clock for the computer. Labels 202 through 206 correspond to those of 102 through 106 of FIG. 15 and determine the period C and D and generate pulses C' and D'. These signals C, D and D' are applied to the terminals 158, 159, 160 of FIG. 37 when the QEFG of that type is used. The parallel outputs from the divider 203 are used through a decoder, as has been explained with respect to FIG. 15, for the control of the QEFG of FIGS. 4, 12, 13, 14, 17, but they are not used for the QEFG of FIGS. 6, 37B. A stabilized voltage $V_0$ is supplied to terminal 208 and is used for the source voltage of the pressure sensor 211 as well as to derive the voltage $V_x$ through the voltage divider 209a and 209b and also to derive the voltage $V_b$ through the voltage divider 235, 236 and 238. The voltage $V_x$ is the output voltage of the pressure sensor at the reporting altitude measuring reference altitude of $-1050$ ft and is used to charge the QEFG 210. Thus, the measured altitude is not affected by a small variation of the supply voltage $V_0$ if the pressure sensor is designed to produce an output in proportion to the source voltage.

The voltage $V_b$ is the output voltage of the pressure sensor at the pressure of barometric setting and is obtained at the sliding contact 237 of potentiometer 236 of linear characteristics. The sliding contact 237 is moved by the knob 231 through a gear mechanism 232 through which the rotating drum type displays 234a and 234b are also driven to indicate the value of the barometric setting in in.Hg and in mb respectively; they are coupled by the gears 233a and 233b with a gear ratio of, for an example, 85:251.

Here, let's denote as follows:
$R_3$: resistance of the resistor 235,
$R_4$: resistance of the resistor 238,
$R_v$: total resistance of the potentiometer 236,
$R_{3v}$, $R_{4v}$: resistances of the two portions of the potentiometer 236 divided by the sliding contact 237 as shown by the figure,
$V_l$: output of the pressure sensor at 950 mb,
$V_h$: output of the pressure sensor at 1050 mb,
$R_{4v}(950)$: value of $R_{4v}$ when the indicator 234b for barometric setting in mb is set to 950 mb,
$R_{4v}(1050)$: value of $R_{4v}$ when the indicator 234b for barometric setting in mb is set to 1050 mb,
and $$R = R_3 + R_v + R_4 \quad (37)$$

where 950 mb and 1050 mb are the extreme values of the barometric setting.
Then, we have $$V_x \cdot \frac{R_4 + R_{4v}(950)}{R} = V_l \quad (38)$$

$$V_x \cdot \frac{R_4 + R_{4v}(1050)}{R} = V_h \quad (39)$$

The values of R and $R_4$ can be determined to satisfy the equations (38) and (39) simultaneously whatever the values $R_{4v}(950)$ and $R_{4v}(1050)$ may be, and from which $R_3$ is determined for a given value of $R_v$ by equation (37). Once the values of $R_3$ and $R_4$ have been determined, since the characteristics of a pressure sensor, which incorporating a pressure transducer of a characteristics as shown by Table 2, is almost linear in the pressure range 950 mb through 1050 mb required for the barometric setting, it will be understood that by operating the knob 231 to indicate the required barometric setting in the display 234b or 234a, the correct voltage for $V_b$ is obtained at the sliding contact 237 of the potentiometer 236. Thus, an accurate barometric setting, invulnerable to power interruption, is effected without the use of any non-linear elements or critical components.

The altitude select is made by the knob 241 so that the desired altitude is indicated by the rotating drum type display 242, which incorporates the BCD (binary coded decimal) encoder 243. This is read by the computer. However, since the unit of the altitude measurement of this altimeter is 1.25 ft, the read out BCD value of the altitude select is shifted one digit to right to obtain the 1/10 of the altitude select, and is converted to binary number, then shifted to left three bits to multiply by 8 to obtain the binary value of the altitude select in 1.25 ft unit. This value is stored in the register of the CPU 251 for later use.

The discharging pulse D' starts the QEFG 210 and opens the gate 213, and when the output of the QEFG v becomes equal to $V_b$, the comparator 212b generates a coincidence pulse B' which is applied to the terminal 223b, and when v becomes equal to $V_s$ the comparator 212s generates a coincidence pulse S' which closes the gate 213 and is also applied to the terminal 223s. The circuit composed of 214, 215, 216, 217 is same as that composed of 114, 115, 116, 128 of FIG. 15, and the values shown by $CT_1$, $CT_3$ of Table 1 are obtained in the counters 216, 217 respectively.

The pulses applied to the terminals 223b, 223s set or reset the flip-flop 224, and if the generation of the pulse B' is earlier than that of S', the flip-flop 224 is reset which shows the measured altitude is positive, and if the pulse B' is generated later than the pulse S', the flip-flop 224 is set which shows the measured altitude is negative. The output of the flip-flop 224 is connected to the TEST terminal of the CPU 251 (Intel 4040) for example to test the sign of the measured altitude. Since the flip flop 228 is reset by the pulse C' which is applied at the terminal 227c and passed through the gate 227, the gates 221 and 225 are closed and 226 is opened at the start of the period D. The flip flop 228 is set and opens the gates 221 and 225 and closes 226 and starts the counting of the 16 bit binary counter 222 when the earlier one of the pulses B' or S' is applied to one of the terminals 223b or 223s respectively. When the later one of the pulses B' or S' is applied to one of the terminals 223b or 223s, the flip flop 228 is reset by the pulse through the gates 225 and 227, which closes the gate 221 and stops the counter 222 to maintain the measured altitude therein and open the gate 226 and closes the gate 225 to be prepared for the next cycle of measurement. Thus, at the end of the period D, the absolute value of the altitude to be indicated is obtained in the binary counter 222 in 1.25 ft unit, and its sign is represented by the state of the flip flop 224. Label 251 is a 4 bit CPU (central processing unit) Intel 4040 for example, which communicates through 4 bit bus 252 with ROM (read only memory) 253 and is connected to I/O (input/output device) 260 and through bus drivers 254a, 254b, 255a, 255b, 256a, 256b to I/O's 257a, 257b, 258a, 258b, 259a, 259b respectively. The I/O 260 is connected directly to the bus 252, so that, the decoder 281 which is connected to the port z of the I/O 260 can produce a decoded output whenever an output instruction is executed in the program. The two of the outputs of the decoder 281 are used to select the bus drivers 254a, 255a, 256a or 254b, 255b, 256b to connect the selected group of I/O's 257a, 258a, 259a or 257b, 258b, 259b to the bus through which the CPU reads or writes through the ports w, x, y, z of anyone of the I/O's. This is done by the program, however, to simplify the description, an operation to read the information at the port w of the I/O 257a by selecting the bus driver 254a with the decoded output of the decoder 281, for an example, is merely described as to read the port w of I/O #0 A, using the notations marked in the figure.

The computer executes the program during the period C of FIGS. 39A and 39B as follows.

(Temperature Compensation)

The temperature sensor 265 is same as that has been described with the blind encoder of FIG. 15. The output of the temperature sensor is converted to a 4 bit digital value $d_3\ d_2\ d_1\ d_0$ by the analog to digital converter 264. This is read by the CPU through the port w of the I/O #1 B. The conversion table to convert $d_3\ d_2\ d_1\ d_0$ to the control signal for temperature compensation $D_3\ D_2\ D_1\ D_0$, which has been explained with FIG. 20, FIG. 22, FIG. 27, FIG. 28 is stored in the ROM 253. An appropriate data block in the ROM is read out by using $d_3\ d_2\ d_1\ d_0$ as a relative address. The control signals thus read out, $D_3\ D_2\ D_1\ D_0$'s for the temperature compensation for a, b of equation (1) and the gain control of the pressure sensor, are outputted to the ports x, y, z of the I/O #1 B respectively to control the capacitor circuit for temperature compensation or the resistor circuit for temperature compensation in the QEFG and in the output stage of the pressure sensor as has been described before. Thus the temperature compensated accurate values are obtained in the counters 217, 216 and 222.

(Altitude Reporting Code)

The counted value of the counter 263 (which is the same as the counter 216) is read through the ports x, y of I/O #0 B, and, after being converted to the gray code by the logical operation instructions of the CPU 251, is written in the higher 8 bit positions of the transmission register 278 through the ports w, x of I/O #3. Next, the content of the counter 262 (which is the same as the counter 217) is read through the port w of the I/O #0 B, and the operation to convert the values of CT3 to $C_1 C_2 C_4$ of Table 1 is executed. This is done by reading out the data stored in the ROM 253 with the values of CT3 as relative addresses. The converted code $C_1 C_2 C_4$ is written in the lower 3 bit positions of the register 278 through the three lines of port y of the I/O #3. The strobe of the register 278 is done by applying a signal via remaining one line of the port y, through a suitable time delay, to the input of the gate 279. However, this strobe is inhibitted while the transmission is being requested.

(Altitude Alert)

The counted value of the 16 bit counter 261 (which is the same as the counter 222) represents the absolute binary value in 1.25 ft units of the measured altitude. This is read through the I/O #0 A and processed as follows.

Figure 40:
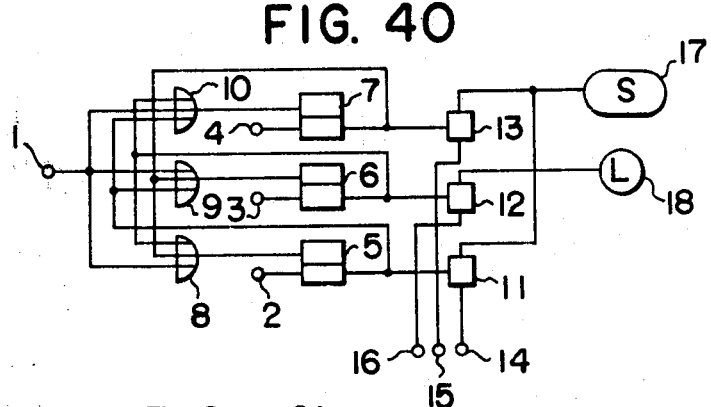
FIG. 40: The circuit diagram of an embodiment of the altitude alert portion of the altimeter of this invention.

The CPU 251 checks the TEST input. If it is "0", the flip flop 224 is reset which shows the measured altitude is positive, and the following program for altitude alert is executed. The selected altitude, (the binary) number in 1.25 ft units stored already in the registers of the CPU), is subtracted from the above measured altitude to get the altitude deviation $\Delta H$. Depending on the polarity of $\Delta H$, a signal to turn the polarity switch 277 to plus or minus is sent out by the decoder 281 through the port z of I/O #3. This is done by switching the polarity of an operational amplifier connected to the output of the digital to analog converter 276. The CPU 251 takes the absolute value of $\Delta H$ and writes it into the altitude deviation register 275 through the ports w x y of the I/O #2 B. The digital analog converter 276 is then strobed by an output of the decoder 281 to produce analog signal proportional to the altitude deviation $\Delta H$ at the output line 296a. This signal is used as an error signal of altitude for the autopilot when it is engaged. The absolute value of $\Delta H$ is compared with the numerical values of 816, 784, 256, 224 which are stored in the ROM 253. These values represent in 1.25 ft units the difference of altitudes of 1020, 980, 320, 280 ft respectively. Signals for the first alert sound, for the alert light and for the second alert sound are generated at the respective output lines of the decoder 281, when the absolute value of $\Delta H$ is between the pair of stored values 816 and 784, 784 and 256, and 256 and 224 respectively. FIG. 40 shows the alert circuit controlled by the output of the decoder 281. In the figure, labels 5, 6, 7 are flip flops, 17 is an alert horn, 18 is an alert light, 11, 12, 13 are switches, 14, 15, 16 are the signal sources for the first alert sound, second alert sound and the alert light respectively. When the absolute value of the altitude deviation $|\Delta H|$ is not in any one of the ranges of the above mentioned three pairs of numerical values, the control signal from the decoder 281 is applied to the terminal 1, and the flip flops 5, 6, 7 are all reset, and the switches 11, 12, 13 are all turned off, so that neither 17 nor 18 operates. When $|\Delta H|$ lies in the range of the pair of numerical values 816, 784, the control signal for the first alert sound is applied to the terminal 2, and the flip flop 5 is set and the switch 11 is turned on, so that the source for the first alert sound, supplied to the terminal 14, is led to the alert horn 17 and the first alert sound is heard. In this case, since the output of the flip flop 5 resets the flip flops 6 and 7 through the gates 9 and 10 and the switches 12 and 13 are turned off, the alert light and the second alert sound do not operate. Similarly, when the value $|\Delta H|$ lies in the range of the pair of numerical values 784 and 256, the control signal for the alert light is applied to the terminal 3 and only the alert light 18 is activated, and when the value $|\Delta H|$ lies in the range of the pair of numerical values 256 and 224, the control signal for the second alert sound is applied to the terminal 4, and only the second alert sound is heard from the horn 17. Thus, when the aircraft passes the line 1000 ft or 300 ft to or from the selected altitude, the first or second alert sound is heard, and when it is between 1000 ft and 300 ft the alert light is lit. The signal sources of suitable frequencies for the first and second sounds may be derived from the appropriate stages of the frequency divider 203. The above three pairs of the numerical values may be selected to give the suitable duration of the alert sound according to the ascent or descent rate of the aircraft.

(Altitude Display)

The measured altitude is indicated by the rotating drum display 246 and rotating pointer 248 which is driven by the servomotor 244 through the gear mechanism 245 in FIG. 38. The rotating pointer indication is read by the circular scale 249 of 1000 ft per revolution. The least significant digits of the rotating drum display 246 are marked on the first drum such as 00, 10, . . . , 90 with 10 ft unit. When the first drum goes from 90 to 00, the second drum, which is divided with 100 ft interval, is advanced by one division. The scale of the second drum is 0, 1, . . . , 9. When the second drum goes from 9 to 0, the third drum, which is divided with 1000 ft interval, is advanced by one division. The scale of the third drum is 0, 1, . . . , 9. When the third drum goes from 9 to 0, the fourth drum, which is divided with 10000 ft interval, is advanced by one division. The scale of the fourth drum is 0, 1, 2, 3 for the indication up to 36000 ft, however, a special marking is put at the division corresponding to 9 to indicate a negative altitude. The indicated altitude of the rotating drum display 246 is read by the CPU through I/O #1 A by means of the encoder 247 as described later. In FIG. 38 labels 246 and 266 represent the same rotating drum display and labels 247 and 267 represent the same encoder. The indicated altitude of the rotating drum display read by the CPU is converted to a binary value of the altitude in 1.25 ft unit and used to derive the difference from the measured altitude as shown later. This difference value is used as an error signal to control the servomotor 244. The sign of this error signal controls the polarity switch 272, and the absolute value of the error signal is written in the servoregister 270 through the port z of I/O #2 A and the port z of I/O #2 B. Then the digital to analog converter 271 is strobed by the output of the decoder 281, and the output from the polarity switch 272 is applied to the servoloop of the servomotor 244 as an analog error signal. Thus, the rotating drum display 246 is controlled so that its indication tracks the measured altitude. The switch 273 is turned on except a short time interval in which it is turned off by the output of the decoder 281. Since the counter electromotive force of the servomotor 244 generated during this short time interval represents the speed of the servomotor, it is used for the stable control of the servo-loop in combination with the error signal. (This circuit is not drawn in the figure.)

The above counter electromotive force of the servomotor, which is proportional to the speed of the servomotor, also represents the change rate of the altitude at a steady state. To obtain this value, a signal from the decoder 281 is applied to the terminal 293 to sample the counter electromotive force of the servomotor when the measured altitude is within a predetermined value from the selected altitude and while the switch 273 is turned off. In response to the sampling signal, the sample and hold circuit 291 outputs the counter electromotive force of the servomotor through the switch 292 to the output line 296b as the vertical speed signal for the autopilot. However this signal may have a large error when the rotating drum display 246 has not yet tracked up the measured altitude at the times such as the beginning of the altitude measurements or just after the recovery from the power interruption. To avoid this, when the power is turned on, a signal is applied to the terminal 294 which clears the counter 295 and turns the switch 292 off. After the altitude measurements, which are performed sixteen times per second, have been repeated an adequate number of times, and when the counter 295, which counts one sampling pulse per one measurement, produces an overflow pulse which closes the switch 292 on, the vertical speed signal appears at the line 296b. In the above description, the vertical speed is obtained by the counter electromotive force of the servomotor, but this should be construed as limiting the scope of this invention. The vertical speed may be obtained by means of the software programmed in the microcomputer such as by observing the successive values of measured altitude to eliminate the dispersion and by calculating the change rate of the altitude.

Next, the encoder 247 of the rotating drum display 246 is explained. It is known, in general, that glitches are observed at the transit positions if a binary code is used to encode a mechanical angle. For example, a transient signal neither 3 nor 4 is generated at a intermediate angle between the angles 3 and 4. The gray code is used to avoid such problems. In the gray code system, only one bit is allowed to change when the number changes by one, so that no erroneous code other than 3 or 4 appears even at the transition angles between 3 and 4. This feature of the gray code is maintained when the number changes from 9 to 10. However, this feature is lost when the coded number changes from 9 to 0 or 0 to 9. For this reason, a special code is needed to encode the rotating drum display: Further, the driving mechanism which couples two adjacent drums of the rotating drum display has some backlash by which an irregular code is generated when any of the drums, first, second or third, changes from 9 to 0 or from 0 to 9. For example, starting from the positions of third drum 4 and the second drum 9, if the second drum rotates to 0 then the third drum goes to 5, but at the intermediate angle between 9 and 0 of the second drum, it is impossible for the third drum to change from 4 to 5 exactly at the instant when the second drum changes from 9 to 0. So that at such intermediate angle, the encoded outputs of the third and second drums may be any one of 40, 49, 50, 59. Such transient errors must be corrected by the software as described later.

TABLE 5

| N | $B_3$ | $B_2$ | $B_1$ | $B_0$ |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 0 | 1 | 1 | 1 |
| 6 | 0 | 1 | 0 | 1 |
| 7 | 0 | 1 | 0 | 0 |
| 8 | 1 | 1 | 0 | 0 |
| 9 | 1 | 0 | 0 | 0 |

Table 5 shows one example of the special code $B_3 B_2 B_1 B_0$ in which only one bit changes for a change of 1 of a decimal number: 0, 1, 2, ..., 8, 9, 0, 1, ..., even when N changes from 9 to 0 or from 0 to 9. Once a set of such code is discovered, the feature is retained even by reversing the order of sequence, or by shifting N by 1 or by changing the order of bits $B_3$, $B_2$, $B_1$, $B_0$ arbitrarily, so that many sets of such code are generated. But the code shown in Table 5 has a further feature that it can be used satisfactorily even when the altitude is negative in the embodiment of FIG. 38. This code is used to encode the second, third and fourth drums of the rotating drum display 246. The output from each of these encoders is used as a relative address of a conversion table stored in the ROM 253 to convert the output of the encoder $B_3 B_2 B_1 B_0$ to the decimal value N of Table 5.

Figure 41:
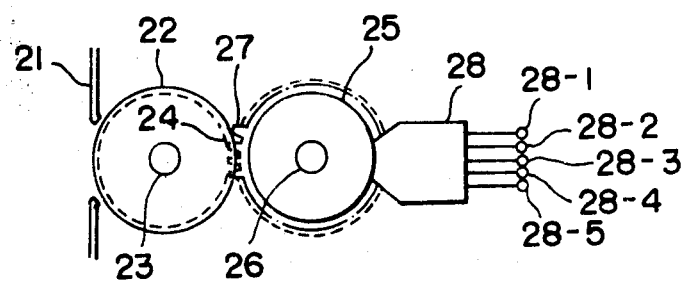
FIG. 41: Illustration of the encoder of the rotating drum display used in the altimeter of this invention.

The first drum of the rotating drum display indicates 0 to 100 ft. This range is encoded into grey code after being translated into integers from 0 to 64, (one division thereof represents $1.25 \times 1.25 = 1.5625$ ft). This is possible because there is only one bit change in the gray code system from 63 to 0. The output from the encoder of the first drum is converted to the binary number in the CPU 251 by means of processing bit by bit. The binary number thus obtained is multiplied by 1.25 to obtain the fractional value in 1.25 ft unit at each of the 100 ft steps of the measured altitude. The outputs from the encoders of the second, third and fourth drums are converted to binary numbers according to Table 5. These binary numbers are multiplied by 80, 800, 8000, which are stored in the ROM 253 in binary form, respectively and added together with the above fractional value at the 100 ft step to obtain the binary value of the altitude in 1.25 ft unit indicated by the rotating drum display 246. This value is used to generate the error signal for the control of the servomotor 244. FIG. 41 shows how the encoder is attached to the rotating drum display. In FIG. 41 label 21 is the front panel of the altimeter, 22 represents one of the drums which rotates around the axle 23. One end of the periphery of each drum is engraved as shown by 24, which couples to the embossed periphery 27 of the encoder drum 25 to rotate it around the axle 26. The detector 28 reads the encoding pattern on the surface of the encoder drum 25. The detector 28 may be mechanical contact type or non-contact type including an optical detector. The output terminals 28-1 through 28-5 show those for 4 bit information and 28-1 through 28-4 are for individual bits and 28-5 is for common return. When a optical type detector is used, additional terminals for optical circuit are used.

Figure 42A:
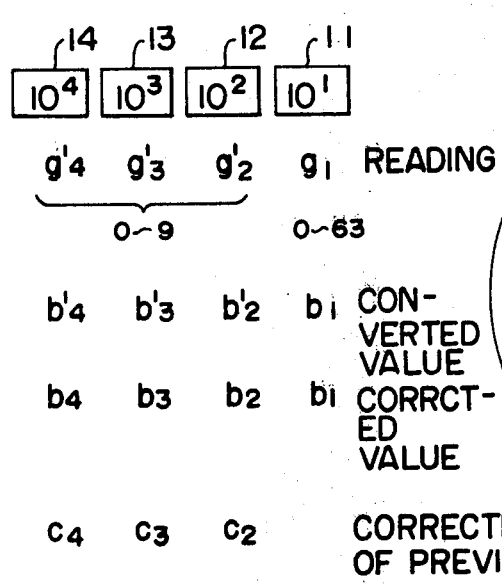
FIGS. 42A and 42B: Illustrations for the correction of the outputs of the encoders of the rotating drum display used in the altimeter of this invention.

Next, a method for correcting the output information from the encoder 247 is described. In FIG. 42A, labels 11, 12, 13, 14 represent the first, second, third, fourth drums of the rotating drum display 246 respectively. The read out value from 11 is a gray code $g_1$ of one of 0 through 63, those from 12, 13, 14 are special codes $g'_2$, $g'_3$, $g'_4$ of one of 0 through 9 of table 5. After converted to binary numbers, these values give $b_1$, $b'_2$, $b'_3$, $b'_4$ respectively. Since any one of the values $b'_2$, $b'_3$, $b'_4$ is one of 0 through 9, it may be considered as a digit of BCD (binary coded decimal) number, and corrected to $b_2$, $b_3$, $b_4$ respectively as explained later. The digits $c_4$, $c_3$, $c_2$ show the corrected values of the previous cycle of measurement.

Figure 42B:
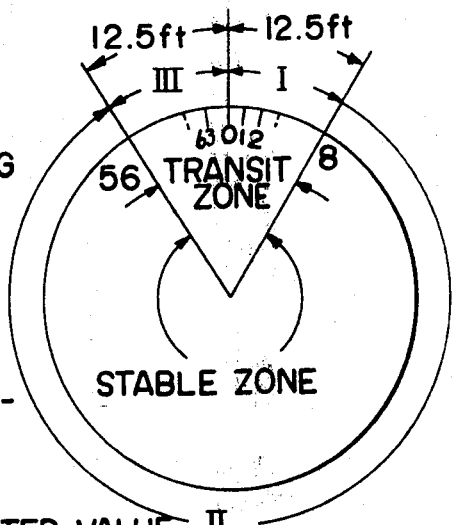

FIG. 42B shows the divisions of the encoder of the first drum in circular form which is divided into 64 units. With the mechanism of the encoder for the rotating drums of 246 of FIG. 38, there are possible errors at the outputs of the second, third and fourth drum encoders when and only when the indication of the first drum moves between 90 and 00. That is, with respect to FIG. 42B, those errors may happen at a point in a zone of plus and minus 10 ft from its center at 0, which is the boundary of 00 and 90 of the scale of the first display drum, but no error would appear at any point outside of the zone. Allowing some margin on the above zone, a sector of $0 \pm 12.5$ ft, which corresponds to the divisions of the encoder from 56 via 0 to 8, is assumed as the transit zone in which the outputs from the encoders may be unstable. The whole periphery is divided into three sectors I, II, III as shown in the figure, where I is the sector of 0 through 8, III is the sector 56 through 64 (or 0), and II is the remaining sector, then the sectors I and III form the transit zone and the sector II represents the stable zone in which no error would appear. In FIG. 42A, since the read out value $g_1$ of the first drum encoder is always reliable, the converted value $b_1$ is also reliable, so that no correction is needed for $b_1$. When $b_1$ is in the transit zone, there are possible errors in the read out values $g'_2$, $g'_3$, $g'_4$ of the second, third, fourth drum encoders, so that there are also possible errors in the converted binary values $b'_2$, $b'_3$, $b'_4$. These values are corrected to $b_2$, $b_3$, $b_4$ by means of a software described below. As the altitude measurements are performed sixteen times per second, set a flag at a cycle of measurement as follows:

| | | |
|---|---|---|
| if $b_1$ is in sector I | set flag I | if the previous flag is not 0 |
| if $b_1$ is in sector II | set flag II | |
| if $b_1$ is in sector III | set flag III | if the previous flag is not 0 |
| at the start up | set flag 0 | |

Then the possible error is corrected by the following process.

At a cycle of measurement, if $b_1$ is in sector II, use $b'_2$, $b'_3$, $b'_4$ as the corrected values $b_2$, $b_3$, $b_4$ respectively, if $b_1$ is in sector I and if the previous flag is 0, control the servomotor 244 of FIG. 38 to rotate in a direction to indicate higher altitude, and any processing of the measured altitude and change of flag shall not be done, if $b_1$ is in sector III and if the previous flag is 0, control the servomotor toward lower altitude indication, and any processing and change of flag shall not be done, if $b_1$ is in sector I and if the previous flag is II, since this means that the altitude has been lowered to sector I from the sector II of previous cycle of measurement, and $b_2$, $b_3$, $b_4$ must remain unchanged from the corrected values $c_2$, $c_3$, $c_4$ of the previous cycle of measurement, the previous corrected values $c_2$, $c_3$, $c_4$ are used as the corrected values $b_2$, $b_3$, $b_4$ for this cycle of measurement respectively. The base of the above judgement that the altitude has been lowered from sector II to sector I is an abnormal vertical speed if the altitude had been highered from sector II through sector III to sector I. The vertical speed for such change is at least 12.5 ft $\times 16 = 200$ ft per second, and the servomotor control must be designed not to follow such a extreme change. Similarly, if $b_1$ is in sector I and if the previous flag is III, it means that the altitude has been highered from sector III to sector I. So that the corrected value $b_4 b_3 b_2$ must be the incremented value of the previous corrected value $c_4 c_3 c_2$.

The above corrections are concluded as follows:

| $b_1$ | previous flag | corrected value for this measurement | flag set by this measurement | |
|---|---|---|---|---|
| I | 0 | none | 0 | rotate motor to higher altitude |
| | I | $c_4 c_3 c_2$ | I | |
| | II | $c_4 c_3 c_2$ | I | |
| | III | $c_4 c_3 c_2 + 1$ | I | |
| II | 0,I,II,III | $b'_4 b'_3 b'_2$ | II | |
| III | 0 | none | 0 | rotate motor to lower altitude |
| | I | $c_4 c_3 c_2 - 1$ | III | |
| | II | $c_4 c_3 c_2$ | III | |
| | III | $c_4 c_3 c_2$ | III | |

$c_4 c_3 c_2 \pm 1$ means to increment or decrement a 3 digit BCD number $c_4 c_3 c_2$ If $b_1$ is in the stable zone, the special code of Table 5 is not necessarily to be used to obtain $b_4$, $b_3$, $b_2$. And if $b_1$ is in the transit zone, $b'_4$, $b'_3$, $b'_2$ are not used in the process of the above correction. So that, according to the above correction, the special code of Table 5 may not be used. However the special code of Table 5 serves for the purpose of error detection in the computer system because, with the special code, the differences of $b_4$, $b_3$, $b_2$ and $c_4$, $c_3$, $c_2$ are limited to 0 or 1. When such error is detected, the altimeter shall be restarted. When the flip flop 224 of FIG. 38 is set, the CPU 251 detects the TEST "1". In this case the altitude measured from the altitude measuring reference altitude determined by the barometric setting is negative, and its absolute value is counted in the counter 222 (which is same with 261). This may happen at very low altitude depending on the change of the atmospheric pressure, errors of the altimeter, the error and the resolution of the barometric setting. In such case the processing in the computer is made algebraically by representing the measured altitude by a sign bit and the 2's complement of the content of the counter 222. On the other hand, the negative indication of the rotating drum display 246 is detected by a number 9 of the corrected value $b_4$, but this number 9 can not be read from the encoder of the fourth drum because it has only two bits. So that, the encoder of the fourth drum is constructed to generate an output signal 3 at the position of 9. Then, the outputs 3, 0, 1, 2, 3 of the fourth drum encoder can be expressed with two bits as shown in FIG. 38. With the special code of Table 5, since only one bit changes when N changes from 0 to 3, it operates with no problem of glitch. With this arrangement, as an example, the encoder outputs 39850 ft when the altitude is −150 ft, which can be detected as a negative number by the computer because the output is beyond the maximum range 36000 ft range of the altimeter. Thus, when the corrected output from the encoder 247 exceeds 38000, for example, by converting the output of the first drum encoder to a complement of 64, by converting the corrected values of the second and third drum encoders to their 9's complements, and by converting the corrected value of the fourth drum encoder to 0, the absolute value of the altitude indicated by the rotating drum display 246 is obtained. And, by converting the absolute value thus obtained to a binary number of 1.25 ft unit, as explained before for positive altitude, and further by transforming it to its 2's complement with a sign bit, digital information corresponding to the indicated altitude and suitable to be processed algebraically in the computer is obtained. In the previously described process of the correction, as a result of the correction of $c_4 c_3 c_2 - 1$, the value of $b_4$ may become equal to 9. Even in such a case, since the apparent corrected altitude is 99850 ft which exceeds 38000 ft, it is treated with the same logical process as described above. The maximum positive altitude 36000 ft is 28800 in 1.25 ft units, so that the MSD of a 16 bit data can be used as a sign bit. This enables the processing of the measured altitude and the indicated value of the rotating drum display, irrespective of their sign, with a common algorithm.

Figure 43:
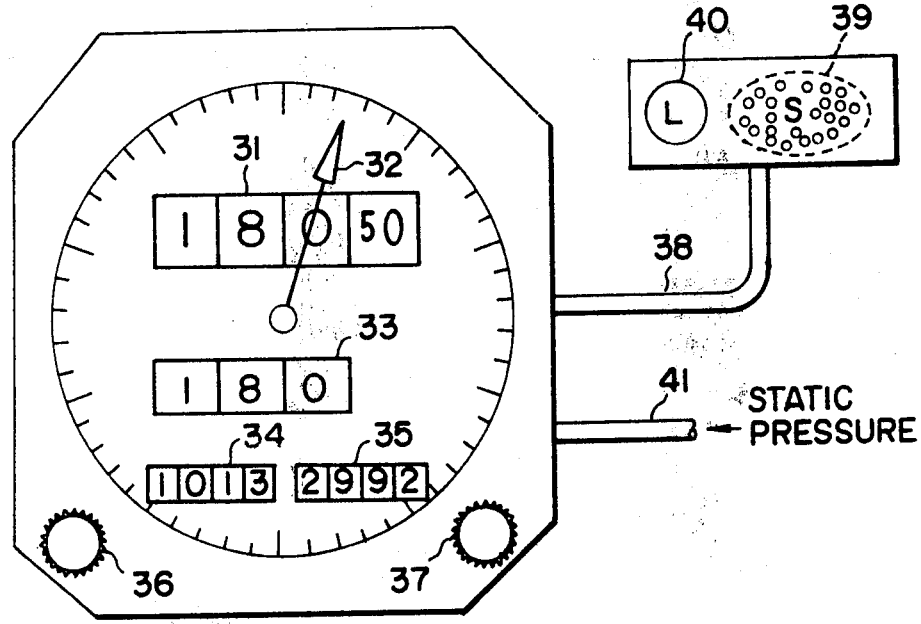
FIG. 43: An example of the appearance of the altimeter of this invention.

FIG. 43 shows the appearance of the altimeter described above, in which label 31 is the rotating drum display (246), 32 is the rotating pointer (248), both indicate the measured altitude from the altitude measuring reference altitude determined by the barometric setting. Label 33 is a display for the selected altitude in 100 ft unit and selected by the knob 36. The labels 34 and 35 are displays to indicate the barometric setting in mb and in Hg respectively and are both set by the knob 37. Labels 38, 39, 40, 41 are the cable, sound horn, alert light and the static port respectively.

What is claimed is:

1. Pressure altitude measuring apparatus comprising:
a pressure sensor which produces a first electrical signal representing the atomspheric pressure at the altitude to be measured and containing a pressure transducer that produces an electrical output in response to the pressure applied thereon and an output stage with a resistor circuit to compensate for the offset value of the electrical output of said pressure transducer and a resistor circuit to adjust the magnitude of said first electrical signal,
   means to produce at least one kind of second electrical signals approximately equal respectively to the electrical signals which would be produced by said pressure sensor when the atmosheric pressure of at least one kind of altitude measuring reference altitudes is applied thereon,
   a quasi-exponential function generator comprising a capacitor circuit with two terminals, a discharge resistor circuit with two terminals and a controller, said two terminal discharge resistor circuit comprising at least one resistor and at least one switch for said function generation and controlled to provide an effective resistance which decreases with time by means of controlling said at least one switch for said function generation by said controller, and each of said two terminals of said discharge resistor circuit is connected to each of said two terminals of said capacitor circuit,
   means to generate a third electrical signal by means of charging said capacitor circuit of said quasi-exponential function generator with an electrical voltage determined in relation to the magnitude of the signal of the largest one of said at least one kind of second electrical signals, and discharging through said discharge resistor circuit for a predetermined discharging period in which said controller controls to decrease the effective resistance of said discharge resistor circuit,
   counting means to count electrical pulses of a predetermined frequency,
   means to control said counting means to count said electrical pulses only during the time interval in which the magnitude of said third electrical signal is approximately not more than the magnitude of one of said second electrical signals and not less than the magnitude of said first electrical signal,
   a temperature sensing device including temperature sensor, said device exhibiting plural electrical states according to the temperature of said pressure sensor and said quasi-exponential function generator,
   temperature compensation means comprising at least one of the following four means;
   (1) means to change the electrical capacity of said capacitor circuit of said quasi-exponential function generator including controlling switches for temperature compensation incorporated in said capacitor circuit,
   (2) means to change the resistance of said discharge resistor circuit of said quasi-exponential function generator including controlling switches for temperature compensation incorporated in said discharge resistor circuit,
   (3) means to change the resistance of said resistor circuit to compensate for the offset value in said output stage of said pressure sensor including controlling switches for temperature compensation incorporated in said resistor circuit to compensate for the offset value,
   (4) means to change the resistance of said resistor circuit to adjust the magnitude of said first electrical signal in said output stage of said pressure sensor including controlling switches for temperature compensation incorporated in said resistor circuit to adjust the magnitude of said first electrical signal, according to said electrical states of said temperature sensing device,
   wherein a temperature compensated pressure altitude is obtained in said counting means.

2. Pressure altitude measuring apparatus comprising:
a pressure sensor which produces a first electrical signal representing the atmospheric pressure at the altitude to be measured and containing a pressure transducer that produces an electrical output in response to the pressure applied thereon and an output stage with a resistor circuit to compensate for the offset value of the electrical output of said pressure transducer and a resistor circuit to adjust the magnitude of said first electrical signal,
   means to produce at least one kind of second electrical signals approximately equal respectively to the electrical signals which would be produced by said pressure sensor when the atmospheric pressure of at least one kind of altitude measuring reference altitudes is applied thereon, a quasi-exponential function generator comprising a capacitor circuit with two terminals and a discharge resistor circuit with two terminals and a controller, said capacitor circuit comprising a main capacitor which forms the main part of the capacity of said capacitor circuit and plural number of sectional capacitors which are connected in parallel to said main capacitor respectively by plural number of switches for said function generation, and said controller controls said plural number of switches for said function generation, and said controller controls said plural number of switches for said function generation to disconnect said plural number of sectional capacitors in a sequence of time from said main capacitor, and each of said two terminals of said discharge resistor circuit is connected to each of said two terminals of said capacitor circuit, means to generate a third electrical signal by means of charging said capacitor circuit of said quasi-exponential function generator with an electrical voltage determined in relation to the signal of the largest one of said at least one kind of second electrical signals, and discharging through said discharge resistor circuit for a predetermined discharging period which said controller controls to disconnect said sectional capacitors from said main capacitor in a sequence of time, counting means to count electrical pulses of a predetermined frequency, means to control said counting means to count said electrical pulses only during the time interval in which the magnitude of said third electrical signal is approximately not more than the magnitude of one of said second electrical signals and not less than the magnitude of said first electrical signal, a temperature sensing device including temperature sensor, said device exhibiting plural electrical states according to the temperature of said pressure sensor and said quasi-exponential function generator, temperature compensation means comprising at least one of the following four means;

(1) means to change the electrical capacity of said capacitor circuit of said quasi-exponential function generator including controlling switches for temperature compensation incorporated in said capacitor circuit, (2) means to change the temperature of said discharge resistor circuit of said quasi-exponential function generator including controlling switches for temperature compensation incorporated in said discharge resistor circuit, (3) means to change the resistance of said resistor circuit to compensate for the offset value in said output stage of said pressure sensor including controlling switches for temperature compensation incorporated in said resistor circuit to compensate for the offset value, (4) means to change the resistance of said resistor circuit to adjust the magnitude of said first electrical signal in said output stage of said pressure sensor including controlling switches for temperature compensation incorporated in said resistor circuit to adjust the magnitude of said first electrical signal, according to said electrical states of said temperature sensing device, wherein a temperature compensated pressure altitude is obtained in said counting means.

3. Apparatus as claimed in claim 1, wherein said temperature sensor produces an electrical signal in response to the temperature of said pressure sensor and said quasi-exponential function generator, said electrical signal produced by said temperature sensor being converted to a first digital signal, and one of said plural electrical states exhibited by said temperature sensing device is represented by a second digital signal converted from said first digital signal by means for referencing a conversion table stored in a memory and prescribed by the temperature characteristics of said temperature sensor, said pressure sensor and said quasi-exponential function generator, and said control of said controlling switches for temperature compensation effected in response to corresponding bits of said second digital signal.

4. Apparatus as claimed in claim 2, wherein said temperature sensor produces an electrical signal in response to the temperature of said pressure sensor and said quasi-exponential function generator, said electrical signal produced by said temperature sensor being converted to a first digital signal, and one of said plural electrical states exhibited by said temperature sensing device is represented by a second digital signal converted from said first digital signal by means for referencing a conversion table stored in a memory and prescribed by the temperature characteristics of said temperature sensor, said pressure sensor and said quasi-exponential function generator, and said control of said controlling switches for temperature compensation effected in response to corresponding bits of said second digital signal.

5. Apparatus as claimed in claim 1, wherein said temperature sensor produces an electrical signal in response to the temperature of said pressure sensor and said quasi-exponential function generator and one of said plural electrical states exhibited by said temperature sensing device is represented by a set of electrical signals appearing at a plurality of output terminals of a level detector, said level detector produces electrical signals at its output terminals in succession in response to the magnitude of said electrical signal produced by said temperature sensor, and said control of said controlling switches for temperature compensation effected in response to corresponding electrical signals appearing at said plurality of output terminals of said level detector.

6. Apparatus as claimed in claim 2, wherein said temperature sensor produces an electrical signal in response to the temperature of said pressure sensor and said quasi-exponential function generator and one of said plural electrical states exhibited by said temperature sensing device is represented by a set of electrical signals appearing at a plurality of output terminals of a level detector, said level detector produces electrical signals at its output terminals in succession in response to the magnitude of said electrical signal produced by said temperature sensor, and said control of said controlling switches for temperature compensation effected in response to corresponding electrical signals appearing at said plurality of output terminals of said level detector.

7. Apparatus as claimed in claims 1, 3 or 5, wherein said discharging period is divided into a plurality of time intervals and said capacitor circuit of said quasi-exponential function generator has terminals 1 and 2, and said discharge resistor circuit comprises n resistors $r_i$ (where $i = 0, 1, 2, \ldots, n-1$ and n is an integer), each resistor $r_i$ has terminals $1_i$ and $2_i$, and n switches $Sd_i$ for said function generation, each switch $Sd_i$ has terminals $3_i$ and $4_i$, and said terminal $1_i$ of said resistor $r_i$ is connected to said terminal 1 of said capacitor circuit, and said terminal $2_i$ of said resistor $r_i$ is connected to said terminal $3_i$ of said switch $Sd_i$ respectively, and said terminal $4_i$ of said switch $Sd_i$ is connected to said terminal 2 of said capacitor circuit, and said switch $Sd_i$ is controlled by said controller to be turned on only for the i th time interval of said discharging period, and wherein at least one of said resistors $r_i$'s is an adjustable resistor, whereby the altitude obtained in said counting means may be adjusted to correspond with the altitude measured by another altimeter.

8. Apparatus as claimed in claim 7, wherein there is further included means to easily adjust said electrical voltage for charging said capacitor circuit of said quasi-exponential function generator to a value slightly different from the magnitude of the largest one of said second electrical signals, and to control counting of said counting means to start at the instant of the start of the discharge of said capacitor circuit of said quasi-exponential function generator and to stop at the instant of said third electrical signal becomes equal to said first electrical signal whereby the value of the altitude obtained in said counting means corresponds with the altitude measured by another altimeter in a predetermined lower range of altitudes.

9. Apparatus as claimed in claim 8, wherein said one kind of altitude measuring reference altitude is set to $-1050$ ft, and said counting means comprises first counter of modulus ten, and second counter of modulus five and preset with two, and third counter of binary mode, and said first counter and said second counter count electrical pulses each of which represents one hundred feet increment of altitude, and said third counter counts overflow pulses from said second counter, and there are further included means to convert the binary number counted in said third counter to gray code and send out as the higher order bits of an altitude reporting code, and also to convert the number counted in said first counter to a three bit code according to a prescribed conversion table and send out as the lower order three bits of an altitude reporting code.

10. Apparatus as claimed in claim 7, wherein said one kind of altitude measuring reference altitude is set to $-1050$ ft, and said counting means comprises first counter of modulus ten, and second counter of modulus five and preset with two, and third counter of binary mode, and said first counter and said second counter count electrical pulses each of which represents one hundred feet increment of altitude, and said third counter counts overflow pulses from said second counter, and there are further included means to convert the binary number counted in said third counter to gray code and send out as the higher order bits of an altitude reporting code, and also to convert the number counted in said first counter to a three bit code according to a prescribed conversion table and send out as the lower order three bits of an altitude reporting code.

11. Apparatus as claimed in claims 1, 3, or 5, wherein said discharging period is divided into a plurality of time intervals and said capacitor circuit of said quasi-exponential function generator has two terminals, and said discharge resistor circuit which has two terminals comprises the serial connection of first resistor circuit formed by a resistor r and second resistor circuit containing n resistors $r_i$ (where i=0, 1, 2, ..., n−1 and n is an integer), each resistor $r_i$ has terminals $1_i$ and $2_i$, and n switches $Sd_i$ for said function generation, each of which has terminals $3_i$ and $4_i$, and said terminals $1_i$'s of said resistor $r_i$'s are all connected together to form one terminal of said second resistor circuit, and said terminal $2_i$ of said resistor $r_i$ is connected to said terminal $3_i$ of said switch $Sd_i$ respectively, and said terminals $4_i$'s of said switches $Sd_i$'s are all connected together to form the other terminal of said second resistor circuit, and said two terminals of said discharge resistor circuit are connected respectively to said two terminals of said capacitor circuit, and said switch $Sd_i$ is controlled by said controller to be turned on only for the i th time interval of said discharging period, and wherein at least one of said resistors $r_i$'s is an adjustable resistor, whereby the altitude obtained in said counting means may be adjusted to correspond with the altitude measured by another altimeter.

12. Apparatus as claimed in claim 11, wherein said one kind of altitude measuring reference altitude is set to $-1050$ ft, and said counting means comprises first counter of modulus ten, and second counter of modulus five and preset with two, and third counter of binary mode, and said first counter and said second counter count electrical pulses each of which represents one hundred feet increment of altitude, and said third counter counts overflow pulses from said second counter, and there are further included means to convert the binary number counted in said third counter to gray code and send out as the higher order bits of an altitude reporting code, and also to convert the number counted in said first counter to a three bit code according to a prescribed conversion table and send out as the lower order three bits of an altitude reporting code.

13. Apparatus as claimed in claim 11, wherein there is further included means to easily adjust said electrical voltage for charging said capacitor circuit of said quasi-exponential function generator to a value slightly different from the magnitude of the largest one of said second electrical signals, and to control counting of said counting means to start at the instant of the start of the discharge of said capacitor circuit of said quasi-exponential function generator and to stop at the instant of said third electrical signal becomes equal to said first electrical signal whereby the value of the altitude obtained in said counting means corresponds with the altitude measured by another altimeter in a predetermined lower range of altitudes.

14. Apparatus as claimed in claim 13, wherein said one kind of altitude measuring reference altitude is set to $-1050$ ft, and said counting means comprises first counter of modulus ten, and second counter of modulus five and preset with two, and third counter of binary mode, and said first counter and said second counter count electrical pulses each of which represents one hundred feet increment of altitude, and said third counter counts overflow pulses from said second counter, and there are further included means to convert the binary number counted in said third counter to gray code and send out as the higher order bits of an altitude reporting code, and also to convert the number counted in said first counter to a three bit code according to a prescribed conversion table and send out as the lower order three bits of an altitude reporting code.

15. Apparatus as claimed in claims 1, 2, 3, 4, 5 or 6, wherein said means to produce one kind of second electrical signal comprises a first resistor, a potentiometer which has two fixed terminals and one sliding contact terminal, a second resistor, a mechanical display device which indicates barometric setting, and a rotating knob which drives said sliding contact of said potentiometer and said display device through a mechanism by which the movements of both said sliding contact of said potentiometer and said display device are kept in linear relation with the angle of rotation of said knob, and one terminal of said first resistor is connected to one terminal of power supply, the other terminal of said first resistor is connected to one fixed terminal of said potentiometer, the other fixed terminal of said potentiometer is connected to one terminal of said second resistor, and the other terminal of said second resistor is connected to the other terminal of power supply, and said one kind of second electrical signal is obtained at the sliding contact terminal of said potentiometer when said knob is operated to indicated the value of the barometric setting in said mechanical display device.

16. Apparatus as claimed in claim 15, wherein there is further included display means to indicate said altitude obtained in said counting means by a rotating drum display, said display means comprises a rotating drum display consisting of first, second, third and fourth rotating drums each equipped with an encoder, and a servomotor and a servo-circuit, and said servomotor drives said first rotating drum and is driven by the output of said servo-circuit, and periphery of said first rotating drum is scaled with indications of 00 ft through 90 ft with 10 ft steps, periphery of said second rotating drum is scaled with indications of 0 through 9 with 100 ft steps, periphery of said third rotating drum is scaled with indications 0 through 9 with 1000 ft steps, periphery of said fourth rotating drum is scaled with indications of appropriate numbers among 0 through 9 as necessary to indicate the measured altitude with 10000 ft steps, and said first rotating drum is mechanically linked with said second rotating drum so that for the rotation of 90 to 00 of said first rotating drum, the indication of said second rotating drum is incremented, and for the rotation of 00 to 90 of said first rotating drum, the indication of said second rotating drum is decremented, and said second rotating drum is mechanically linked with said third rotating drum so that for the rotation of said second rotating drum from 9 to 0, the indication of said third rotating drum is incremented, and for the rotation of said second rotating drum from 0 to 9, the indication of said third rotating drum is decremented, and said third rotating drum is mechanically linked with said fourth rotating drum so that for the rotation from 9 to 0 of said third rotating drum, the indication of said fourth rotating drum is incremented, and for the rotation from 0 to 9 of said third rotating drum, the indication of said fourth rotating drum is decremented, and said encoder for said first rotating drum generates gray code 0 through $2^n - 1$ (where n is an integer), and each of said encoder for said second and third rotating drums generates a code which changes only one bit for the increment of indications of 0, 1, 2, . . . , 9, 0, and said encoder for said fourth rotating drum generates a code which changes only one bit for the increment of indications necessary to indicate measured altitude, and the difference of the output value of said encoders of said rotating drum display and said altitude obtained in said counting means is converted to analog value and supplied to the input of said servo-circuit as an error signal whereby said servomotor drives said rotating drum display to track said altitude obtained in said counting means.

17. Apparatus as claimed in claim 16, wherein there are further included means to indicate the selected altitude by a mechanical display with an encoder where said mechanical display to indicate the selected altitude is driven manually and said encoder generates a digital signal representing the indication of said mechanical display to indicate the selected altitude, means to calculate the difference value of said digital signal generated by said encoder of said mechanical display to indicate the selected altitude and said altitude obtained in said counting means, means to compare said difference value with at least one pair of predetermined numerical values stored in a memory, and means to produce at least one alert signal when said difference value exists between said at least one pair of predetermined numerical values.

18. Apparatus as claimed in claim 17, wherein there is further included means to send out said difference value of said digital signal generated by said encoder of said mechanical display to indicate the selected altitude and said altitude obtained in said counting means to an autopilot as one of the control signals therefor.

19. Apparatus as claimed in claim 15, wherein there are further included means to indicate the selected altitude by a mechanical display with an encoder where said mechanical display to indicate the selected altitude is driven manually and said encoder generates a digital signal representing the indication of said mechanical display to indicate the selected altitude, means to calculate the difference value of said digital signal generated by said encoder of said mechanical display to indicate the selected altitude and said altitude obtained in said counting means, means to compare said difference value with at least one pair of predetermined numerical values stored in a memory, and means to produce at least one alert signal when said difference value exists between said at least one pair of predetermined numerical values.

20. Apparatus as claimed in claim 19, wherein there is further included means to send out said difference value of said digital signal generated by said encoder of said mechanical display to indicate the selected altitude and said altitude obtained in said counting means to an autopilot as one of the control signals therefor.

21. Apparatus as claimed in claims 1, 2, 3, 4, 5 or 6, wherein said one kind of altitude measuring reference altitude is set to $-1050$ ft, and said counting means comprises first counter of modulus ten, and second counter of modulus five and preset with two, and third counter of binary mode, and said first counter and said second counter count electrical pulses each of which represents one hundred feet increment of altitude, and said third counter counts overflow pulses from said second counter, and there are further included means to convert the binary number counted in said third counter to gray code and send out as the higher order bits of an altitude reporting code, and also to convert the number counted in said first counter to a three bit code according to a prescribed conversion table and send out as the lower order three bits of an altitude reporting code.

22. Apparatus as claimed in claims 1, 2, 3, 4, 5 or 6, wherein there is further included display means to indicate said altitude obtained in said counting means by a rotating drum display, said display means comprises a rotating drum display consisting of first, second, third and fourth rotating drums each equipped with an encoder, and a servomotor and a servo-circuit, and said servomotor drives said first rotating drum and is driven by the output of said servo-circuit, and periphery of said first rotating drum is scaled with indications of 00 ft through 90 ft with 10 ft steps, periphery of said second rotating drum is scaled with indications of 0 through 9 with 100 ft steps, periphery of said third rotating drum is scaled with indications 0 through 9 with 1000 ft steps, periphery of said fourth rotating drum is scaled with indications of appropriate numbers among 0 through 9 as necessary to indicate the measured altitude with 10000 ft steps, and said first rotating drum is mechanically linked with said second rotating drum so that for the rotation of 90 to 00 of said first rotating drum, the indication of said second rotating drum is incremented, and for the rotation of 00 to 90 of said first rotating drum, the indication of said second rotating drum is decremented, and said second rotating drum is mechanically linked with said third rotating drum so that for the rotation of said second rotating drum from 9 to 0, the indication of said third rotating drum is incremented, and for the rotation of said second rotating drum from 0 to 9, the indication of said third rotating drum is decremented, and said third rotating drum is mechanically linked with said fourth rotating drum so that for the rotation from 9 to 0 of said third rotating drum, the indication of said fourth rotating drum is incremented, and for the rotation from 0 to 9 of said third rotating drum, the indication of said fourth rotating drum is decremented, and said encoder for said first rotating drum generates gray code 0 through $2^n - 1$ (where n is an integer), and each of said encoder for said second and third rotating drums generates a code which changes only one bit for the increment of indications of 0, 1, 2, . . . , 9, 0, and said encoder for said fourth rotating drum generates a code which changes only one bit for the increment of indications necessary to indicate measured altitude, and the difference of the output value of said encoders of said rotating drum display and said altitude obtained in said counting means is converted to analog value and supplied to the input of said servo-circuit as an error signal whereby said servomotor drives said rotating drum display to track said altitude obtained in said counting means.

23. Apparatus as claimed in claim 22, wherein there are further included means to indicate the selected altitude by a mechanical display with an encoder where said mechanical display to indicate the selected altitude is driven manually and said encoder generates a digital signal representing the indication of said mechanical display to indicate the selected altitude, means to calculate the difference value of said digital signal generated by said encoder of said mechanical display to indicate the selected altitude and said altitude obtained in said counting means, means to compare said difference value with at least one pair of predetermined numerical values stored in a memory, and means to produce at least one alert signal when said difference value exists between said at least one pair of predetermined numerical values.

24. Apparatus as claimed in claim 23, wherein there is further included means to send out said difference value of said digital signal generated by said encoder of said mechanical display to indicate the selected altitude and said altitude obtained in said counting means to an autopilot as one of the control signals therefor.

25. Apparatus as claimed in claims 1, 2, 3, 4, 5 or 6, wherein there are further included means to indicate the selected altitude by a mechanical display with an encoder where said mechanical display to indicate the selected altitude is driven manually and said encoder generates a digital signal representing the indication of said mechanical display to indicate the selected altitude, means to calculate the difference value of said digital signal generated by said encoder of said mechanical display to indicate the selected altitude and said altitude obtained in said counting means, means to compare said difference value with at least one pair of predetermined numerical values stored in a memory, and means to produce at least one alter signal when said difference value exists between said at least one pair of predetermined numerical values.

26. Apparatus as claimed in claim 25, wherein there is further included means to send out said difference value of said digital signal generated by said encoder of said mechanical display to indicate the selected altitude and said altitude obtained in said counting means to an autopilot as one of the control signals therefor.

* * * * *

UNITED STATES PATENT AND TRADEMARK OFFICE
CERTIFICATE OF CORRECTION

PATENT NO. : 4,253,335

DATED : March 3, 1981

INVENTOR(S) : Naonobu Shimomura

It is certified that error appears in the above—identified patent and that said Letters Patent is hereby corrected as shown below:

Column 1, line 27, after "has" delete "a";
Column 1, line 47, after "hereafter)" insert --,--;
Column 1, line 48, after "invention" insert --,--;
Column 1, line 49, after "having" delete "a";
Column 1, line 68, "atitude" should be --altitude--.
Column 2, line 30, after "..." insert --,--;
Column 2, line 33, "a" should be --an--;
Column 2, line 37, delete "of".
Column 3, line 14, "registor" should be --resistor--;
Column 3, line 22, "a" should be --an--;
Column 3, line 26, "8(A)" should be --8A--;
Column 3, line 28, "characteristics" should be --characteristic--;
Column 3, line 50, "characteristics" should be --characteristic--.
Column 4, line 15, "specificed" should be --specified--;
Column 4, line 17, "is" should be --are--.
Column 5, line 1, "4 bit" should be --4-bit--;
Column 5, line 50, "are" should be --is--;
Column 5, line 54, "is" should be --are--.
Column 6, line 36, delete "a".
Column 7, line 2, "portion" should be --portions--;
Column 7, line 3, before "(ft)" insert --foot--;
Column 7, line 43, after "Hg" insert --.--;
Column 7, line 56, after "unit" insert --.--.
Column 8, line 60, "GEFG" should be --QEFG--.
Column 9, line 2, "a" should be --an--;
Column 9, line 29, after "all" insert --the--;
Column 9, line 30, after "be" insert --the--.
Column 9, line 46, "When" should be --With--;
Column 9, line 53, "is" should be --are--;
Column 9, line 53, "a" should be --"a"--;
Column 9, line 58, "changes" should be --change--;

UNITED STATES PATENT AND TRADEMARK OFFICE
CERTIFICATE OF CORRECTION

PATENT NO. : 4,253,335

DATED : March 3, 1981

INVENTOR(S) : Naonobu Shimomura

It is certified that error appears in the above-identified patent and that said Letters Patent are hereby corrected as shown below:

```
Column 9, line 59, after "that" delete ",";
Column 9, line 66, after "in" insert --the--.
Column 10, line 1, "invariant" should be --in variant--;
Column 10, line 31, after "Hereafter" insert --,--;
Column 10, line 37, "right hand" should be --right-hand--;
Column 10, line 40, "T=(1/a)(1-8.532538 t/44.847837)" should be
    --T=1/a · 1-8.532538 t/44.847837--;
Column 10, line 50, ""v"" should be --v"--;
Column 10, line 53, "8(A)" should be --8A--;
Column 10, line 60, after "output of" change ""a"" to --a--;
Column 10, line 61, "a," should be --"a,"--.
Column 11, line 1, after ""a"" insert --,--;
Column 11, line 5, after "according" insert --to--;
Column 11, line 21, "referred with" should be --in reference
    to--;
Column 11, line 46, "plurality number" should be --a plurality--;
Column 11, line 48, "are" should be --is--.
Column 12, line 1, after "For" delete "the";
Column 12, line 15, delete "(Blind Encoder)";
Column 12, line 16, before paragraph insert heading at left
    margin --Blind Encoder--;
Column 12, line 24, after "produces" delete "," and insert --a--;
Column 12, line 40, after "corresponds" insert --to--;
Column 12, line 43, "periods" should be --period,--;
Column 12, line 60, "4 bit" should be --4-bit--;
Column 12, line 65, after "on" insert --,--.
Column 13, line 36, "dev-" should be --div---;
Column 13, line 59, "a 8 bit" should be --an 8-bit--.
Column 14, line 55, "comprises" should be --comprise--;
Column 14, line 60, "8 bits" should be --8-bit--;
```

UNITED STATES PATENT AND TRADEMARK OFFICE
CERTIFICATE OF CORRECTION

PATENT NO. : 4,253,335

DATED : March 3, 1981

INVENTOR(S) : Naonobu Shimomura

It is certified that error appears in the above-identified patent and that said Letters Patent are hereby corrected as shown below:

```
Column 14, line 65, ".  So that," should be --, so that--.
Column 15, line 3, "apply" should be --applying--;
Column 15, lines 32-33, delete "(Principle of Temperature
    Compensation)";
Column 15, line 34, before paragraph insert heading at left
    margin --Principle of Temperature Compensation--;
Column 15, line 59, delete "the" (third occurrence);
Column 15, line 65, after "even" insert --when--;
Column 15, line 68, after "enables" insert --one--.
Column 16, line 31, ".  So that," should be --, so that--;
Column 16, line 33, "capcity" should be --capacity--;
Column 16, line 38, "method" should be --methods--;
Column 16, line 42, "a" should be --"a"--;
Column 16, line 62, "is" should be --are--;
Column 16, line 63, "with" should be --in--.
Column 17, line 2, after "Similarly" insert --,--;
Column 17, line 17, "roll" should be --role--;
Column 17, line 21, "looks" should be --look--;
Column 17, line 32, "bit digitalized" should be ---bit
    digitized--.
Column 18, line 28, "devision" should be --division--;
Column 18, line 43, "with" should be --in--;
Column 18, line 45, before "same" insert --the--.
Column 19, line 33, "illustrate" should be --illustrates--;
Column 19, line 34, after "ever" insert --,--;
Column 19, line 46, after "S_r" insert --.--.
Column 20, line 36, "feed back" should be --feedback--;
Column 20, line 45, after "device" insert --and the--;
Column 20, line 47, "is" should be --are--;
Column 20, line 54, "transfered" should be --transferred--;
Column 20, line 60, "way" should be --ways--;
```

UNITED STATES PATENT AND TRADEMARK OFFICE
CERTIFICATE OF CORRECTION

PATENT NO. : 4,253,335

DATED : March 3, 1981

INVENTOR(S) : Naonobu Shimomura

It is certified that error appears in the above-identified patent and that said Letters Patent are hereby corrected as shown below:

Column 20, line 67, "a" should be --the--.
Column 21, line 28, "circuit" should be --circuits--;
Column 21, line 31, after "them in" insert --a--;
Column 21, lines 46-47, delete "(Embodiment of Temperature Compensation, FIG. 15)";
Column 21, line 48, before paragraph insert heading at left margin --Embodiment of Temperature Compensation, FIG. 15--;
Column 21, line 48, "An-explanation" should be "An explanation--;
Column 21, line 57, after "example" delete ",".
Column 22, line 2, "4 bit" should be --4-bit--;
Column 22, line 5, "4 bit" should be --4-bit--;
Column 22, line 8, "8 bit" should be --8-bit--;
Column 22, line 12, "words 4 bits" should be --4-bit words--; "4 bit" should be --4-bit--;
Column 22, line 13, "8 bit" should be --8-bit--;
Column 22, line 24, after "sensor," insert --and--;
Column 22, line 27, after "address" insert --.--;
Column 22, line 33, "a" should be --an--;
Column 22, line 40, "QEFC" should be --QEFG--.
Column 23, line 54, "8 bit" should be --8-bit--;
Column 23, line 57, "words 4 bits" should be --4-bit words--;
Column 23, line 58, "64 word" should be --64-word--;
Column 23, line 59, "two bit address" should be --2-bit addresses--;
Column 23, line 60, "four bit" should be --4-bit--;
Column 23, line 61, "two bit" should be --2-bit--;
Column 23, line 64, after "22" change "." to --,--;
Column 23, line 68, after "quirement" insert --of--.
Column 24, line 33, "QEFG," should be --QEFG and--;
Column 24, line 60, "appear" should be --appears--.

UNITED STATES PATENT AND TRADEMARK OFFICE
CERTIFICATE OF CORRECTION

PATENT NO. : 4,253,335  
DATED : March 3, 1981  
INVENTOR(S) : Naonobu Shimomura Page 5 of 10

It is certified that error appears in the above—identified patent and that said Letters Patent is hereby corrected as shown below:

Column 25, line 3, delete "(Field Calibration)";  
Column 25, line 4, before paragraph insert heading at left margin --Field Calibration--;  
Column 25, line 13, "section" should be --sections--;  
Column 25, line 19, after "as" insert --the--;  
Column 25, line 26, "word" should be --words--; after "are" insert --the--;  
Column 25, line 27, "section" should be --sections--;  
Column 25, line 35, after "words" insert --,--;  
Column 25, line 45, after "according" insert --to--;  
Column 25, line 58, after "than" change "H"" to --H'--;  
Column 25, line 61, after "near" delete "of".  
Column 26, line 9, after "near" insert --the--;  
Column 26, line 14, "values" should be --value--:  
Column 26, line 22, "resister" should be -- register --.  
Column 26, line 26, "enconder" should be --encoder--;  
Column 26, line 32, "QEFC" should be --QEFG--;  
Column 26, line 34, "straight forward" should be --straightforward--;  
Column 26, line 49, "on" should be --of--;  
Column 26, line 54, "bined" should be --bination--;  
Column 26, line 67, after "is" insert --the--.  
Column 27, line 4, "anyone" should be --any one--; delete "are";  
Column 27, line 6, delete "are";  
Column 27, line 7, after "17" insert --,--;  
Column 27, line 35, delete "the and".  
Column 28, line 53, "in" should be --on--;  
Column 28, line 54, "in" should be --on--;  
Column 28, line 63, after "are" insert --the--.  
Column 29, line 24, "32 bit" should be --32-bit--;  
Column 29, line 28, "to" should be --of--;

UNITED STATES PATENT AND TRADEMARK OFFICE
CERTIFICATE OF CORRECTION

PATENT NO. : 4,253,335
DATED : March 3, 1981
INVENTOR(S) : Naonobu Shimomura

It is certified that error appears in the above-identified patent and that said Letters Patent are hereby corrected as shown below:

```
Column 29, line 32, after "carry" insert --pulse--;
Column 29, line 34, "longer" should be --integer--;
Column 29, line 36, "32 bit" should be --32-bit--;
Column 29, line 46, "16 bit" should be --16-bit--;
Column 29, line 49, "5 bit" should be --5-bit--;
Column 29, line 51, "a" should be --an--;
Column 29, line 63, after "carry" insert --pulse--.
Column 30, line 6,  "LSG" should be --LSD--;
Column 30, line 14, after "information" insert --b--;
Column 30, line 17, "operations" should be --operation--;
Column 30, line 21, "repsectively" should be --respectively--;
Column 30, line 23, "ouput" should be --output--;
Column 30, line 25, after "carry" insert --pulse--;
Column 30, line 30, after "carry" insert --pulse--;
Column 30, line 33, "set" should be --sets--;
Column 30, line 33, "170" should be --179--;
Column 30, line 39, "thirty first" should be --thirty-first--;
Column 30, line 41, "a" should be --an--;
Column 30, line 45, "same with" should be --and the same as--;
Column 30, line 46, "one bit" should be --one-bit--;
Column 30, line 47, "appeared" should be --appearing--;
Column 30, line 49, after "carry" insert --pulse--;
Column 30, line 50, "appeared" should be --appearing--;
Column 30, line 51, "appeared" should be --appearing--;
Column 30, line 52, after "carry" insert --pulse--;
Column 30, line 53, after "carry" insert --pulse--;
Column 30, line 58, after "Thus, insert --,--.
Column 31, line 42, "(Altimeter of FIG. 38)" should be [at left
    margin] --Altimeter of FIG. 38--;
Column 31, line 46, after "39B" insert --,--;
Column 31, line 47, delete "and".
```

UNITED STATES PATENT AND TRADEMARK OFFICE
CERTIFICATE OF CORRECTION

PATENT NO. : 4,253,335

DATED : March 3, 1981

INVENTOR(S) : Naonobu Shimomura

It is certified that error appears in the above-identified patent and that said Letters Patent are hereby corrected as shown below:

Column 32, line 1, after "39B" insert --,--;
Column 32, line 5, after "above" insert --,--;
Column 32, line 15, "nagative" should be --negative--;
Column 32, line 40, delete "of";
Column 32, line 46, "period" should be --periods--;
Column 32, line 56, "divider" should be --dividers--;
Column 32, line 58, "divider" should be --dividers--.
Column 33, line 37, after "sensor" delete ",";
Column 33, line 38, after "which" insert --,--; after "of" delete "a";
Column 33, line 55, before "right" insert --the--;
Column 33, line 57, before "left" insert --the--;
Column 33, line 68, after "is" insert --the--.
Column 34, line 4, "to" should be --at--;
Column 34, line 11, ") for example" should be --for example)--;
Column 34, line 12, "flip" should be --flip---
Column 34, line 16, "flip flop" should be --flip-flop--;
Column 34, line 18, "16 bit" should be --16-bit--;
Column 34, line 21, "flip" should be --flip---;
Column 34, line 23, "closes" should be --close--;
Column 34, line 24, "open" should be --opens--;
Column 34, line 29, "flip" should be --flip---;
Column 34, line 30, "4 bit" should be --4-bit--;
Column 34, line 32, "4 bit" should be --4-bit--;
Column 34, line 37, after "that" delete ",";
Column 34, line 46, "anyone" should be --any one--;
Column 34, line 57, after "is" insert --the--; after "that" insert --which--;
Column 34, line 59, "4 bit" should be --4-bit--.
Column 35, line 15, "8 bit" should be --8-bit--;
Column 35, line 23, "3 bit" should be --3-bit--;

UNITED STATES PATENT AND TRADEMARK OFFICE
CERTIFICATE OF CORRECTION

PATENT NO. : 4,253,335

DATED : March 3, 1981

INVENTOR(S) : Naonobu Shimomura

It is certified that error appears in the above—identified patent and that said Letters Patent is hereby corrected as shown below:

```
Column 35, line 28, "inhibitted" should be --inhibited--;
Column 35, line 31, "16 bit" should be --16-bit--;
Column 35, line 37, "flip flop" should be --flip-flop--;
Column 35, line 39, after "altitude" delete ",";
Column 35, line 39, delete ")";
Column 35, line 41, after "CPU)" delete ",";
Column 35, line 49, "w x y" should be --w, x, y--;
Column 35, line 66, "flip flops" should be --flip-flops--.
Column 36, line 3, "above mentioned" should be
     --above-mentioned--;
Column 36, line 5, "flip flop" should be --flip-flops--;
Column 36, line 9, "flip" should be --flip---;
Column 36, line 13, "flip flop" should be --flip-flop--;
Column 36, line 14, "flip flops" should be --flip-flops--;
Column 36, line 44, "interval," should be --intervals,--;
Column 36, line 48, "interval," should be --intervals,--;
Column 36, line 51, "interval," should be --intervals,--;
Column 36, line 53, "ft." should be --ft,--.
Column 37, line 6, after "except" insert --for--;
Column 37, line 11, "servo-loop" should be --servoloop--;
Column 37, line 26, after "However" insert --,--;
Column 37, line 41, after "should" insert --not--;
Column 37, line 44, after "microcomputer" insert --,--;
Column 37, line 51, "a" should be --an--;
Column 37, line 61, ":" should be --.--.
Column 38, line 39, "grey" should be --a gray--;
Column 38, line 40, after "64" delete ",";
Column 38, line 52, after "respectively" insert --,--;
Column 38, line 68, "4 bit" should be --4-bit--.
Column 39, line 2, "a" should be --an--;
Column 39, line 3, after "for" insert --the--;
```

UNITED STATES PATENT AND TRADEMARK OFFICE
CERTIFICATE OF CORRECTION

PATENT NO. : 4,253,335
DATED : March 3, 1981
INVENTOR(S) : Naonobu Shimomura

It is certified that error appears in the above-identified patent and that said Letters Patent are hereby corrected as shown below:

```
Column 39, line 10, "table" should be --Table--.
Column 40, line 11, "highered" should be --increased--;
Column 40, line 14, "a" should be --an--;
Column 40, line 16, "highered" should be --increased--;
Column 40, line 35, "3 digit" should be --3-digit--;
Column 40, line 40, after "that" delete ",";
Column 40, line 42, after "However" insert --,--;
Column 40, line 47, "flip flop" should be --flip-flop--;
Column 40, line 51, "same with" should be --the same as--;
Column 40, line 55, after "case" insert --,--;
Column 40, line 61, "can not" should be --cannot--;
Column 40, line 62, after "that" delete " ".
Column 41, line 4, delete "range", first occurrence.
Column 41, line 5, after "38000" insert --ft--;
Column 41, line 25, "16 bit" should be --16-bit--;
Column 41, line 44, "atomospheric" should be --atmospheric--;
Column 41, line 56, "atmosheric" should be --atmospheric--.
Column 42, line 26, ";" should be --:--.
Column 43, line 26, after "period" insert --in--;
Column 43, line 42, ";" should be --:--;
Column 43, line 48, "temperature" should be --resistance--.
Column 45, line 42, "three bit" should be --3-bit--;
Column 45, line 58, "three bit" should be --3-bit--.
Column 46, line 4, "resistor" should be --resistors--;
Column 46, line 32, "three bit" should be --3-bit--;
Column 46, line 62, "three bit" should be --3-bit--.
Column 47, line 16, "indicated" should be --indicate--.
```

UNITED STATES PATENT AND TRADEMARK OFFICE
CERTIFICATE OF CORRECTION

PATENT NO. : 4,253,335

DATED : March 3, 1981

INVENTOR(S) : Naonobu Shimomura

It is certified that error appears in the above—identified patent and that said Letters Patent is hereby corrected as shown below:

Column 48, line 56, "three bit" should be --3-bit--.
Column 49, line 28, delete "of".
Column 50, line 33, "alter" should be --alert--.

Signed and Sealed this

Eighth Day of December 1981

[SEAL]

Attest:

Attesting Officer

GERALD J. MOSSINGHOFF

Commissioner of Patents and Trademarks